United States Patent
Misawa et al.

(10) Patent No.: US 7,898,680 B2
(45) Date of Patent: Mar. 1, 2011

(54) DATA PROCESSING METHOD FOR INFORMATION PROCESSING SYSTEM, INFORMATION PROCESSING SYSTEM, STORAGE MEDIUM, AND PROGRAM

(75) Inventors: Reiji Misawa, Meguro-Ku (JP); Osamu Iinuma, Kawasaki (JP); Kazuhiko Ushiyama, Edogawa-Ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1339 days.

(21) Appl. No.: 11/206,866

(22) Filed: Aug. 19, 2005

(65) Prior Publication Data
US 2006/0044601 A1  Mar. 2, 2006

(30) Foreign Application Priority Data
Aug. 25, 2004  (JP) .............................. 2004-245685

(51) Int. Cl.
*G06F 3/12* (2006.01)
*G06K 1/00* (2006.01)
*G06K 15/02* (2006.01)
(52) U.S. Cl. ........................ 358/1.15; 358/1.9; 358/1.11
(58) Field of Classification Search .................. 358/1.1, 358/1.9, 1.11–1.18, 1.2, 1.4, 1.5, 1.6
See application file for complete search history.

(56) References Cited

U.S. PATENT DOCUMENTS

| | | | | |
|---|---|---|---|---|
| 6,456,400 | B1 * | 9/2002 | Ikegami et al. | 358/434 |
| 6,894,792 | B1 * | 5/2005 | Abe | 358/1.15 |
| 7,397,575 | B2 | 7/2008 | Sekiguchi | |
| 2003/0189717 | A1 * | 10/2003 | Matsuda | 358/1.13 |

FOREIGN PATENT DOCUMENTS

| | | |
|---|---|---|
| CN | 1113629 | 12/1995 |
| JP | 10-040354 A | 2/1998 |
| JP | 10-190903 | 7/1998 |
| JP | 11-191834 | 7/1999 |
| JP | 2001-358857 | 12/2001 |
| JP | 2002-125090 A | 4/2002 |
| JP | 2002-368986 A | 12/2002 |
| JP | 2003-281063 A | 10/2003 |
| JP | 2003-283745 A | 10/2003 |
| JP | 2004-007534 | 1/2004 |
| JP | 2004-221826 A | 8/2004 |

OTHER PUBLICATIONS

Japanese Office Action dated Aug. 17, 2009 in corresponding Japanese Application No. 2004-245685.
Japanese Office Action dated Feb. 22, 2010 in corresponding Japanese Application No. 2004-245685.

* cited by examiner

*Primary Examiner*—Thierry L Pham
(74) *Attorney, Agent, or Firm*—Fitzpatrick, Cella, Harper & Scinto

(57) ABSTRACT

In a system in which a host computer and MFP are connected via a communication medium such as a network or the like, upon transmitting image data stored in a box of the MFP to the host computer, the transmission data size (file size) is displayed before transmission. The user can transmit image data with a desired file size. When the amount of transmission data is large, the load on resources such as a memory, CPU, and the like of a device as a destination of transmission can be reduced.

12 Claims, 25 Drawing Sheets

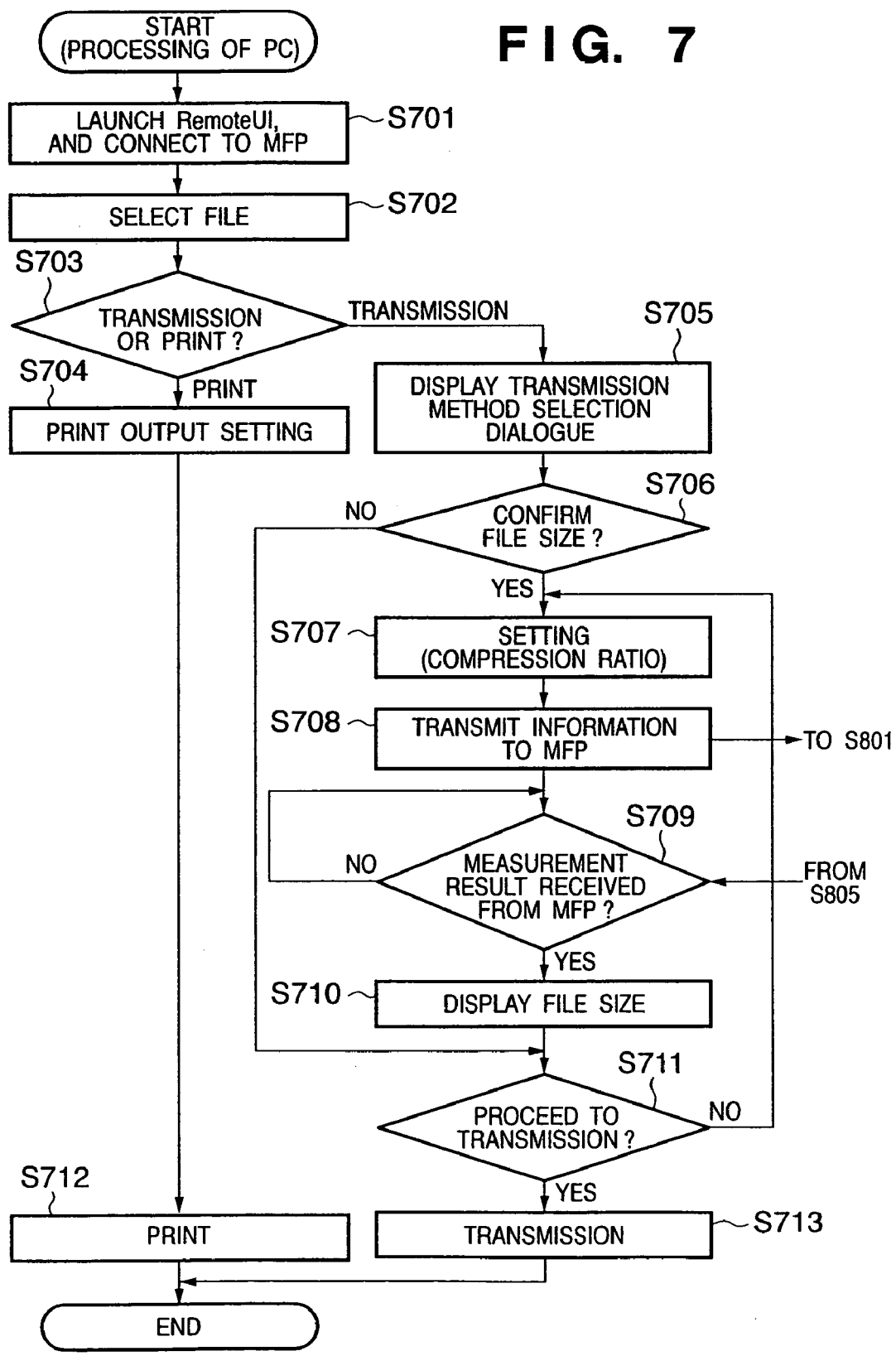

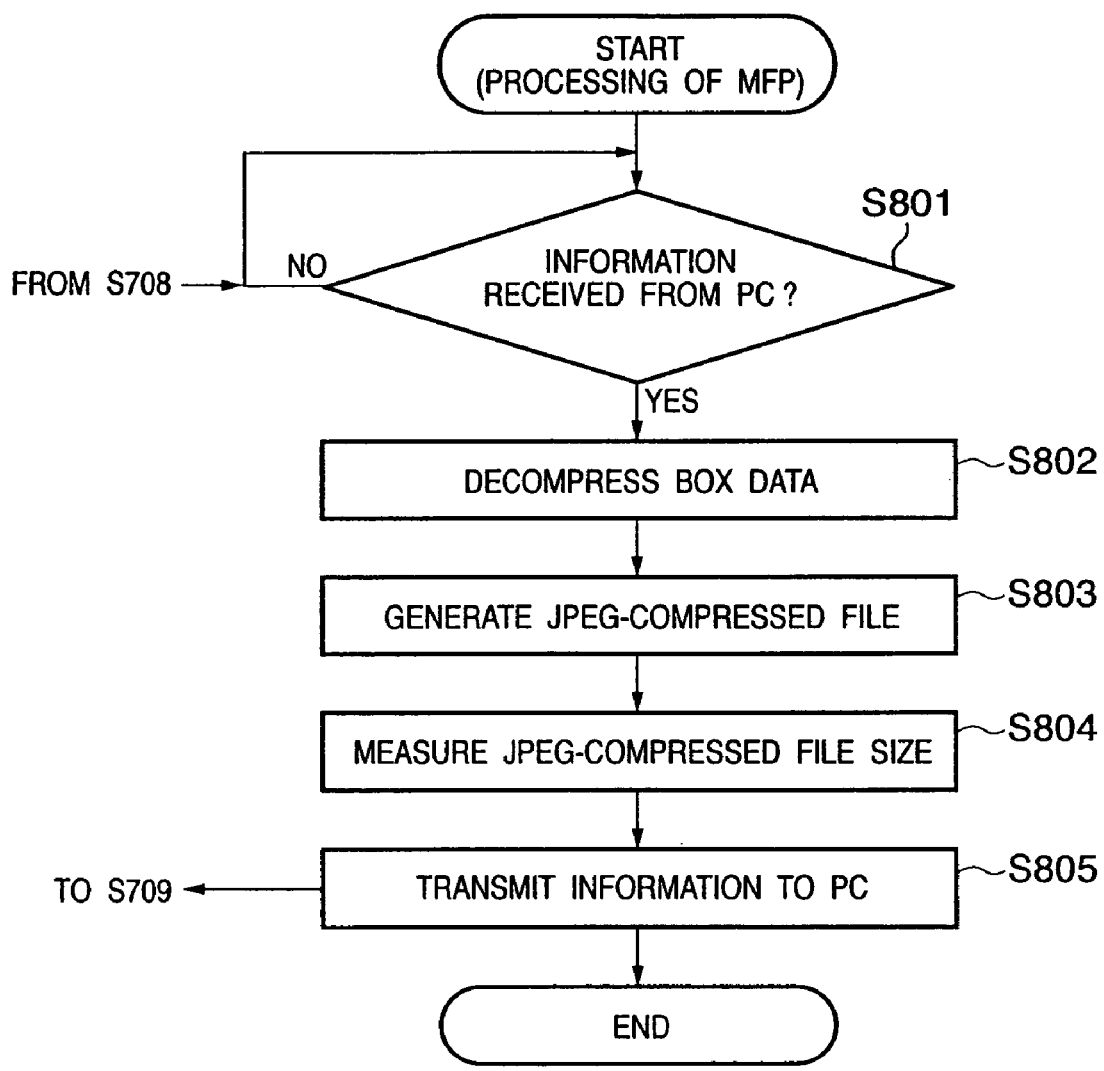

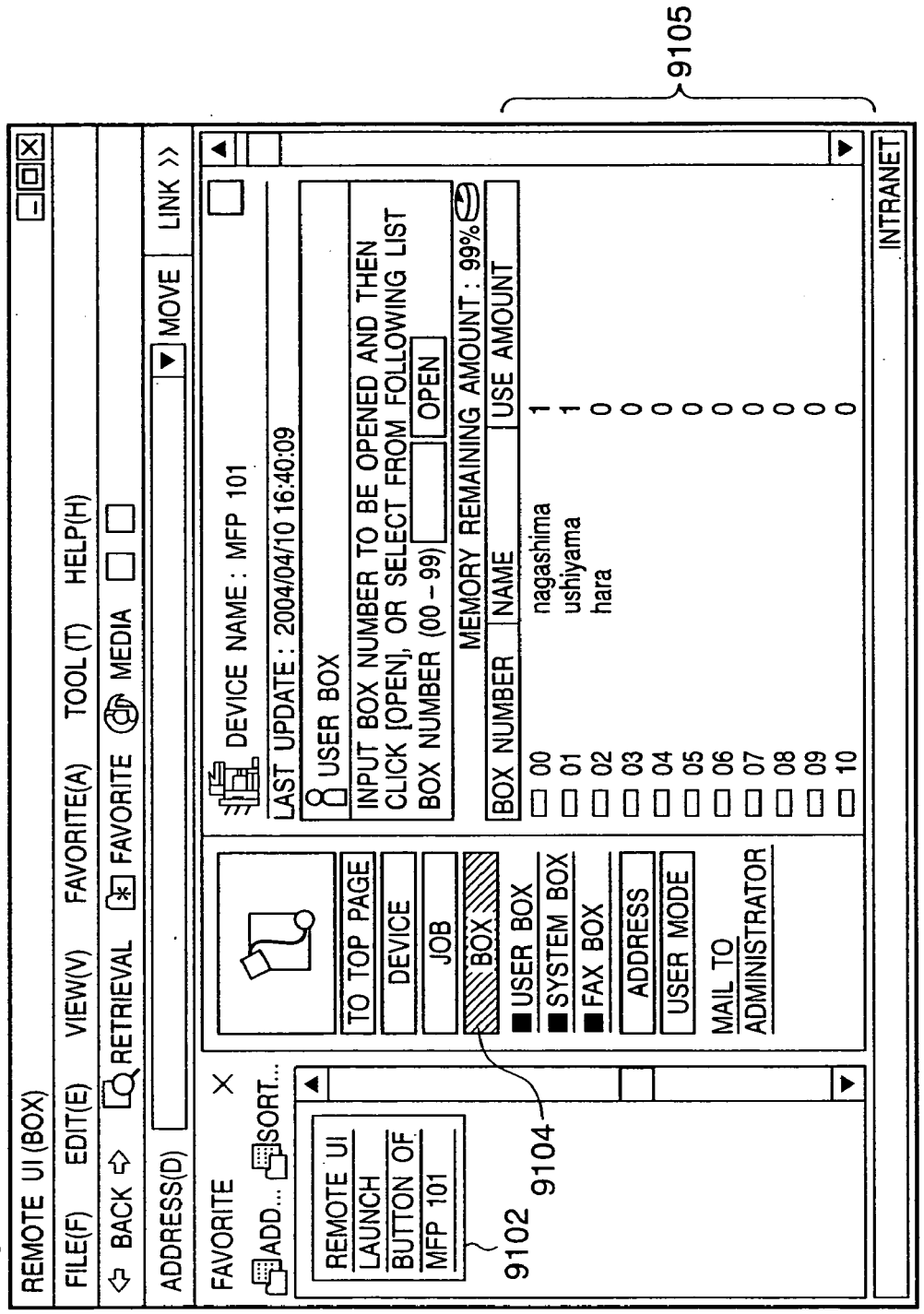

FIG. 12

```
SELECT TRANSMISSION METHOD

┌─ TRANSMISSION FILE METHOD ──┐  ┌─ TRANSMISSION FILE COMPRESSION RATIO ─┐
│                             │  │                                        │
│  ☐ E-MAIL ATTACHED          │  │  ☐ LOW COMPRESSION                     │
│    TRANSMISSION             │  │                                        │
│  ■ FILE TRANSMISSION        │  │  ■ NORMAL COMPRESSION                  │
│                             │  │                                        │
│                             │  │  ☐ HIGH COMPRESSION                    │
└─────────────────────────────┘  └────────────────────────────────────────┘

[FILE SIZE CONFIRMATION]    [TRANSMISSION]        [CANCEL]
```

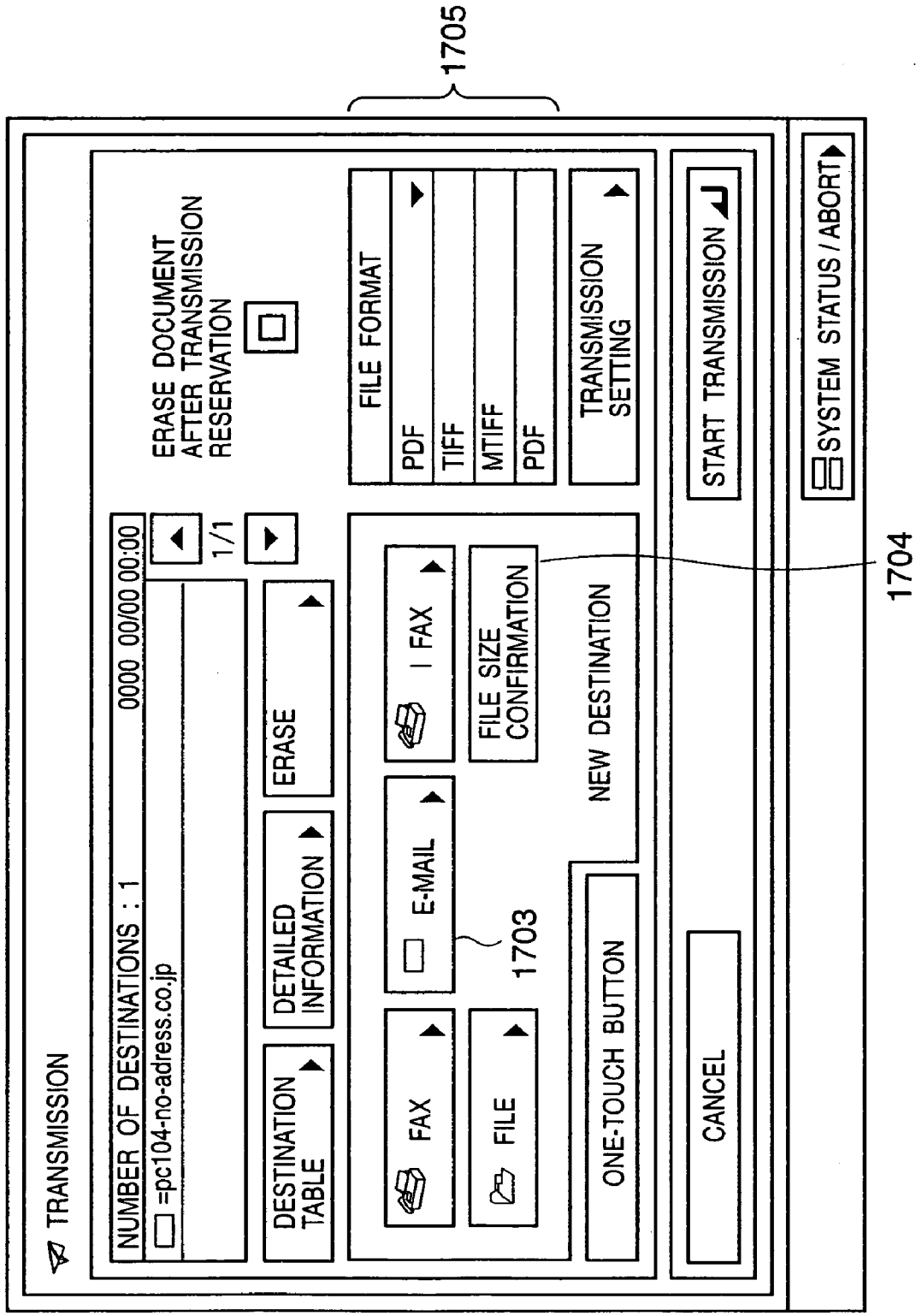

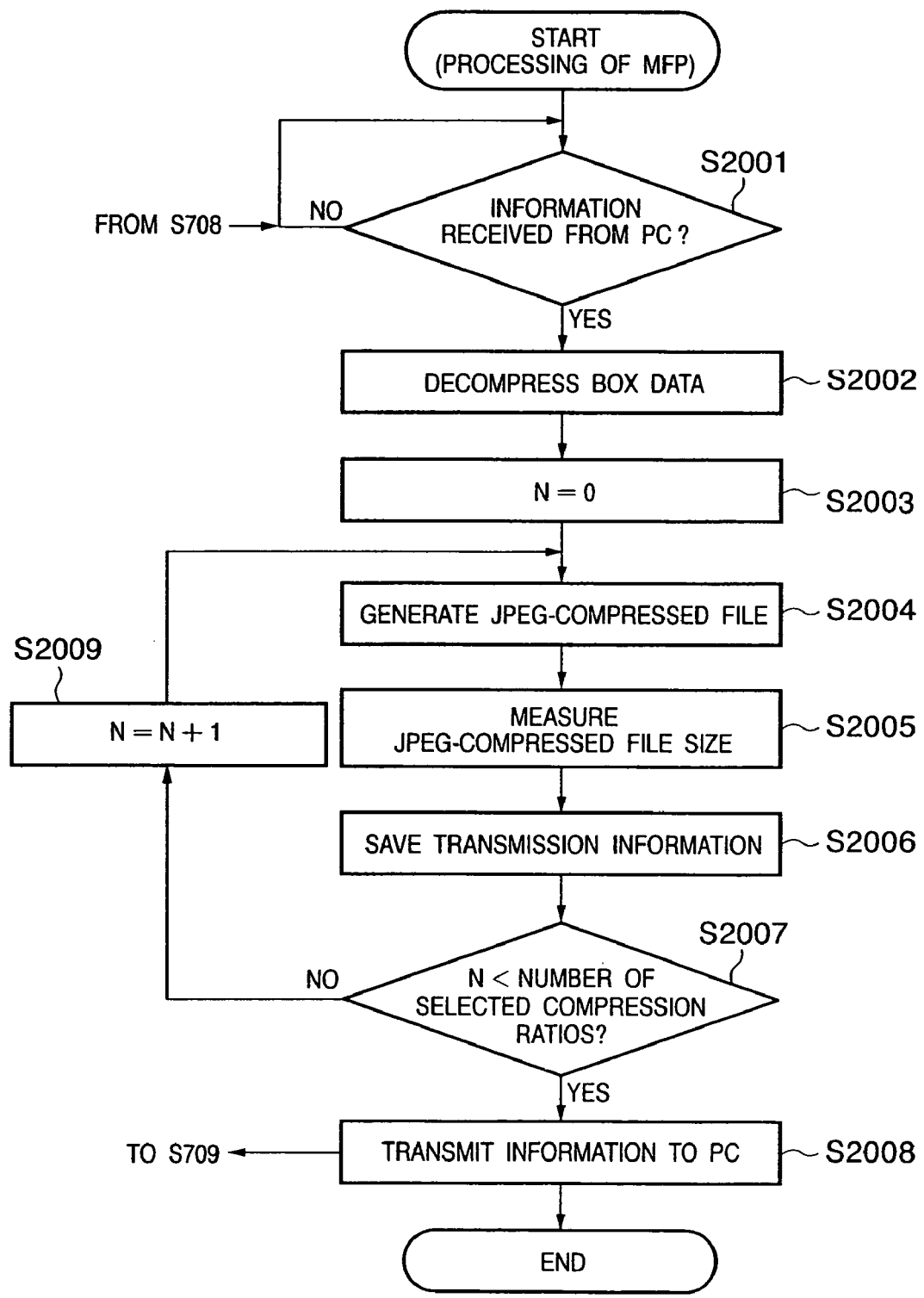

DATA PROCESSING METHOD FOR INFORMATION PROCESSING SYSTEM, INFORMATION PROCESSING SYSTEM, STORAGE MEDIUM, AND PROGRAM

FIELD OF THE INVENTION

The present invention relates to an information processing system including a device which can execute output processing of data in storage means that can store a plurality of data, a data processing method of that system, a storage medium, a program, and the like.

BACKGROUND OF THE INVENTION

Conventionally, of information processing devices such as digital multiple devices having a copy function and the like, a device which has a data transmission function of storing data read by a reader in a memory, and transmitting that data to another information processing device such as a computer, another digital multiple device, or the like is known (e.g., Japanese Patent Laid-Open No. 2001-358857).

However, since the information processing device such as a digital multiple device having the data transmission function executes the data transmission processing without allowing the user to confirm the data size of data to be transmitted, the following problems may occur.

For example, when the amount of transmission data is large (e.g., that data includes color data and a large number of pages), the load on resources such as a memory, CPU, and the like of a device as a destination of transmission becomes heavy. When a device as a destination of transmission is shared by a plurality of users, since the load may become heavier, damages become more serious. Hence, it is desired to solve such problems.

SUMMARY OF THE INVENTION

It is an object of the present invention to provide a data processing method for an information processing system, an information processing system, a storage medium, and a program, which can solve the aforementioned problems.

Furthermore, the aforementioned problems may be caused by data transmission from an information processing device such as a digital multiple device or the like as a source of data transmission to a destination of data transmission in response to an instruction from the user at a manipulation unit of that information processing device. Such information processing device such as a digital multiple device or the like, which can be remote-controlled by a remote device such as a host computer or the like, which is distant from the information processing device, has been proposed.

It is another object of the present invention to provide a data processing method for an information processing system, an information processing system, a storage medium, and a program, which can prevent the aforementioned problems in a device or system which remote-controls the aforementioned digital multiple device from a manipulation unit of an information processing device such as a remote computer or the like.

Furthermore, the digital multiple device has a plurality of functions such as a copy function, print function, and the like in addition to the data transmission function. Hence, it is still another object of the present invention to prevent undesirable troubles caused when the user operability and convenience of functions such as a copy function, print function, and the like other than the data transmission function are adversely influenced owing to the result of prevention of occurrence of the aforementioned problems, and to achieve both prevention of occurrence of the aforementioned problems and preservation of high operability of other functions of the information processing device.

It is still another object of the present invention to provide a user friendly and convenient device and system, which can meet various needs from users while achieving the aforementioned objects.

In order to achieve the above objects, the present invention provides an information processing system that includes a first information processing device comprising a display unit and a second information processing device which can execute output processing of data in storage means that can store a plurality of data, wherein the display unit of the first information processing device executes a display process which allows a user to identify an output data size of data which is to undergo the output processing by the second information device of data in the storage means, and the output processing of the data is then allowed to be executed.

In order to achieve the above objects, the present invention provides an information processing system including a first information processing device which comprises a display unit, and a second information processing device which can execute an output process of data in storage means that can store a plurality of data, wherein of a first sequence of permitting, after the display unit of the first information processing device is controlled to execute a display that allows a user to identify a data size upon outputting of data to be output by the second information processing device of the data in the storage means, execution of the output process of that data, and a second sequence of permitting the output process of the data without controlling the display unit of the first information processing device to execute the display that allows the user to identify the data size upon outputting of the data to be output by the second information processing device of the data in the storage means, the first sequence is executed when the user inputs a predetermined instruction at the first information processing device, and the second sequence of the first and second sequences is executed when the user does not input the predetermined instruction at the first information processing device.

In order to achieve the above objects, the present invention provides an information processing system including a first information processing device which comprises a display unit, and a second information processing device which can execute an output process of data in storage means that can store a plurality of data, wherein when the second information processing device has a plurality of functions including a print function of controlling a print unit to execute a print process of data in the storage means and a data transmission function of controlling communication means to execute a transmission process of data in the storage means to an external device, and when the data transmission function of the plurality of functions is selected, execution of a first sequence of permitting, after the display unit of the first information processing device is controlled to execute a display that allows a user to identify a data size upon outputting of data to be output by the second information processing device of the data in the storage means, execution of the output process of that data, is allowed, and when the print function of the plurality of functions is selected, execution of a second sequence of permitting the output process of the data without controlling the display unit of the first information processing device to execute the display that allows the user to identify the data size upon outputting of the data to be output by the second information processing device of the data in the storage means, is allowed.

In order to achieve the above objects, according to the present invention, even when the data transmission function of the plurality of functions is selected, execution of the second sequence is permitted in response to an instruction from the user input via the first information processing device.

In order to achieve the above objects, according to the present invention, when the data transmission function of the plurality of functions is selected, execution of the first sequence is automatically allowed.

In order to achieve the above objects, according to the present invention, when a computer as the first information processing device which can confirm status of the second information processing device and is remote from the second information processing device makes a manipulation for the second information processing device, the computer is allowed to input an instruction for controlling, after a display unit of the computer is controlled to execute a display that allows a user to identify a data size upon outputting of data to be output by the second information processing device, the second information processing device to execute the output process of the data.

In order to achieve the above objects, according to the present invention, when the display unit of the computer is controlled to execute the display that allows the user to identify the data size upon outputting of the data to be output by the second information processing device, the first information processing device transmits, to the second information processing device via communication means, an instruction that requests information associated with a data size upon outputting of data selected by the first information processing device of a plurality of data stored in the storage means of the second information processing device, the first information processing device receives the information output from the second information processing device in response to the instruction via the communication means, and the display unit of the computer is controlled to execute a display based on the information received by the first information processing device as the display that allows the user to identify the data size upon outputting of the data to be output by the second information processing device.

In order to achieve the above objects, according to the present invention, an instruction for controlling, after a display unit of a manipulation unit of the second information processing device itself, which serves as the first information processing device, is controlled to execute a display that allows the user to identify the data size upon outputting of data to be output by the second information processing device, the second information processing device to execute the output process of the data, is allowed to be input via the manipulation unit of the second information processing device itself.

In order to achieve the above objects, according to the present invention, when a computer as the first information processing device which can confirm status of the second information processing device and is remote from the second information processing device makes a manipulation for the second information processing device, the computer is allowed to input an instruction for controlling, after a display unit of the computer is controlled to execute a display that allows a user to identify data sizes upon outputting on the basis of a plurality of settings of data to be output by the second information processing device, the second information processing device to execute the output process of the data.

In order to achieve the above objects, the present invention provides an information processing system including a first information processing device which comprises informing means, and a second information processing device which can execute an output process of data in storage means that can store a plurality of data, wherein after information that allows a user to identify a data size upon outputting of data to be output by the second information processing device of the data in the storage means is informed by the informing means of the first information processing device, execution of the output process of that data is permitted.

In order to achieve the above objects, the present invention provides an information processing system including a first information processing device which comprises informing means, and a second information processing device which can execute an output process of data in storage means that can store a plurality of data, wherein after information that allows a user to identify a data size upon outputting of data to be output by the second information processing device of the data in the storage means is informed by the informing means of the first information processing device, a user is allowed to select via the first information processing device whether execution of the output process of the data is permitted or inhibited.

In order to achieve the above objects, the present invention provides an information processing system including a first information processing device which comprises informing means, and a second information processing device which can execute an output process of data in storage means that can store a plurality of data, wherein a user is allowed to set, via the first information processing device, a first processing condition, under which data to be output is output from the second information processing device to have a first data size, and is allowed to set, via the first information processing device, a second processing condition, under which data to be output is output from the second information processing device to have a second data size smaller than the first data size, and when the user sets the first processing condition via the first information processing device, the user is allowed to change a setting from the first processing condition to the second processing condition via the first information processing device, after information which allows the user to confirm that the data to be output is output to have the first data size is informed by the informing means of the first information processing device.

In order to achieve the above objects, according to the present invention, the first information processing device includes a device set at a remote site from the second information processing device, and can remotely manipulate the second information processing device.

In order to achieve the above objects, according to the present invention, the first information processing device includes a manipulation unit of the second information processing device itself, and the manipulation unit serving as the first information processing device can remotely manipulate the second information processing device.

According to the present invention, the user can confirm in advance the data size of data to be transmitted from an information processing device (e.g., a digital multiple device, digital camera, scanner, or the like) having a data transmission function. Hence, the effects which can prevent the problems posed when the amount of transmission data is large (e.g., that data includes color data and a large number of pages) can be prevented, and can also solve problems pointed out in the prior art can be provided.

For example, even when the aforementioned information processing device having the data transmission function is remote-controlled by another device, the above effects can be provided.

Also, for example, even in the device itself having the data transmission function, the above effects can be provided.

For example, when the aforementioned information processing device having the data transmission function has a plurality of functions such as a copy function, print function, and the like in addition to the data transmission function like a digital multiple device, the present invention can prevent troubles caused when the user operability and convenience of functions such as the copy function, print function, and the like other than the data transmission function are adversely influenced owing to the result of prevention of occurrence of the problems pointed out in the prior art. In this way, when the device having the data transmission function has a plurality of functions, both prevention of occurrence of the conventional problems, and preservation of high operability of other functions of the device can be achieved.

For example, a user friendly and convenient device and system, which can provide the aforementioned effects and can meet various needs from users while achieving the aforementioned objects can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flowchart showing the processing on the PC side in the first embodiment;

FIG. 8 is a flowchart showing the processing on the MFP side in the first embodiment;

FIG. 9B shows an example of a manipulation dialogue (RemoteUI dialogue) displayed on the PC display unit in the first embodiment;

FIG. 12 shows an example of a manipulation dialogue (RemoteUI dialogue) displayed on the PC display unit in the first embodiment;

FIG. 17C shows an example of a manipulation dialogue displayed on the MFP display unit in the second embodiment;

FIG. 20 is a flowchart showing the processing on the MFP side in the third embodiment.

DETAILED DESCRIPTION OF THE PREFERRED EMBODIMENTS

Figure 1:
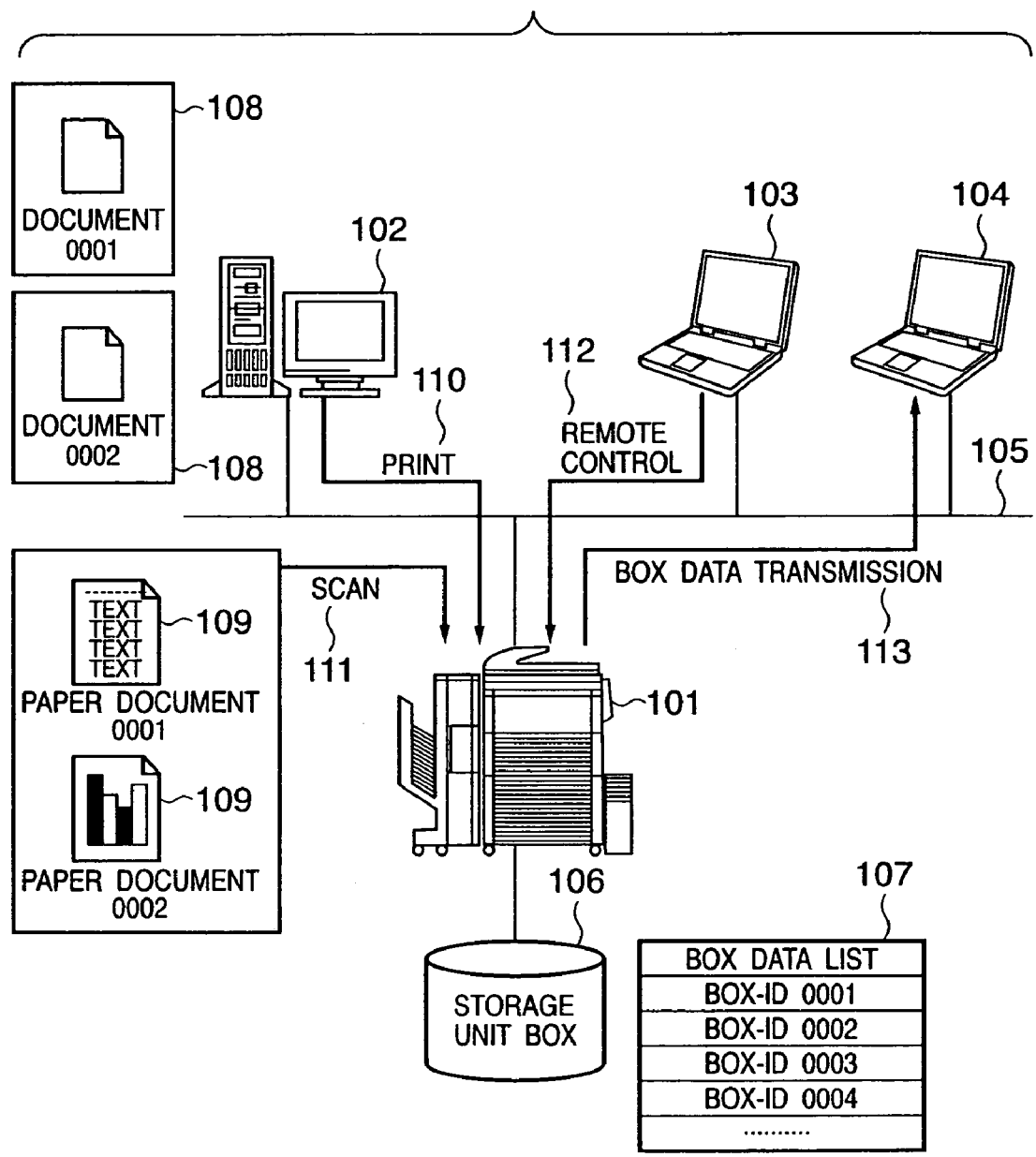
FIG. 1 is a schematic diagram of a system in the first embodiment.

Preferred embodiments of the present invention will be described in detail hereinafter with reference to the accompanying drawings.

First Embodiment

In the first embodiment of the present invention, a method of confirming the amount of transmission data (transmission data size or file size) before transmission upon transmitting image data stored in a box of an MFP to a host computer, in a system in which a host computer (an example of the first information processing device) and an image processing device of a multi-function type having a plurality of functions (i.e., a multi-function peripheral: to be abbreviated as an MFP; an example of the second information processing device) are connected via a communication medium such as a network or the like.

An MFP 101 of the first embodiment has a plurality of types of functions (to be also referred to as operation modes hereinafter) such as a copy function, print function, transmission function, and the like, and comprises various units such as a manipulation unit, a reader, a memory unit such as a hard disk or the like, an external I/F unit, a printer unit, and the like, and a controller unit that systematically controls these units. The controller unit can store image data (to be also referred to as job data hereinafter) input from the reader and/or job data which is input via the external I/F unit from another image processing device such as a host computer, another MFP, facsimile, or the like in the memory unit (e.g., a hard disk or the like) of the self device. The controller unit controls the printer unit of the self device to print the job data stored in the memory unit in accordance with a user's instruction from the manipulation unit of the self device or a remote manipulation from a manipulation unit of another information processing device such as a host computer or the like that remote-controls the self device, and controls to execute a data transmission processing to another device.

Note that the first embodiment will give an explanation mainly using an MFP as an image processing device having multiple functions, i.e., a plurality of functions such as a copy function, print function, box function, and the like in addition to a transmission function of transmitting input data to another device via a memory. However, this embodiment is not limited to such specific device, and may be applied to an image processing device of a single function such as at least a data transmission function or the like (i.e., a single-function peripheral; to be also abbreviated as an SFP hereinafter). The first embodiment will give an explanation using an image processing device of a type which includes a reader, printer unit, and the like in a single housing. However, this embodiment can also be applied to a separate type image processing device in which these units are housed in independent housings.

In this way, various device arrangements, system arrangements, and the like may be used. The first embodiment (and other embodiments to be described later) is not limited to specific arrangements as long as various manipulations and control to be described later can be implemented.

[System Arrangement of First Embodiment: FIG. 1]

FIG. 1 is a schematic diagram showing the arrangement of an information processing system according to the first embodiment. The system of this embodiment comprises information processing devices such as host computers and the like, and an information processing device such as an image processing device (including SFP or MFP) or the like. That is, an MFP 101 and host computers (to be also referred to as PCs hereinafter) 102 to 104 are connected via a communication medium such as a network 105 or the like so as to exchange various data.

The MFP 101 comprises a storage unit 106 such as a hard disk or the like. The storage unit 106 may be externally attached to the MFP or the like, or may be built in a single housing. The storage unit 106 such as a hard disk or the like of the MFP comprises a temporary area for temporarily storing image data by the copy function, and also a box area (to be referred to as a box hereinafter).

The box area of the storage unit 106 includes a plurality of boxes (e.g., 100 user boxes) which can be individually used by respective users. Each box can store image data fetched via the reader, and image data fetched from a computer or another image processing device via the network. That is, each box can store and save a plurality of image data (also called a plurality of job data or a plurality of document data).

In order to store data in each box, the user selects a box function at a manipulation unit (that of the image processing device when he or she makes a manipulation at the image processing device or that of the host computer when he or she makes a remote manipulation at the host computer or the like). In response to this selection, a controller unit (that of the MFP is mainly used in control when a manipulation is made at the MFP; or that of the host computer is mainly used in control when a remote manipulation is made at the host computer) controls the manipulation unit to display a box select dialogue that shows a list of a plurality of boxes so as to prompt the user to select one of the plurality of boxes of the MFP. After the user selects one of boxes via the dialogue, the controller unit controls to store a desired document of the user in that selected box.

When a data output operation from a give box is to be made (e.g., when data stored in the box is to be printed by the printer unit of the self device or data is to be transmitted from another device), the user selects the box function at the manipulation unit (that of the image processing device when he or she makes a manipulation at the image processing device or that of the host computer when he or she makes a remote manipulation at the host computer or the like). In response to this selection, the controller unit (that of the MFP is mainly used in control when a manipulation is made at the MFP; or that of the host computer is mainly used in control when a remote manipulation is made at the host computer) controls the manipulation unit to display the box select dialogue to prompt the user to select one of the plurality of boxes of the MFP. After the user selects one of boxes via the dialogue, the controller unit then controls the manipulation unit to display a job select dialogue that shows a list of a plurality of jobs so as to prompt the user to select a desired one of a plurality of independent job data (document data) stored in the selected box. The user can select not only one document to be output but also a plurality of documents that he or she wants at the same time via the job select dialogue. After the user selects the job via the job select dialogue, the controller unit controls the printer unit to print the selected job or to transmit that job to another device under the output conditions set by the user.

In this manner, the MFP of the first embodiment comprises the box function which can respond to a local manipulation from the manipulation unit of the self device and/or a remote manipulation from the information processing device such as the host computer or the like, using the storage unit 106 of the self device.

Respective image data stored in the boxes of the storage unit 106 undergo ID management like a box data list 107 as box data under the main control of the controller unit of the MFP. This box data list 107 may be stored in the storage unit 106 or in another memory. In either case, the box data list can be stored at any location as long as the controller unit can manage it.

Dotted lines 110 to 113 in FIG. 1 indicate the flows of processes/control, and these flows will be explained in turn below. The dotted line 110 indicates a series of processes for transferring application data 108, which is created on the host computer using its application such as document creation software, spreadsheet software, or the like, from the PC 102 to the MFP 101, controlling the MFP 101 to print it out, and saving image data in the storage unit 106 of the MFP 101 at that time.

The dotted line 111 indicates a series of processes for controlling the scanner of the MFP 101 to scan a paper document 109, and saving the image data scanned by the scanner in the storage unit 106. Note that the MFP 101 applies a unique compression process specified in the MFP 101 (or a compression process according to settings set by the user in advance) upon saving image data in the storage unit 106.

The dotted line 112 indicates a process for remote-controlling the MFP 101 using a user interface (to be referred to as RemoteUI hereinafter) used to make a remote manipulation from the PC 103 on the PC 103 side. The dotted line 113 indicates a series of processes for controlling the display unit of the PC 103 to display, e.g., the aforementioned RemoteUI, and transmitting image data saved in the storage unit 106 of the MFP 101 to the PC 104 in accordance with a user's instruction which is input via the RemoteUI on the PC 103. In this case, as described above, since image data saved in the storage unit 106 has undergone the unique compression process specified in the MFP 101, the image data is extended, undergoes a compression process of a general color image compression method (JPEG), and is then transmitted to the PC 104. The image transmitted to the PC 104 can be browsed using a general-purpose viewer of the PC 104 (which has a preview function of transferring data from the MFP to the PC and displaying the transferred image data on the display unit of the PC).

The first embodiment comprises a function of displaying a manipulation dialogue for the MFP 101 that allows the user to manipulate the MFP 101 from its manipulation unit on that manipulation unit (to be also referred to as a local UI function hereinafter), and a function of displaying a manipulation dialogue for the MFP 101 that allows the user to remotely manipulate the MFP 101 from an information processing device such as the host computer or the like on the manipulation unit of the information processing device such as the host computer or the like which can make data communications with the MFP 101 (to be also referred to as a remote UI function hereinafter). That is, even when the user makes a manipulation from the MFP 101 or a remote manipulation from a device such as a computer or the like, the user interfaces that allow similar user manipulations can be provided.

Figure 2:
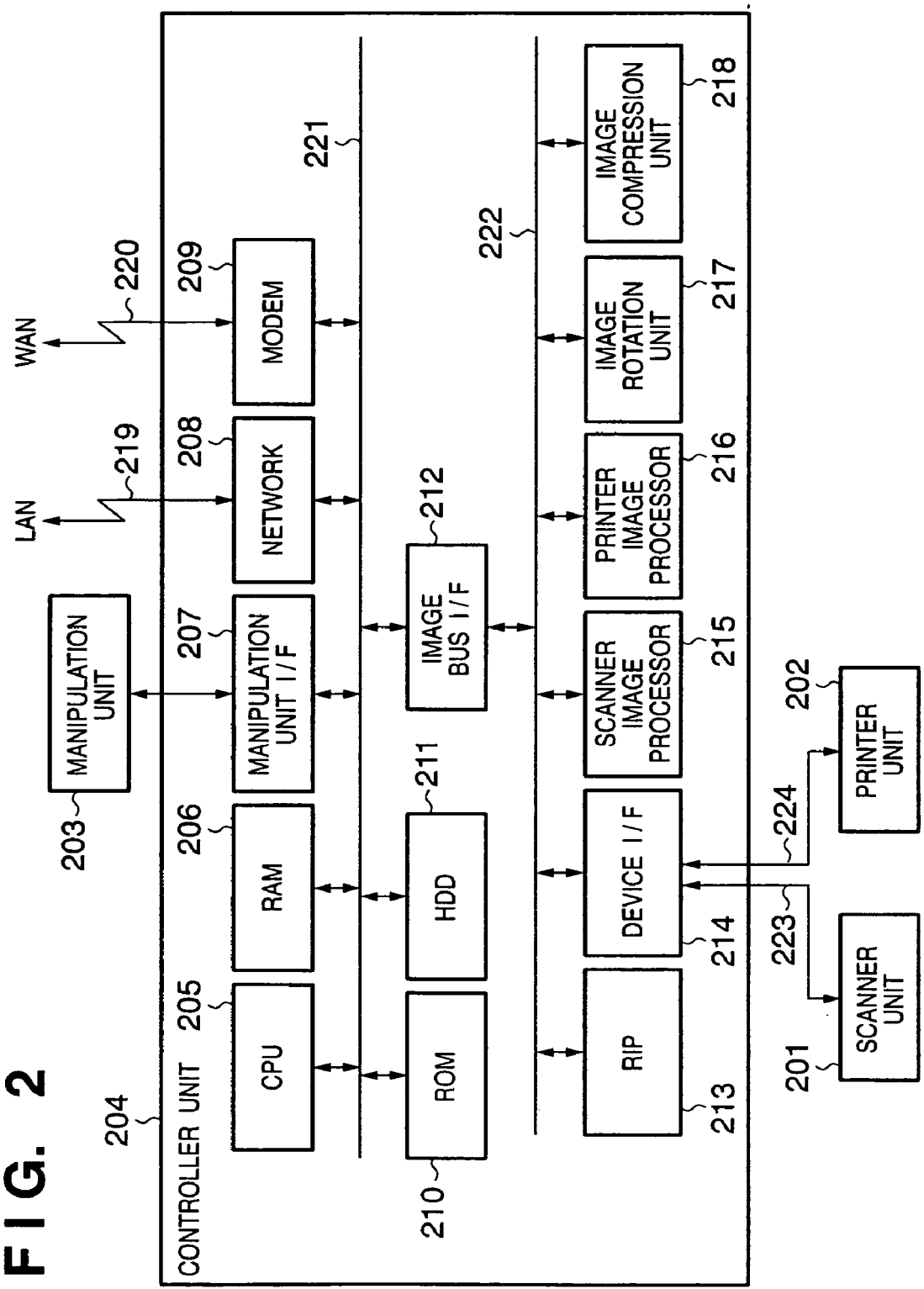
FIG. 2 is a block diagram for explaining the hardware arrangement of an MFP in the first embodiment.

(Detailed Hardware Arrangement of Image Processing Device (MFP): FIG. 2)

The detailed hardware arrangement of the MFP 101 in FIG. 1 will be described below using FIG. 2. The MFP 101 has a scanner unit 201 as an image input device, a printer unit 202 as an image output device, a controller unit 204 including a CPU, memory, and the like, a manipulation unit 203 as a user interface, and the like. The controller unit 204 is a controller which is connected to the scanner unit 201, printer unit 202, and manipulation unit 203, and is also connected to a LAN 219 and a public network (WAN) 220 as a general telephone network, thus inputting/outputting image information and device information. A CPU 205 is a controller which controls the overall system. A RAM 206 is a system work memory required to operate the CPU 205, and is also an image memory that temporarily stores image data. A ROM 210 is a boot ROM that stores a boot program of the system. An HDD 211 is a hard disk drive that stores system control software and image data. A manipulation unit I/F 207 is an interface unit with the manipulation unit (UI) 203, which outputs image data to be displayed on the manipulation unit 203 to it. Also, the manipulation unit I/F 207 sends information input by the user of this image processing device from the manipulation unit 203 to the CPU 205. A network 208 connects this image processing device to the LAN 219 and inputs/outputs information in a packet format. A modem 209 connects this image processing device to the public network 220 and inputs/outputs information after demodulation/modulation. The aforementioned devices are set on a system bus 221.

An image bus interface (I/F) 212 is a bus bridge which connects the system bus 221 and an image bus 222 that transfers image data at high speed to convert a data structure. The image bus 222 includes, e.g., a PCI bus or IEEE1394. The following devices are set on the image bus 222. A raster image processor (RIP) 213 parses PDL code data and rasterizes it to a bitmap image. A device I/F 214 connects, to the controller unit 204, the scanner unit 201 via a signal line 223 and the printer unit 202 via a signal line 224, which serve as the image input/output devices, so as to convert the synchronous/asynchronous system of image data. A scanner image processor 215 performs correction, modification, and edit of input image data. A printer image processor 216 performs correction, resolution conversion, and the like of print output image data to be output to the printer unit 202 in accordance with the printer unit 202. An image compression unit 218 applies a JPEG compression/extension process to multi-valued image data. Also, the image compression unit 218 applies a JBIG, MMR, or MH compression/extension process to binary image data. The detailed hardware arrangement of the MFP 101 in FIG. 1 has been explained.

Figure 3:
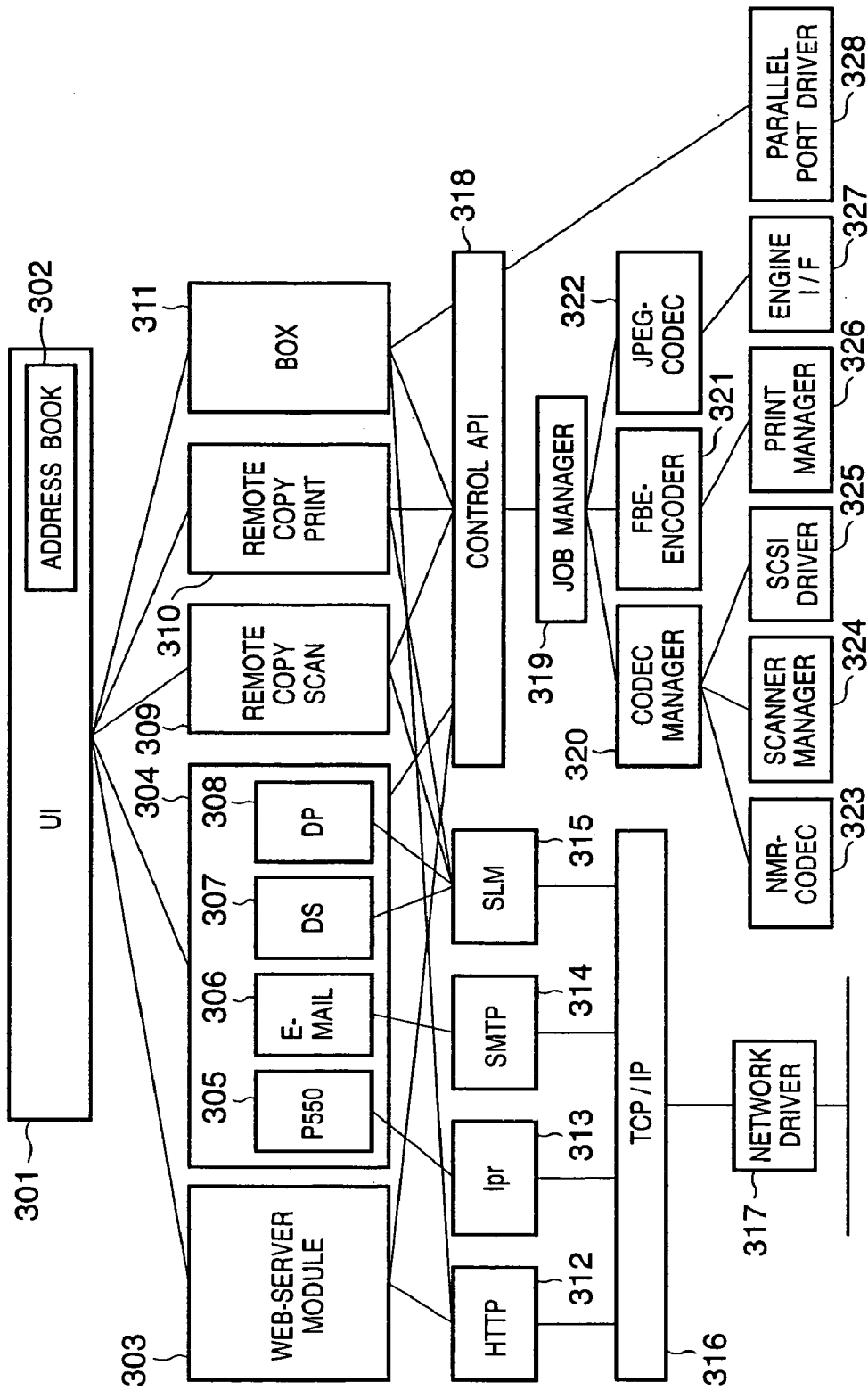
FIG. 3 is a diagram for explaining the software configuration of the MFP in the first embodiment.

(Software Configuration Installed in Controller Unit: FIG. 3)

The software configuration installed in the controller unit 204 in FIG. 2 will be explained below using FIG. 3. Reference numeral 301 denotes a user interface (to be abbreviated as UI hereinafter), which is a module that mediates the device and user manipulations when the operator makes various manipulations and settings to the MFP 101 using the manipulation unit 203. This module transfers input information to various modules to be described below in accordance with operator's manipulations to request processes, to set data, and so forth.

Reference numeral 302 denotes an Address-Book, i.e., a database module that manages destinations of transmission, destinations of communication, and the like of data. The contents of the Address-Book 302 undergo data addition, deletion, and acquisition by detecting a manipulation from the manipulation unit 203 by the UI 301, and are used to give the transmission/communication destination information of data to respective modules to be described below by an operator's manipulation.

Reference numeral 303 denotes a Web-Server module, which is used to notify management information of this MFP 101 in response to a request from a Web client (e.g., the PC 102). This management information is read via a Universal-Send module 304, Remote-Copy-Scan module 309, Remote-Copy-Print module 310, and Control-API 318 (all to be described later), and is sent to the Web client via an HTTP module 312, TCP/IP communication module 316, and Network-Driver 317 (all to be described later). The Web-Server module 303 generates information to be passed to the Web client as data in a so-called Web page (home page) format (e.g., an HTML format). Java, a CGI program, or the like is used as needed.

Reference numeral 304 denotes a Universal-Send module, i.e., a module that controls data delivery. The Universal-Send module 304 delivers data designated by the operator via the UI 301 to the designated destination of communication (output). When the operator instructs to generate delivery data using the scanner function of this MFP 101, the Universal-Send module 304 generates data by activating the scanner 201 of this MFP 101 via the Control-API 318 (to be described later). Reference numeral 305 denotes a module executed when the printer is designated as the destination of output in the Universal-Send module 304. Reference numeral 306 denotes a module executed when an E-mail address is designated as the destination of communication in the Universal-Send module 304. Reference numeral 307 denotes a module executed when a database is designated as the destination of output in the Universal-Send module 304. Reference numeral 308 denotes a module executed when an MFP which is the same as this MFP 101 is designated as the destination of output in the Universal-Send module 304.

Reference numeral 309 denotes a Remote-Copy-Scan module, i.e., a module which executes a process equivalent to the copy function implemented by this MFP 101 alone by outputting image information scanned by the scanner 201 using the scanner function of the MFP 101 by designating a printer of another MFP connected via the network or the like as the destination of output of that image information. Reference numeral 310 denotes a Remote-Copy-Print module, i.e., a module which executes a process equivalent to the copy function similarly implemented by this MFP 101 alone by outputting image information, which is obtained to have image information scanned by a scanner of another MFP connected via the network or the like as an input source, using the printer function of the MFP 101. A box module 311 stores a scan image (image data input from the scanner) or PDL print image (image data input from an external device such as a host computer or the like) in an HDD (e.g., the storage unit 106), and provides a print process of the stored image by the printer function, a sending process of the image by the Universal-Send function, and management functions of documents stored in the HDD such as deletion, grouping (storage in an individual BOX), inter-BOX movement, inter-BOX copy, and the like. Note that the box module 311 provides a communication function using the HTTP module 312 and TCP/IP module 316.

Reference numeral 312 denotes an HTTP module which is used when this MFP 101 makes a communication by HTTP, and provides a communication function to the aforementioned Web-Server module 303 and box module 311 by the TCP/IP module 316 to be described later. Reference numeral 313 denotes a lpr module which provides a communication function to the printer module 305 in the Universal-Send module 304 by the TCP/IP module 316 to be described later. Reference numeral 314 denotes an SMTP module which provides a communication function to the E-mail module 306 in the Universal-Send module 304 by the TCP/IP module 316 to be described later. Reference numeral 315 denotes an SLM, i.e., Solution-Manager module, which provides a communication function to the database module 307 and DP module 308 in the Universal-Send module 304, and the Remote-Copy-Scan module 309 and Remote-Copy-Print module 310 by the TCP/IP module 316 to be described below.

Reference numeral 316 denotes a TCP/IP communication module, which provides a network communication function using the Network-Driver 317 (to be described below) to the aforementioned modules. Reference numeral 317 denotes a Network-Driver which controls units physically connected to the network. Reference numeral 318 denotes a Control-API which provides an interface with downstream modules (e.g., a Job-Manager 319 (to be described below) and the like) to upstream modules (e.g., the Universal-Send module 304 and the like). The Control-API 318 reduces the dependence between the upstream and downstream modules to improve their diversity. Reference numeral 319 denotes a Job-Manager, which interprets processes instructed from the various modules via the Control-API 318, and gives instructions to modules (320, 324, 326) to be described later. The Job-Manager 319 simultaneously manages various jobs executed in this MFP 101 as well as FAX job control.

Reference numeral 320 denotes a CODEC-Manager, which manages and controls various compression/extension processes of data during the processes instructed by the Job-Manager 319. Reference numeral 321 denotes an FBE-Encoder module, which compresses data scanned by a scan process executed by the Job-Manager 319 and a Scan-Manager 324 to be described later by an FBE format. Reference numeral 322 denotes a JPEG-CODEC module, which executes a JPEG compression process of scanned data and a JPEG extension process of print data in the scan process executed by the Job-Manager 319 and Scan-Manager 324, and a print process executed by a Print-Manager 326. Reference numeral 323 denotes an MMR-CODEC module which executes an MMR compression process of data scanned by the scanner, and an MMR extension process of print data to be output to the printer in the scan process executed by the Job-Manager 319 and Scan-Manager 324, and the print process executed by the Print-Manager 326.

Reference numeral 324 denotes a Scan-Manager, which manages and controls the scan process instructed by the Job-Manager 319. Reference numeral 325 denotes a SCSI driver, which makes a communication between the Scan-Manager 324 and the scanner unit 201 which is internally connected to this MFP 101. Reference numeral 326 denotes a Print-Manager, which manages and controls the print process instructed by the Job-Manager 319. Reference numeral 327 denotes an Engine-I/F, which provides an I/F between the Print-Manager 326 and the printer unit 202. Reference numeral 328 denotes a parallel port driver, which provides an I/F used when the box manager 311 outputs data to an output device (not shown) via a parallel port.

(Details of Address-Book: FIG. 3)

Details of the Address-Book 302 will be described below. This Address-Book 302 is saved in a nonvolatile storage unit (nonvolatile memory, hard disk, or the like) in the MFP 101, and describes features of other devices connected to the network. For example, the Address-Book 302 includes features listed below:

- official name or alias name of a device
- network address of a device
- network protocol supported by a device
- document format supported by a device
- compression type supported by a device
- image resolution supported by a device
- available paper sizes and paper feed stage information in case of a printer device
- folder name that can store documents in case of a server (computer) device Each application to be described later can detect the features of the destination of transmission on the basis of the information described in the Address-Book 302. The MFP 101 can transmit data with reference to this Address-Book 302. For example, a remote-copy application detects the resolution information supported by the device designated as the destination of transmission with reference to the Address-Book 302, applies known MMR compression to a binary image scanned by the scanner according to that resolution information, converts the compressed image into known TIFF (Tagged Image File Format) data, and transmits it to a printer device on the network via the SLM 303. A detailed description of the SLM 303 will be omitted. However, the SLM 303 is a kind of network protocol which includes device control information called a known Salutation-Manager and the like.

Figure 4:
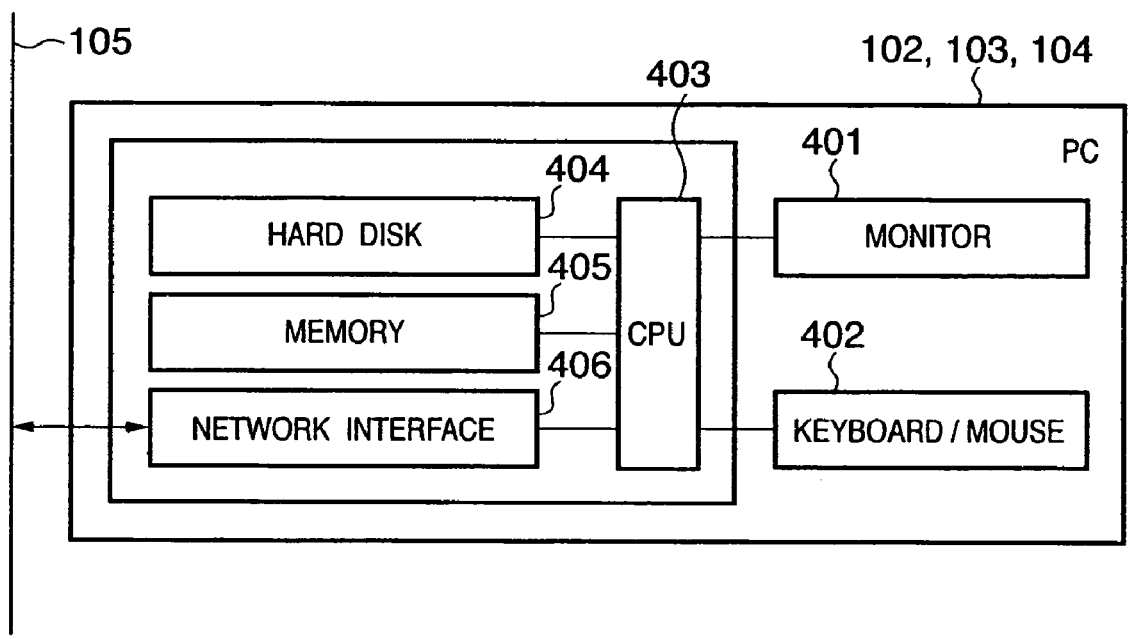
FIG. 4 is a block diagram for explaining the hardware arrangement of a PC in the first embodiment.

(Hardware Arrangement of Host Computer: FIG. 4)

The hardware arrangement of the host computers 102 to 104 in FIG. 1 will be described below using FIG. 4. The host computers 102 to 104 have the same arrangement, and a description will be made taking the host computer 102 as an example. The host computer 102 has the arrangement and functions of a general personal computer, and comprises a monitor 401 and keyboard/mouse 402 as peripheral devices, a central processing unit (CPU) 403 that controls the overall host computer 102, a hard disk 404 and memory 405 that store applications and data, and the like. The host computer 102 is connected to a communication medium such as the network 105 or the like via a network interface 406.

Figure 5:
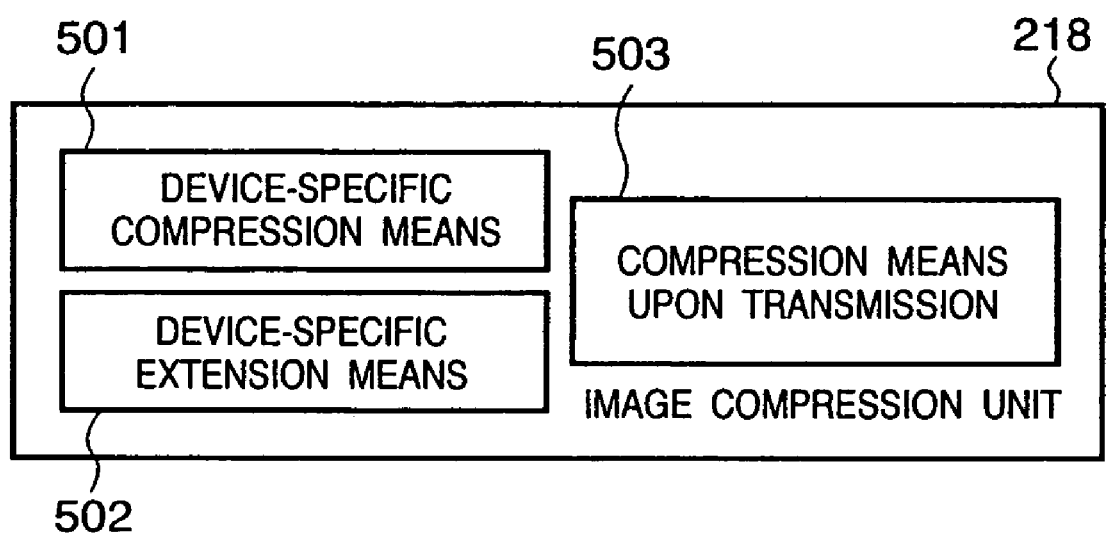
FIG. 5 is a schematic diagram of an image compression unit of the MFP in the first embodiment.

(Arrangement of Image Compression Unit: FIG. 5)

Compression unique to the device in the first embodiment will be described below using FIG. 5. FIG. 5 shows the internal arrangement of the image compression unit 218 shown in FIG. 2 that shows the hardware arrangement of the above-mentioned MFP 101. Reference numerals 501 to 503 respectively denote device-specific compression means, device-specific extension means, and compression means upon transmission. The device-specific compression means 501 is the one used when an image is saved in the HDD 211 in the MFP 101, and uses a device-specific compression method to achieve efficient use of memory resources upon rotating an image, in place of a general-purpose compression method. More specifically, the means 501 segments an image into tiles, and performs compression for respective tiles. The device-specific extension means 502 extends an image compressed by the device-specific compression means 501. The compression means 503 upon transmission adopts JPEG compression well known as a color encoding method, and an image compressed by the means 503 can be browsed by a viewer of an arbitrary host computer. In this embodiment, when an image saved in the HDD is to be transmitted to the host computer, the image compressed by the device-specific compression means 501 is extended using the device-specific extension means 502, and is then compressed by the compression means 503 upon transmission to transmit that image.

Details of the device-specific compression means 501 and extension means 502 will be described below. The device-specific compression means 501 comprises a compression block line buffer. In this compression block line buffer, an image is segmented into tiles (each tile size=M×N pixels), and each tile (M×N pixels) is encoded separately by discrete cosine transformation encoding (JPEG) as an encoding method of color information and runlength encoding as encoding of attribute flag data information. Note that M and N must be integer multiples of a window size for discrete cosine transformation encoding. In the JPEG compression method used in this embodiment, since the window size for compression is 8×8 pixels, for example, if M=N=32, a 32×32 pixel tile is further segmented into 16 8×8 pixel windows, and JPEG compression is applied for respective 8×8 pixels (Note that the following description will be given under the assumption of M=N=32, but the present invention is not limited to such specific values).

An encoder quantizes 16 8×8 pixel windows included in a tile image of 32×32 pixels by applying known DCT transformation. Quantization coefficients (to be referred to as a quantization matrix hereinafter) used in this case can be selectively set for each tile. A switching signal is input to an attribute flag encoder. A determination unit executes a determination process with reference to attribute flag data of 32×32 pixels corresponding to the above image data, generates a selection signal of quantization coefficients, and outputs it to the encoder. The attribute flag data is appended to each pixel. However, since the encoding method in an M×N pixel tile is constant as in this invention, the determination unit must analyze attribute flag data in the tile to determine a representative attribute of the tile.

The device-specific extension means 502 reads out data for M×N pixels of the compressed and stored attribute flag data, and decodes them using an attribute flag decoder. A decoder executes a decoding process of image data while switching a decoding parameter of the image data (a dequantization matrix in the present invention) in accordance with the decoding result of the attribute flag data, and outputs the decoding result to a line buffer. At this time, attribute flag data are decoded, a determination unit executes analysis and determination process of the decoded attribute flag data in the M×N pixels, and the decoder sets a dequantization matrix required to decode the corresponding image data of M×N pixels upon decoding. Since the attribute flag data are compressed by a lossless compression method such as runlength encoding free from any deterioration of data, the determination result for an identical tile upon encoding becomes equal to that upon decoding. Therefore, even when respective tiles are quantized using different quantization coefficients, dequantization coefficients suited to these tiles are set upon decoding. Hence, correct decoded image data can be obtained.

Figure 6:
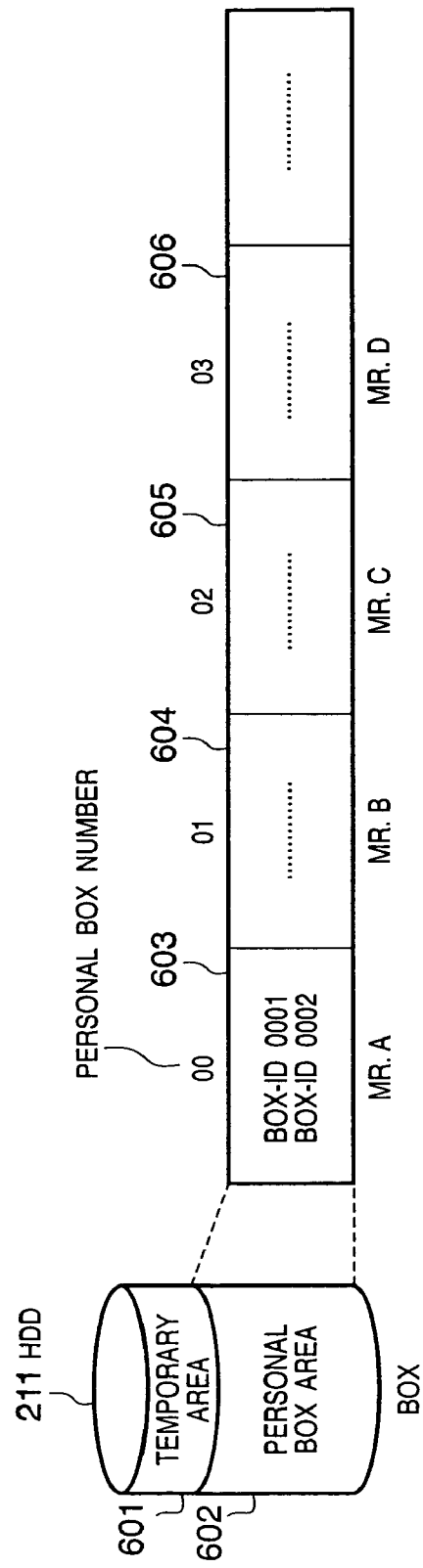
FIG. 6 is an explanatory view of a box of the MFP in the first embodiment.

(Overview of Box: FIG. 6)

An overview of the box in the first embodiment will be described below using FIG. 6. Reference numeral 211 in FIG. 6 denotes a hard disk (HDD) of the MFP 101 described using FIG. 2, which is used to store system control software and image data. The HDD 211 is divided into a temporary area 601 as an area in which image data are temporarily stored, and are erased after a job ends, and a personal box 602. The personal box 602 is the same as the storage unit 106 in FIG. 1. The personal box 602 is used separately like 603 to 606. Respective personal boxes are assigned numbers. For example, the boxes 603, 604, 605, and 606 are respectively assigned box numbers 00, 01, 02, and 03. The box 603 indicates that box number 00 is possessed by Mr. A. The box with box number 00 stores a plurality of box data, which are managed using IDs. BOX-IDs 0001 and 0002 are the same as BOX-IDs in the box data list 107 in FIG. 1.

[Confirmation Method of Transmission Data Size, and Control Method of Transmission and Printing: FIGS. 7 to 12]

The confirmation method of the transmission data size and the control method of transmission and printing in the first embodiment will be described below using FIGS. 7 to 12. FIG. 7 is a flowchart on the PC 103 side as an example of the first information processing device in FIG. 1, and FIG. 8 is a flowchart on the MFP 101 side as an example of the second information processing device in FIG. 1. FIG. 7 shows the flowchart executed when image data saved in the storage unit 106 of the MFP 101 is to be transmitted to the PC 104 as another device different from the image processing device using the RemoteUI function of the PC 103. Especially, FIG. 7 shows the method of allowing the user to confirm the transmission data size before transmission.

(Processing of Host Computer (PC): FIG. 7)

The following explanation will be given with reference to FIG. 7 while using FIGS. 8 to 12. Note that this control is executed by the controller unit of the PC 103 (corresponding to the CPU 403 of the PC 103 in FIG. 4 in this example) and the controller unit of the MFP 101 (corresponding to the CPU 205 of the MFP 101 in FIG. 2 in this example) in collaboration with each other via data communications. Alternatively, one of these controller units may be configured to control all operations.

Note that the RemoteUI function implements a remote manipulation when the PC 103 serves as a Web client and makes an HTTP communication with the Web server of the MFP 101 using a Web browser function of the PC 103, as described above in the paragraphs of the software configuration of the MFP 101 in FIG. 3.

In step S701, the PC 103 is controlled to launch the RemoteUI function in response to a launch instruction of the RemoteUI function from the user at the manipulation unit of the PC 103. The user inputs, using the keyboard of the PC 103, an IP address of the MFP 101 in an IP address input column (not shown) used to input the IP address of the device to be remotely manipulated on a RemoteUI dialogue displayed on the manipulation unit of the PC 103, thus establishing connection from the PC 103 to the MFP 101. FIG. 9 shows a display example of the RemoteUI dialogue which is displayed on the display unit of the PC 103 by the RemoteUI function at that time under the main control of the controller unit of the PC 103. FIG. 9 shows a state of the dialogue when a user box managed using the storage unit 106 on the MFP 101 side is browsed on the display unit of the PC 103.

(Control of RemoteUI Dialogue: FIG. 9)

A control example of the RemoteUI dialogue to be displayed on the display unit of the PC 103 using the RemoteUI function will be described below. In response to a user's key manipulation, the controller unit of the PC 103 (corresponding to the CPU 403 of the PC 103 in FIG. 4 in this example) controls the display unit of the PC 103 (corresponding to the monitor 401 of the PC 103 in FIG. 4 in this example) to display a Web browser dialogue (manipulation dialogue in FIG. 9A). The user directly inputs the address of the MFP 101 in an address input column 9101 on the manipulation dialogue in FIG. 9A by the key manipulation, or he or she presses a button 9102 at the left end of the dialogue, thereby inputting an instruction for launching a RemoteUI of the MFP 101. Upon reception of this instruction, the controller unit of the PC 103 transmits a request command that requests various kinds of information (those on the MFP 101 side such as current status information, box information, and the like) to the MFP 101 via the network. When the MFP 101 receives the request command, the controller unit of the MFP 101 returns the information of the MFP 101 to the PC 103 via the network. When the PC 103 receives the information of the MFP 101, the controller unit of the PC 103 displays a RemoteUI of the MFP 101 on a display area 9103 of the display unit of the PC 103 on the basis of the received information. Note that the initial dialog can notify information that allows the user to identify the device name and location of the MFP 101, and the device status of the MFP 101, as shown in FIG. 9A (the dialogue of this example notifies the user that the MFP 101 can execute a print process and scanner process).

Figure 9A:
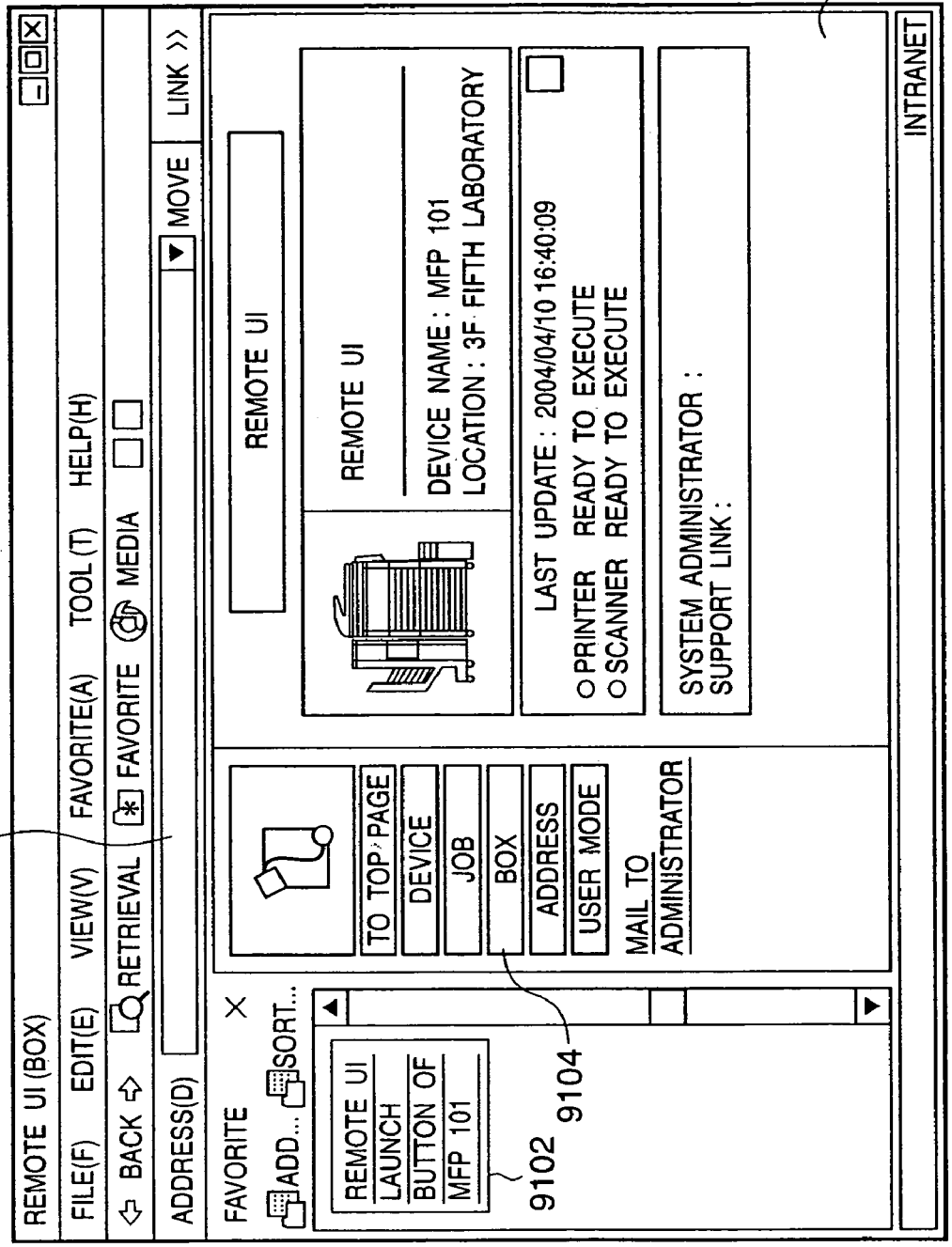
FIG. 9A shows an example of a manipulation dialogue (RemoteUI dialogue) displayed on a PC display unit in the first embodiment.

In response to clicking on a box function button 9104 on the left side of the display area 9103 on the manipulation dialogue of FIG. 9A by the user's key manipulation (using a pointing device such as a mouse or the like of the PC 103), the controller unit of the PC 103 displays, on the display area 9103 of the display unit of the PC 103, a box selection dialogue (manipulation dialogue of FIG. 9B) used to select one of a plurality of boxes included in a storage unit (the storage unit 106 in FIG. 1 in this example) of the image processing device (the MFP 101 in this example) designated by the user via the manipulation dialog in FIG. 9A displayed on the display unit of the PC 103. This information is display information, which is determined on the basis of the information of the MFP 101 (especially, the box information of the MFP 101) acquired from the MFP 101 by exchanging the aforementioned data with the MFP 101.

The box selection dialogue in the RemoteUI to be displayed on the display unit of the PC 103 in FIG. 9B comprises a box selection area 9105. This box selection area 9105 has a box information display field for displaying information that allows the user to identify various kinds of information (box number, the name of the user who uses the box, and data use amount) of each of a plurality of boxes (100 boxes in this example) in the storage unit (the storage unit 106 in this example) of the image processing apparatus (the MFP 101 in this example) designated on the above manipulation dialogue in FIG. 9A, and a box selection field that allows the user to select one of the plurality of boxes. The user clicks the box number of the box to be selected in the display portion of the box numbers given to respective boxes by a pointer or the like using the mouse of the PC 103, thus selecting that box.

The example of FIG. 9B notifies information that allows the user to identify that the user names are registered in three boxes with box numbers 00 to 02 of the plurality of boxes (100 boxes in this example) assigned in advance to the storage unit 106 of the MFP 101, job data (document data) are stored in boxes with box numbers 00 and 01, the use amounts of the boxes are 1%, 1%, and 0%, and so forth.

When the user selects one of boxes via the box selection dialogue of the RemoteUI of the PC 103 shown in FIG. 9B (when the user clicks the box number of one of boxes by the pointer), the controller unit of the PC 103 controls the display unit of the PC 103 to display a box document selection dialogue (see a manipulation dialogue example of FIG. 9C) that allows the user to select data to be output from job data (document data) stored in the box selected by the user via the box selection dialogue in FIG. 9B of a plurality of boxes included in the storage unit (the storage unit 106 in this example) of the image processing apparatus (the MFP 101 in this example) designated on the above manipulation dialogue in FIG. 9A in response to clicking. Note that FIG. 9C shows an example wherein the user selects the box with box number 01 and user name "ushiyama" on the box selection dialogue in FIG. 9B.

The controller unit of the PC 103 controls the display unit of the PC 103 to display, as a box document selection dialogue of the RemoteUI, a manipulation dialogue which has a device display area that notifies the user of the name of the designated image processing device, a document selection display area 902 which has a display column that displays information (document type information that allows the user to identify if a document is color or monochrome data, document name information, document size information, page count information, document storage date information, and the like) of various documents stored in the selected box, and a document selection column that allows the user to select one of these documents, and an instruction input column 901 that allows the user to select a process of the document selected from the display area 902.

Figure 9C:
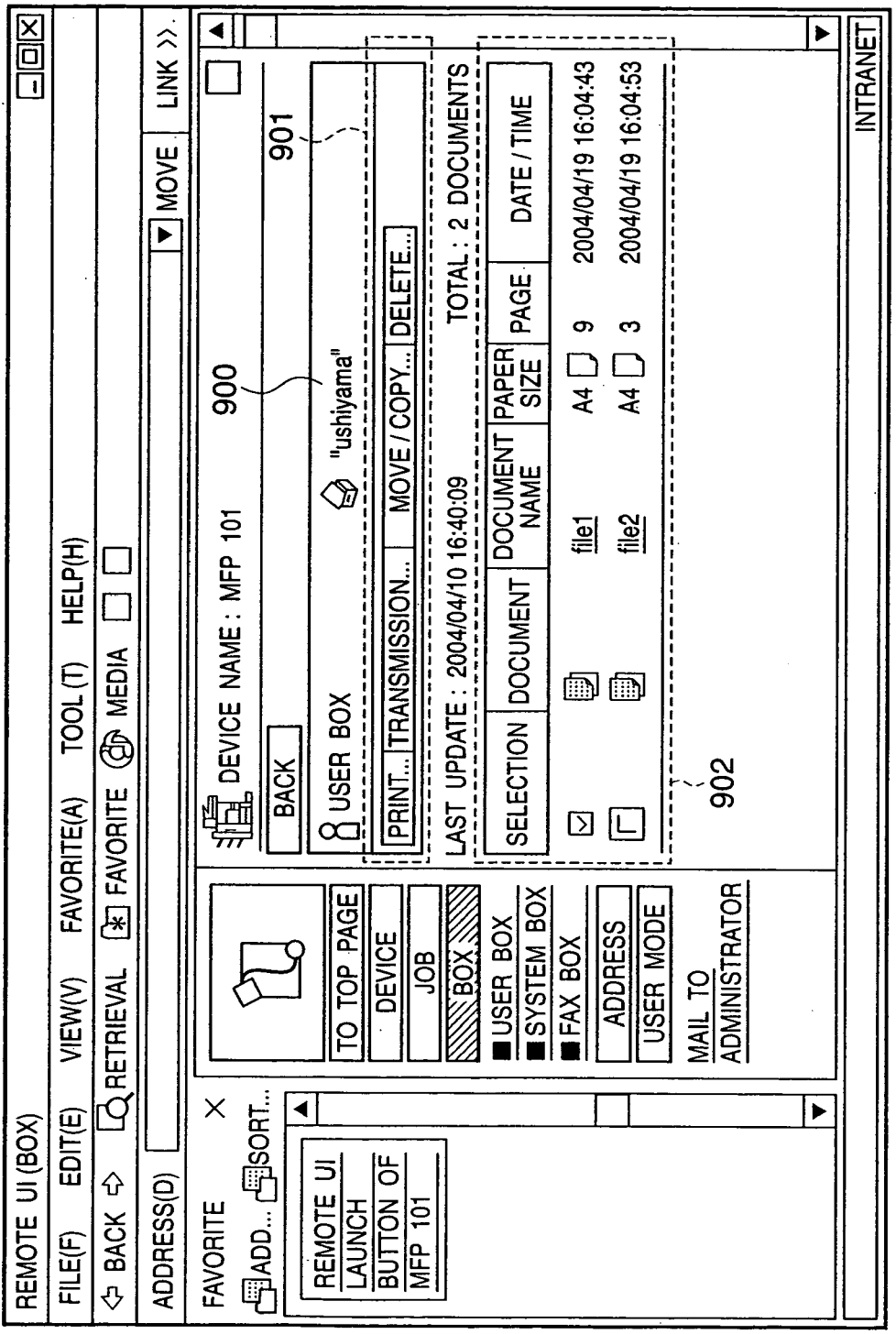
FIG. 9C shows an example of a manipulation dialogue (RemoteUI dialogue) displayed on the PC display unit in the first embodiment.

The box document selection dialogue example shown in FIG. 9C indicates that the device name of the device to be manipulated is the MFP 101, the box with box number 01 and user name "ushiyama" of the plurality of boxes in the storage unit 106 of the MFP 101 is selected, and this box saves two document data: information of the first document is displayed to allow the user to identify the document type=color data, file name=file1, document size=A4, page count=9, storage date=April 19, 2004, 16:04:43; and information of the second document is displayed to allow the user to identify the document type=monochrome data, file name=file2, document size=A4, page count=3, storage date=April 19, 2004, 16:04:53. In this example, the document selection display area 902 indicates that the user selects one document (file name: file1). Note that this document selection dialogue allows the user to select not only one document but also a plurality of documents. The user can make selection by checking selection columns of documents to be selected by the pointer or the like.

Furthermore, the box document selection dialogue example shown in FIG. 9C comprises the instruction input column 901. Via this input column 901, the user of the PC 103 can selectively input an instruction for executing one of the following operations ((1) to (4)).

(1) A document selected on the document selection column 902 is read out from the storage unit 106 of the MFP 101, and the printer unit of the MFP 101 executes a print operation of that document. In this case, the PC 103 transmits, as command data, box specifying information and document specifying information which allow the controller unit of the MFP 101 to specify a box and document designated on the PC 103, and print instruction information that instructs the MFP 101 to execute the print operation of the designated document, to the MFP 101 via the network.

(2) A document selected on the document selection column 902 is read out from the storage unit 106 of the MFP 101, and the MFP 101 transmits data of that document to another device (e.g., another MFP or PC) via a predetermined communication medium (e.g., a network or the like) (in this example, a remote manipulation is made at the PC 103 to transmit document data read out from the storage unit of the MFP 101 to the PC 104). In this case, the PC 103 transmits, as command data, box specifying information and document specifying information which allow the controller unit of the MFP 101 to specify a box and document designated on the PC 103, and transmission instruction information that instructs the MFP 101 to transmit the designated document to the destination of transmission designated at the PC 103, to the MFP 101 via the network. In this transmission mode, the first embodiment allows the user to know and confirm the data size of document data to be transmitted from the MFP 101 to the designated destination of transmission, and the user himself or herself can then determine whether or not the data transmission process is executed by the MFP 101. Hence, in this case, the PC 103 and MFP 101 can exchange data required to realize a series of operations via the network. This process will be described in detail later.

(3) Data of a document selected on the document selection column 902 is moved to another box in the storage unit 106 of the MFP 101. Alternatively, copy data of that document is further stored in another designated box or this box itself in the storage unit 106 of the MFP 101 (two identical data exist). In this case, the PC 103 transmits, as command data, box specifying information and document specifying information which allow the controller unit of the MFP 101 to specify a box and document designated on the PC 103, and data move (or copy) instruction information that instructs the MFP 101 to move or copy data of the designated document to the destination of movement designated by the user at the PC 103, to the MFP 101 via the network.

(4) A document selected on the document selection column 902 is erased from the selected box in the storage unit 106 of the MFP 101. In this case, the PC 103 transmits, as command data, box specifying information and document specifying information which allow the controller unit of the MFP 101 to specify a box and document designated on the PC 103, and data erase instruction information that instructs the MFP 101 to execute a data erase process of the designated document from the storage unit 106, to the MFP 101 via the network.

In this way, the user of the PC 103 can select the operation to be executed by the MFP 101 with respect to the document of user's choice in the box, which is selected by him or her from the storage unit 106 of the MFP 101, from a plurality of types of operations (print operation/transmission operation/move or copy operation/erase operation) that can be selectively executed via the instruction input column 901 in the manipulation dialogue in FIG. 9C, which is displayed on the display unit of the PC 103. Various remote manipulations of the MFP 101 from the PC are allowed. Note that this embodiment not only allows remote manipulations of the MFP 101 from the PC but also local manipulations from the manipulation unit of the MFP 101 itself (see other embodiments).

As described above, respective buttons (print, transmission, move/copy, and erase) of the instruction input column 901 on the document selection dialogue in the RemoteUI function in FIG. 9C indicate operations/commands with respect to files saved in the box displayed on the area 902. The area 902 indicates files and their information saved in the box, and selection columns, documents, document names, paper sizes, pages, dates, and the like are displayed. Note that document names file1 and file2 displayed on the area 902 are, for example, files corresponding to BOX-ID0001 and BOX-ID0002 of the box data list 107 in FIG. 1. In this way, association is made to manage data in the box using the box data list 107.

In step S702 in FIG. 7, a file saved in the aforementioned box is selected. This file selection will be explained taking the RemoteUI in FIG. 9C as an example. The user checks a desired selected column in the document selection display area 902 on the document selection dialogue in FIG. 9C using the pointing device such as the mouse or the like of the PC 103. In the example of FIG. 9C, the selection column corresponding to a document with document name file1 in the box with box number 01 in the storage unit 106 of the MFP 101 is checked, and it means that this document is selected. In this example, only one document is selected, but a plurality of documents can be selected via the document selection display area 902.

Whether the file selected in step S702 is to be transmitted or printed is selected in step S703. This transmission or print selection will be described taking the RemoteUI in FIG. 9C as an example. A plurality of instruction buttons include a button used to input a print instruction of the document selected by the user on the document selection display area 902, and a button used to input a transmission instruction of the document selected by the user on the document selection display area 902, via the instruction input column 901 on the document selection dialogue in FIG. 9C. When the user wants to print the document, he or she presses the print button (clicks that button using the mouse); when the user wants to transmit the document, he or she presses the transmission button (clicks that button using the mouse). Note that these buttons also include an instruction button to move/copy the document selected by the user on the document selection display area 902, and an erase instruction button to erase the document selected by the user on the document selection display area 902, via the instruction input column 901 on the document selection dialogue in FIG. 9C, as described above. Upon depression of one of these buttons, the selected file can be moved/copied, or erased.

If it is determined in step S703 that the user selects the print mode (e.g., if the user clicks the print button on the instruction input column 901 on the document selection dialogue in FIG. 9C), the flow advances to step S704, and the controller unit of the PC 103 controls the display unit of the PC103 to display a print setting dialogue (not shown) that allows the user to set various print conditions (a setting of the number of copies to be printed, a setting of one/two-sided printing, settings of any of a plurality of types of post-processes such as settings of a non-sort process, sort process, staple process, booklet process, punch process, and the like, a setting of a binding margin, a setting of a source tray, settings associated with the size and type of a paper sheet, a setting of an output tray, and so forth) upon printing the selected document by the MFP 101. Then, the user sets the print conditions via the print setting dialogue. The flow then advances to step S712. After the user sets the print conditions via the print setting dialogue, and inputs a print start instruction via that dialogue, the controller unit of the PC 103 transmits box designation information and document designation information, and print setting information, print instruction information, and the like from the user which are set via the print setting dialogue to the MFP 101 in association with each other, thereby controlling the MFP 101 to execute the print operation of the selected document (that is, corresponding to the document selected on the PC 103 from a plurality of documents in the box selected from a plurality of boxes in the storage unit 106 of the MFP 101) in accordance with the print conditions (step S712).

In this way, if the user selects the print mode in step S703, the file selected in step S702 is read out from the corresponding box in the storage unit 106 of the MFP 101, and is printed out by the MFP 101 on the basis of the print output settings in step S704. Strictly speaking, since step S712 is the process on the RemoteUI side of the PC 103, a print command is transmitted to the MFP 101, which receives this print command to print out the file. If the user instructs the print mode in this way, the controller unit on the PC 103 side and/or that on the MFP 101 side control/controls not to perform a size measurement process of the selected file (document) and a notification process of the measurement result to the user (i.e., to inhibit the file size measurement process and measurement result notification process), as will be described later. In this way, the usability of the functions of the MFP is prevented from impairing by preventing the MFP and PC from executing unnecessary processes, and preventing unwanted data exchange between the MFP and PC.

Figure 10:
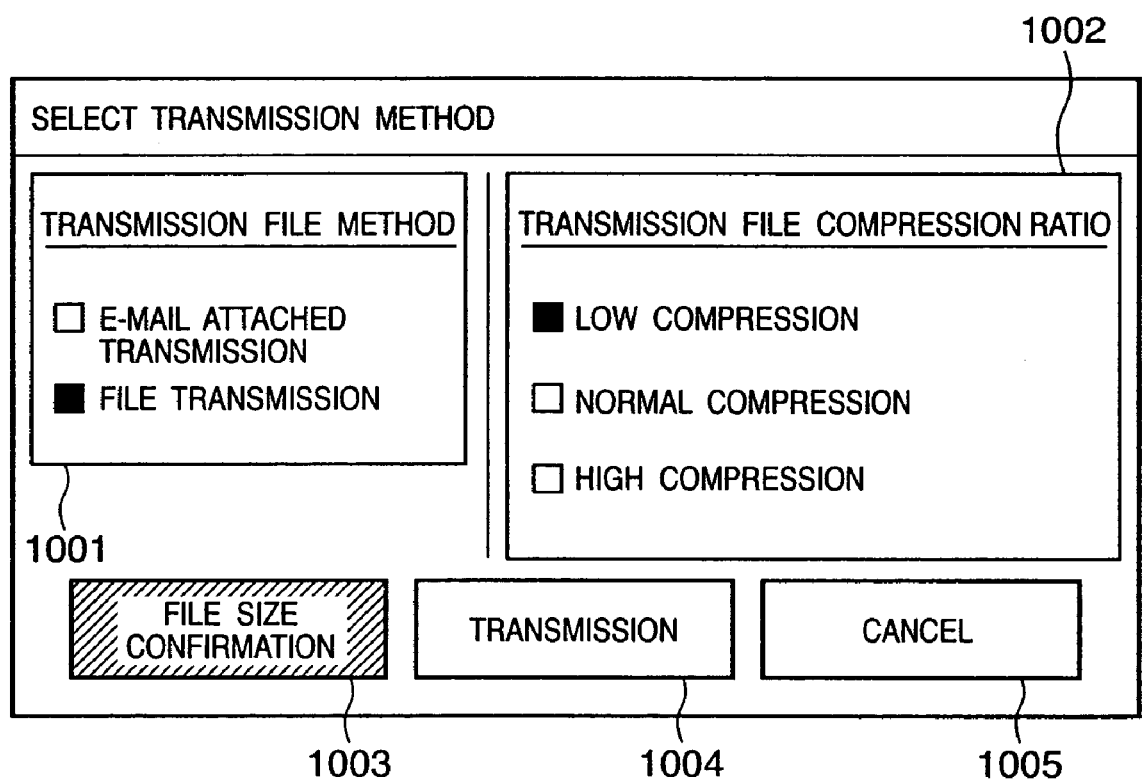
FIG. 10 shows an example of a manipulation dialogue (RemoteUI dialogue) displayed on the PC display unit in the first embodiment.

On the other hand, if the user selects the transmission mode in step S703 (e.g., if the user clicks the transmission button on the instruction input column 901 on the document selection dialogue in FIG. 9C), the flow advances to step S705. In step S705, the controller unit of the PC 103 controls the RemoteUI (the display unit of the PC 103) to display a transmission method selection dialogue that allows the user to select a data transmission method of the document (file) selected by the user via the document selection dialogue in FIG. 9C when the MFP 101 reads out the document from the box in the storage unit 106 and transmits it to the destination of transmission designated by the user. FIG. 10 shows an example of this transmission method selection dialogue.

(Transmission Method Selection Dialogue (Step S705): FIG. 10)

FIG. 10 shows an example of a dialogue box displayed on the RemoteUI dialogue (display unit of the PC 103) by the controller unit of the PC 103 in step S705 if it is determined in step S703 that the user selects the transmission mode (clicks the transmission button in the instruction input column 901) via the manipulation dialogue shown in FIG. 9C. In FIG. 10, a transmission file method (1001) and a file compression ratio (1002) can be selected for the selected file. As the transmission file method, E-mail attached transmission and file transmission can be selected. The E-mail attached transmission is a transmission method that transmits the selected file as an attached file of E-mail, and a title, message, and the like of E-mail can be separately input. The file transmission is a transmission method that transmits the selected file alone, and mainly indicates FTP or SMB file transmission. On the area 1001, file transmission is selected as an example. As the transmission file compression ratio, the JPEG compression ratio of data upon transmission can be selected, and low, normal, or high compression can be selected. On the area 1002, low compression is selected as an example. In this case, the JPEG compression ratio is exemplified, but an arbitrary image compression method may be used.

In addition, although not shown, on this dialogue or another dialogue to which this dialogue is changed, display that allows the user to set a destination (i.e., to which device the MFP 101 transmits data), data type (PDF, JPEG, TIFF), and the like is executed by the PC 103, and the user sets the destination and data type via the display. In this embodiment, the destination setting as the destination of data transmission and the setting of the data type themselves are handled as setting items (parameters) of transmission settings. In the description of the first embodiment, the data type upon transmission is JPEG. However, other data types may be used. For example, even when the data type is PDF, low, normal, or high compression can be selected. Even when the compression ratio cannot be selected, no problem is posed. Furthermore, although not shown, image processes (filter, background removal, resolution conversion, monochrome conversion) of the MFP 101 may be added as image process options of the transmission file method.

Reference numeral 1003 denotes a file size confirmation button as a point of the present invention; 1004, a transmission button; and 1005, a cancel button. If the user presses the file size confirmation button 1003, YES is determined in file size confirmation in step S706, and the flow advances to step S707. Processes in steps S707 to S710 will be described in detail later. On the other hand, if the user presses the transmission button 1004, NO is determined in step S706, and the flow advances to step S711. Furthermore, if the user selects transmission in step S711, the flow advances to step S713, and transmission is executed in step S713 on the basis of the destination, transmission file method, transmission file compression ratio, and data type, which are designated and selected in advance. Although not shown, if the user presses the transmission button 1004, transmission may be immediately made in step S713 without determining whether or not transmission is to be made in step S711. If the user presses the cancel button 1005, the process is canceled, and the flow returns to step S701.

In this way, when the user selects the document via the document selection display area 902 on the document selection dialogue in FIG. 9C, and inputs the transmission instruction of the document of user's choice via the transmission button in the instruction input column 901 on that dialogue, the controller unit of the PC 103 controls the display unit of the PC 103 to display the transmission setting dialogue shown in FIG. 10 which comprises various transmission setting instruction areas (e.g., including the instruction areas 1001 and 1002 in FIG. 10) that allows the user to set the transmission method of the document (e.g., the setting conditions associated with the transmission method of a transmission file, the setting conditions associated with the compression method of a transmission file, and various other transmission setting condition parameters such as the destination, data type, title, and the like in FIG. 10) upon transmission of data of the selected document from the MFP 101 to the destination (the PC 104 in this example) designated by the user.

Furthermore, after all the settings of the transmission method by the user are completed (settled) (the transmission settings need not always be settled), as shown in FIG. 10, and before data of the selected document is actually transmitted from the box of the MFP 101 to the device as the destination designated by the user, the controller unit of the PC 103 controls the display unit of the PC 103 to display actual data transmission (transfer) size information of the selected document to allow the user of the PC 103 to confirm the transmission data size upon actually transferring the selected document (file) from the MFP 101 to the device as the destination. In addition, the controller unit of the PC 103 controls the display unit of the PC 103 to make display (file size confirmation button 1003 in FIG. 10) that allows the user himself or herself to select whether or not the actual data transmission (transfer) size (the amount of data upon transmission of that data) information is to be displayed on the display unit of the PC 103. If the user inputs the size information display instruction via this display (file size confirmation button 1003 in FIG. 10), the controller unit controls the display unit of the PC 103 to display the size information. On the other hand, if the user does not input any size information display instruction via this display (file size confirmation button 1003 in FIG. 10), the controller unit controls to inhibit the size information from being displayed on the display unit of the PC 103, and controls to transmit the document selected from the box of the MFP 101 to the destination set by the user in accordance with the transmission process conditions (transmission method) set by the user via the transmission setting dialogue shown in FIG. 10 in response to the transmission instruction input via the transmission button 1004.

Note that the manipulation dialogue which has the transmission condition setting buttons (manipulation instruction areas 1001 and 1002) used to allow the user to set the transmission method, and the file size confirmation button 1003 is preferably displayed on the display unit, as shown in FIG. 10. Alternatively, display control may be made to independently display a manipulation dialogue which has the transmission condition setting buttons (manipulation instruction areas 1001 and 1002) and a manipulation dialogue having the file size confirmation button 1003. In either case, the controller unit of the PC 103 controls the display unit of the PC 103 to execute a first display (the instruction areas 1001, 1002, and the like in FIG. 10) that allows the user to execute transmission settings with respect to a document of user's choice via the manipulation dialogue of FIG. 9B from a plurality of document data stored in the storage unit 106 of the MFP 101, and to execute a second display (corresponding to the file size confirmation button 1003 in FIG. 10) that allows the user to determine whether or not he or she is notified, via the display unit of the PC 103, of the amount of data upon transmission of the selected document from the MFP 101 in accordance with the transmission conditions set by the user via the first display (the instruction areas 1001, 1002, and the like in FIG. 10). In this manner, problems of the prior art can be prevented. Moreover, the actual data size upon transmission is not automatically presented if the transmission mode is selected, but it is displayed if a user's request is input to respect the user's intention, thus providing a convenient device and system environments which meet various needs from users. Note that this embodiment has explained an example of the arrangement that allows remote manipulations of the MFP from the PC via the RemoteUI function. Hence, when the user presses the file size confirmation button 1003 at the PC, the PC 103 and MFP 101 execute the following control and data exchange.

A case will be explained in detail below wherein the user presses (clicks using the mouse) the file size confirmation button 1003 displayed on the display unit of the PC 103 (file size confirmation is to be made in step S706). The file size confirmation is means for confirming the data size for transmission in advance (to allow the user to confirm it before data is actually transmitted from the MFP to the destination), and controls to generate a transmission file but not to transmit it. In step S707, if the data size is too large, the compression ratio and the like can be re-set. For example, when the data size is presented to the user via the display unit of the PC 103, if the user determines on seeing that data size that the data size upon transmission is too large, control is made to allow the user himself or herself to redo the transmission settings of that document via the transmission method setting dialogue shown in FIG. 10.

In step S707, which compression ratio the user selects from a plurality of selection candidates (low compression/normal compression/high compression) via the instruction area 1002 on the transmission setting dialogue in FIG. 10 is confirmed. In the example of FIG. 10, the user selects low compression.

When the transmission setting dialogue in FIG. 10 is displayed on the display unit of the PC 103, low compression is selected as a default. However, any other compression ratios may be set as a default, as long as the user can select at least a desired compression ratio. In this way, this embodiment allows the user to select a series of transmission setting conditions including one or a plurality of setting items including a setting of a compression ratio via the user interface on the PC 103. If the file size confirmation instruction is input via the file size confirmation button 1003, the controller unit of the PC 103 confirms the setting contents of various transmission settings including that of the compression ratio set by the user.

The controller unit of the PC 103 transmits information to the MFP 101 in step S708, and controls the MFP 101 to execute the transmission file size measurement process and to return its measurement result to the PC 103. In this step, for example, the PC 103 transmits command data (including an execution instruction of the file size calculation process upon data transmission, and a return instruction of that calculation result) that instructs the MFP 101 to execute the following processes. That is, the controller unit of the MFP 101 mainly instructs to actually calculate the data size upon transmitting data of the document (file) in the box selected via the user interfaces (various UIs in FIGS. 9A to 10) of the PC 103 from the box of the MFP 101 to the destination device in accordance with the transmission process conditions (transmission method) set by that user, by controlling related units such as an image processing unit and the like of the MFP 101 to execute image processes and the like set by the user on an experimental basis, and to return the measurement result information from the MFP 101 to the PC 103. In order to make the MFP 101 execute such processes, various kinds of transmission setting information including the transmission file method, transmission file compression ratio, data type, and the like set by the user at the PC are transmitted to the MFP 101 via the network together with the above command data, so as to allow the controller unit on the MFP 101 side to determine the transmission conditions set by the user via the aforementioned user interface unit of the PC shown in FIG. 10. The file size measurement on the MFP 101 side will be described later.

In step S709, the PC 103 waits for reception of the measurement result data of the data size of the file upon data transmission from the MFP 101. If the PC 103 receives the measurement result data from the MFP 101 via the network, the controller unit of the PC 103 controls the display unit of the PC 103 to display the file size (corresponding to data size information upon transmission when data of the document selected by the user on the PC 103 side via the manipulation dialogue in FIG. 9C from the storage unit 106 of the MFP 101 is to be transmitted from the MFP 101 to the destination set by the user on the PC 103 side in accordance with the transmission process conditions set by the user on the PC 103 side via the user interface such as the manipulation dialogue in FIG. 10 and the like) on the basis of the measurement result data in step S710.

Figure 11:
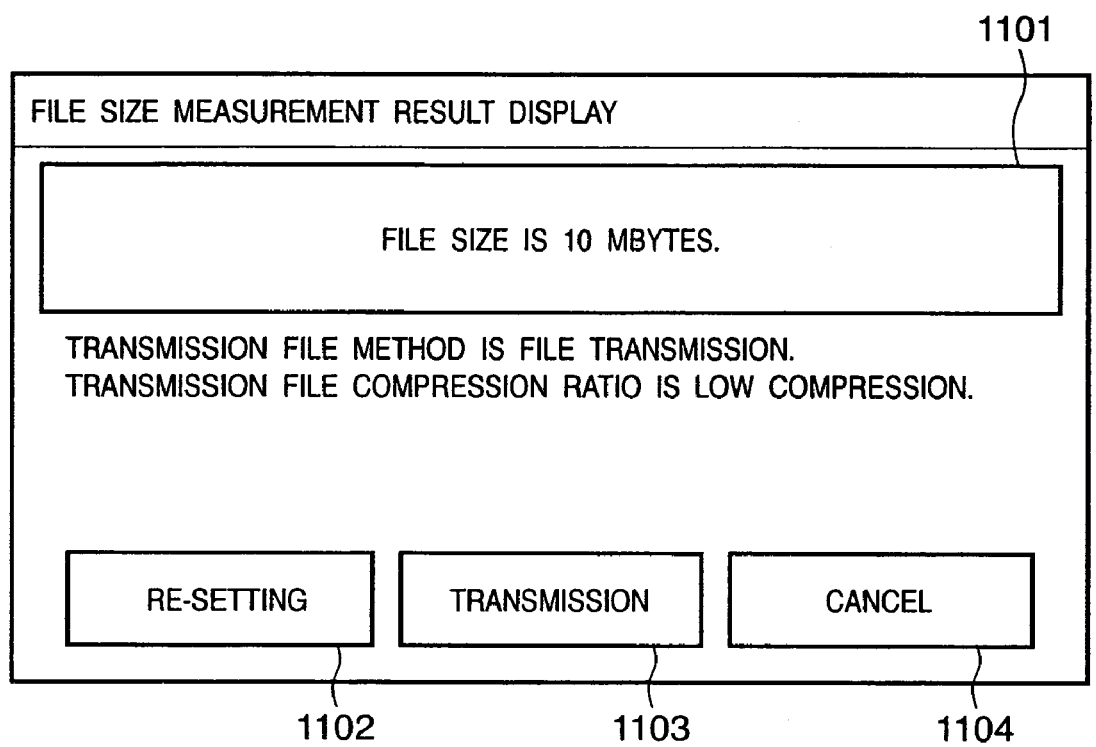
FIG. 11 shows an example of a manipulation dialogue (RemoteUI dialogue) displayed on the PC display unit in the first embodiment.

(Display Dialogue of Communication File Size: FIG. 11)

FIG. 11 shows an example of a dialogue box displayed on the RemoteUI dialogue (display unit of the PC 103) at that time. The controller unit of the PC 103 controls the display unit of the PC 103 to display a manipulation dialogue shown in FIG. 11 which comprises a file size measurement result display area 1101 that can display, file size measurement result information, which allows the user to confirm the data size (calculated by the MFP 101) upon transmission of the file when data of the file selected by the user of the PC 103 from a plurality of files (documents; also called document data or image data) stored in the storage unit 106 of the MFP 101 is transmitted from the MFP 101 in accordance with the transmission conditions (various transmission condition parameters including a transmission file method setting, transmission file compression ratio setting, and the like) set by the user of the PC 103 (in a state wherein data is not actually transmitted from the MFP 101 to another device).

In addition, the controller unit of the PC 103 controls the display unit of the PC 103 to execute a display (corresponding to the display area 1101 in FIG. 11; to be also referred to as a third display hereinafter) of file size information which makes the user confirm the file size measurement result and indicates it, and a display of transmission setting condition information (to be also referred to as a fourth display hereinafter) that makes the user himself or herself confirm the transmission conditions set by himself or herself via the user interfaces in FIG. 10 and the like, i.e., that makes the user himself or herself of the PC 103 confirm the transmission conditions used upon transmission of this file (the transmission conditions set by the user). This example notifies the user that the transmission method of this file is file transmission and the set compression ratio is low compression on the basis of the settings via the UI in FIG. 10. Note that other transmission conditions (not shown) may be displayed to make the user confirm them.

Furthermore, the controller unit of the PC 103 controls the display unit of the PC 103 to display a transmission button 1103 (to be also referred to as a fifth display hereinafter) in FIG. 11, which allows the user of the PC 103 to input an instruction to the MFP 101 so as to transmit the file of interest (to permit transmission) from the MFP 101 to the destination (in this example, the file is to be transferred to the PC 104) designated by the user of the PC 103 in accordance with the transmission conditions presented on the fourth display (display of transmission setting condition information; not shown), after the controller unit of the PC 103 makes the user of the PC 103 confirm the transmission conditions set by himself or herself via the aforementioned fourth display (display of transmission setting condition information; not shown) and also makes the user himself or herself confirm in advance, via the third display (the display area 1101 in FIG. 11), the data size upon transmission of the file (document) designated on the above dialogue in FIG. 9C from the MFP 101 to the destination device under these setting conditions.

Moreover, the controller unit of the PC 103 controls the display unit of the PC 103 to display a cancel button 1104 (to be also referred to as a sixth display hereinafter) in FIG. 11, which allows the user of the PC 103 to input a cancel instruction to the PC 103 and/or the MFP 101 so as not to transmit the file of interest (to inhibit transmission) from the MFP 101 to the destination (in this example, the file is to be transferred to the PC 104) designated by the user of the PC 103 in accordance with the transmission conditions presented on the fourth display (display of transmission setting condition information; not shown), after the controller unit of the PC 103 makes the user of the PC 103 confirm the transmission conditions set by himself or herself via the aforementioned fourth display (display of transmission setting condition information; not shown) and also makes the user himself or herself confirm in advance, via the third display (the display area 1101 in FIG. 11), the data size upon transmission of the file (document) designated on the above dialogue in FIG. 9C from the MFP 101 to the destination device under these setting conditions.

In addition, the controller unit of the PC 103 controls the display unit of the PC 103 to display a re-setting button 1102 (to be also referred to as a seventh display hereinafter) in FIG. 11, which allows the user of the PC 103 to input an instruction to the PC 103 and/or the MFP 101 so as not to transmit the file of interest (to inhibit transmission) from the MFP 101 to the destination (in this example, the file is to be transferred to the PC 104) designated by the user of the PC 103 in accordance with the transmission conditions presented on the fourth display (display of transmission setting condition information; not shown), and to re-set, by the user himself or herself of the PC 103, the transmission conditions already set by the user of the PC 103 via the user interface in FIG. 10 and the like, which include those presented on the fourth display (display of transmission setting condition information; not shown), after the controller unit of the PC 103 makes the user of the PC 103 confirm the transmission conditions set by himself or herself via the aforementioned fourth display (display of transmission setting condition information; not shown) and also makes the user himself or herself confirm in advance, via the third display (the display area 1101 in FIG. 11), the data size upon transmission of the file (document) designated on the above dialogue in FIG. 9C from the MFP 101 to the destination device under these setting conditions.

The aforementioned processes are executed by the controller unit of the PC 103 in step S710.

If the user who confirms the data size upon transmission via the third display (the display area 1101 in FIG. 11) of the PC 103 inputs the transmission instruction via the fifth display (the transmission button 1103 in FIG. 11) (if he or she clicks the transmission button 1103), the controller unit of the PC 103 controls the MFP 101 to execute the data transmission process in accordance with the processing conditions set by the user of the PC 103 on the above transmission setting dialogue such as the UI in FIG. 10 and the like, which include the transmission conditions presented on the fourth display (display of transmission setting condition information; not shown) (corresponding to a case wherein the controller unit of the PC 103 executes the checking process in step S711, and since the checking result in step S711 is YES, it executes the process in step S713).

On the other hand, if the user who confirms the data size upon transmission via the third display (the display area 1101 in FIG. 11) of the PC 103 inputs the cancel instruction via the sixth display (the cancel button 1104 in FIG. 11) (if he or she clicks the cancel button 1104), the controller unit of the PC 103 controls to inhibit the MFP 101 from executing the data transmission process in accordance with the processing conditions set by the user of the PC 103 on the above transmission setting dialogue such as the UI in FIG. 10 and the like, which include the transmission conditions presented on the fourth display (display of transmission setting condition information; not shown) (corresponding to a case wherein the processing in FIG. 7 ends although not shown in FIG. 7).

On the other hand, if the user who confirms the data size upon transmission via the third display (the display area 1101 in FIG. 11) of the PC 103 inputs the re-setting instruction of the transmission conditions via the seventh display (the re-setting button 1102 in FIG. 11) (if he or she clicks the re-setting button 1102), the controller unit of the PC 103 controls to inhibit the MFP 101 from executing the data transmission process in accordance with the processing conditions set by the user of the PC 103 on the above transmission setting dialogue such as the UI in FIG. 10 and the like, which include the transmission conditions presented on the fourth display (display of transmission setting condition information; not shown), and to allow the user of the PC 103 to re-set the already set transmission conditions. In this case, the controller unit of the PC 103 controls the display unit of the PC 103 to re-display the transmission setting dialogue such as the UI of FIG. 10 or the like that allows the user to set the transmission conditions (corresponding to a case wherein the controller unit of the PC 103 executes the checking process in step S711, and since the checking result in step S711 is NO, the flow returns to the process in step S707). The transmission condition re-setting process can be repeated again and again.

In this manner, for example, when the user intentionally or unintentionally sets first transmission processing conditions (e.g., low compression setting) that transmit data with a first transmission data size (e.g., 12 Mbytes) from the MFP 101 at the manipulation unit (monitor 401 and keyboard 402) of the PC 103, the controller unit of the PC 103 executes an informing process of the size information on the manipulation unit (monitor 401) of the PC 103 to make the user recognize that 12-Mbyte data is transmitted under such settings via the manipulation unit (monitor 401) of the PC 103. The user who knows that fact changes settings to second transmission processing conditions (from low compression setting to high compression setting) that assure a second transmission data size (e.g., 4 Mbytes) smaller than the first transmission data size via the manipulation unit (monitor 401 and keyboard 402) of the PC 103. The controller unit of the PC 103 executes the informing process of the size information again on the manipulation unit (monitor 401) of the PC 103, thus making the user confirm that 4-Mbyte data is transmitted under the second transmission processing conditions after the settings are changed. After that, the controller unit of the PC 103 allows the user to input a data transmission instruction to a desired destination with the data size of 4 Mbytes via the manipulation unit (monitor 401 and keyboard 402) of the PC 103, and controls the MFP 101 to execute the data transmission operation based on that instruction.

Of course, if the user of the PC 103 who makes a remote manipulation of the MFP 101 via the RemoteUI examines his or her convenience, the current time zone, network condition, the condition, ability, and performance of the destination of transmission, and the like, and determines that no problem is posed if data with the first transmission data size is transmitted, he or she can input an instruction to transmit desired data from the MFP 101 to a desired destination under the first transmission processing conditions. In this manner, data can be transmitted by the data transmission method more convenient for the user.

In the first embodiment, the controller unit of the PC 103 controls the display unit of the PC 103 to make the first to third displays on a single dialogue (see FIG. 11), as shown in FIG. 11. However, this embodiment is not limited to such display mode. For example, the controller unit may control to make respective displays on independent dialogues or may control to make some displays on a given dialogue and the remaining displays on another dialogue. In this manner, various display modes may be used unless they depart from the aforementioned arrangement and effect.

Via a series of processes of the flow such as steps S706 to S713 in FIG. 7 and the like, the user of the PC 103 can make transmission confirmation based on the file size measurement result, i.e., he or she can determine whether data is transmitted intact or the transmission conditions are to be re-set.

If the user presses the transmission button 1103, YES is determined in the transmission confirmation process in step S711, and the transmission process is executed in step S713. Strictly speaking, since step S713 is the process on the RemoteUI side of the PC 103, a transmission command is transmitted to the MFP 101, which executes the transmission process upon reception of this transmission command.

If the user presses the re-setting button 1102 to re-set the conditions, NO is determined in the transmission confirmation process in step S711, and the flow returns to step S707. In this step, the user changes the transmission file compression ratio to normal compression, as shown in, e.g., FIG. 12. If the user presses the file size confirmation button 1003 again on the dialogue shown in FIG. 12, the controller unit controls to execute, in turn, file size measurement again by the MFP 101 side on the basis of the transmission conditions which are re-set (changed) on the dialogue shown in FIG. 12, and re-displays the file size after the settings of the transmission conditions are changed in step S710. If the user presses the cancel button 1104 (although not shown in the flowchart of FIG. 7), the control is made to cancel transmission, and to return the flow to step S701 or S703.

In the first embodiment, a high compression setting as one of the transmission setting conditions means that the MFP 101 is controlled to transmit data while the amount of data (data size) upon transmission of the selected file (document) is set to be smaller than those in case of normal compression and low compression (to reduce the data size). On the other hand, low compression means transmission is made by applying nearly no compression process, i.e., the MFP 101 is controlled to transmit data while the amount of data (data size) upon transmission of the selected file (document) is set to be larger than those in case of normal compression and high compression. Normal compression is a setting near the middle between the low compression and high compression.

For example, when the amount of data of the document selected on the dialogue in FIG. 9C (this amount of data is the data size of a file before the transmission process; that is, the amount of data when this file is stored in the box; to be also referred to as a raw data size hereinafter) is, for example, 12 Mbytes, and a low compression setting is made, as shown in FIG. 10, that file has a file size of 10 Mbytes upon transmission. On the other hand, when a normal compression setting is made, as shown in FIG. 12, that file has a file size of 6 Mbytes upon transmission. Also, when a high compression setting is made, that file has a file size of 1 Mbyte upon transmission. Then, the controller unit of the PC 103 and/or that of the MFP 101 control/controls to transmit data of the file with such file size. According to this embodiment, as described above, the user himself or herself of the PC 103 can selectively designate the data size upon executing the data transmission process of data in the storage unit 106 of the MFP 101 from the MFP 101 by the user's remote manipulation from the PC 103. On the premise of such arrangement, the user himself or herself of the PC 103 can be notified of the data size of his or her choice upon transmission.

As described above, the first embodiment does not merely present the amount of data of a file stored in the storage unit (box) 106 of the MFP 101 to the user (even when the size of data stored in the memory is merely presented to the user, the conventional problems cannot be solved). In order to solve the conventional problems, this embodiment can present, to the user, the amount of data upon actual transmission of a file stored in the box before the transmission process. After that, the user himself or herself can determine whether or not the transmission process is to be executed (permission/inhibition), and can redo (re-set) settings of the transmission conditions as needed.

In the first embodiment, for example, the amount of data of a file (raw data size before the MFP 101 executes image processes and the like including a compression process and the like so as to transmit that file from the MFP 101; 12 Mbytes in the above example) stored in the storage unit (box) 106 of the MFP 101 is defined as data amount (data size)

information of a first type. On the other hand, information of the amount of data upon transmission of that file after the MFP 101 executes image processes for the transmission process so as to transmit that data (in the above example, 10 Mbytes for low compression, 6 Mbytes for normal compression, and 1 Mbyte for high compression) is defined as data amount (data size) information of a second type. In this embodiment, display control is made to notify the user of the data size information of the second type in distinction from that of the first type. Of course, the control may be made to display the data amount information of the first type on the user interface unit such as the display unit or the like of the PC 103 in accordance with a user's instruction (in this case, information indicating that the amount of raw data is 12 Mbytes is displayed), to selectively display on the user interface unit the data amount information of the first or second type in accordance with a user's instruction, or to display the data amount information of both the types so that the user can adequately identify them (although not shown). In this way, the arrangement that can further improve the effects of this embodiment may be adopted.

Note that information of the transmission data size at low compression (10 Mbytes in this example) is called first data size information in the data size information of the second type. Information of the transmission data size at normal compression (6 Mbytes in this example) is called second data size information in the data size information of the second type. Information of the transmission data size at high compression (1 Mbyte in this example) is called third data size information in the data size information of the second type. In case of low compression, image data with higher image quality than that of a transmission image at normal compression can be transmitted. In case of normal compression, image data with higher image quality than that of a transmission image at high compression can be transmitted.

In the first embodiment, in this way, the user can select and determine the image quality and amount of image data to be transmitted from the MFP 101 from a plurality of selection candidates (e.g., low/normal/high compression setting buttons), and can confirm the setting result in advance using the UI. In this fashion, the user can transmit a file (document) stored in the storage unit 106 of the MFP 101 to a desired destination (in this example, the PC 104) in a better data transmission mode in consideration of the image quality and amount of data to be transmitted, and also the network conditions (the network is busy weekdays 8:30 to 17:00, but is not busy during other time zones, etc.), the condition and performance of the device as the destination of transmission (mounted memory size), and the like. Hence, a convenient device and system with a manipulation environment that can improve the operability and convenience and can meet various needs of various users while solving the conventional problems can be provided.

Note that the remote manipulations of the MFP 101 from the PC have been explained as the first embodiment that can fully exhibit the effects of the present application. However, the first embodiment can provide the same or substantially the same manipulation environment at the PC 103 via the manipulation unit of the MFP 101 to the user who manipulates the manipulation unit of the MFP 101, as will be described later. This example will be explained later.

In the first embodiment, the control is made to permit execution of the calculation process for calculating the data size information of the second type, and the notifying process of the data size information of the second type as the calculation result to the user when the user selects the transmission function of a plurality of functions (to be also referred as operation modes hereinafter) of the MFP 101. On the other hand, the control is made to inhibit execution of the calculation process and notifying process when the user selects a function other than the transmission function (e.g., a copy function (or print function)) of the plurality of functions of the MFP. With such control, the following problems can be solved: for example, although the user requests the copy or print function, he or she may be notified, in confusion, of the data size upon transmission of a file, or the convenience of the MFP impairs. Hence, high operability unique to the MFP can be maintained. Also, the calculation process and data exchange process which are not required in the copy or printer function can be omitted, and a wasteful load can be prevented from being imposed on the system and network.

The first embodiment has been mainly described using the display as an example of informing means (to be also referred as notifying means) that informs the user of the size information of the first type and that of the second type. However, this embodiment is not limited to this. For example, an audio unit that outputs audio data is included as an example of the informing means. For example, an arrangement that may control to inform the user of the size information by audibly outputting the size information of the first type and that of the second type from the audio unit may be adopted. Any other system and device arrangements may be adopted as long as they can solve the conventional problems.

The first embodiment has mainly explained as an example of remote manipulations of the MFP from the PC a case wherein the PC transmits, to the MFP, transmission setting condition information of a file to be transmitted set by the user at the PC, and the controller unit of the MFP executes the calculation process of the data size information (that of the second type) upon transmission of the file to be transmitted on the basis of the transmission setting condition information acquired by the MFP side from the PC and the data size information (that of the first type; 12 Mbytes in this example) of the file itself managed on the MFP side. However, this embodiment is not limited to this. For example, the data size information (that of the first type; 12 Mbytes in this example) of the file itself to be transmitted may be transmitted from the MFP to the PC, and the controller unit of the PC may control to calculate the data size information of the second type on the basis of the transmission setting information, the first data size information acquired from the MFP, and the like and to inform the user of the calculation result via the informing unit (display unit, audio output unit, or the like). In this manner, for the same reasons as above, any other system and device arrangements may be adopted as long as they can solve the conventional problems.

In place of using the data size information of the first type, a transmission file may be generated in accordance with various transmission processing condition parameters set by the user on the basis of an actual file of interest (which may be either original or copy data of the file), and the size of the data of the generated transmission file may be confirmed so as to acquire the data size information of the second type. In this way, no data size information of the first type need be used to calculate that of the second type. FIG. 8 will be explained using a calculation example of the data size upon transmission by actually generating the transmission file.

(Processing of Digital Multiple Device (MFP): FIG. 8)

The process on the MFP 101 side will be described below using the flowchart of FIG. 8. In step S801, the control waits until reception of information (including box specifying information required for the controller unit of the MFP to specify a box selected by the user of the PC 103, document specifying information required for the controller unit of the MFP to specify a document (file) selected by the user of the PC 103 from that box, transmission processing condition information required for the controller unit of the MFP to determine the transmission processing conditions set by the user of the PC 103 for that document, command data that instructs the controller unit of the MFP to calculate a data size upon transmission when the document is processed under the transmission processing conditions, and to return the calculation result to the PC, and the like) from the PC (in this example, the PC 103) in step S708 in FIG. 7. Upon reception of the information from the PC via a predetermined data communication medium (which may be a wireless LAN) such as a network or the like, the controller of the MFP (corresponding to the CPU 205 of the MFP 101 in FIG. 2) generates a transmission file on the basis of the file to be selected and the required information included in the received information (for example, transmission setting parameters such as the set transmission file method, transmission file compression ratio, data type, and the like). In step S802, the controller unit of the MFP controls an appropriate data processing unit (e.g., the image compression unit in FIG. 5 or the like) of the MFP 101 to execute a decompression process of box data saved in the storage unit 106 of the MFP 101. In this case, since the MFP applies the unique compression process for respective tiles, as described above, the box data is decompressed using the device-specific extension means 502.

Next, the controller unit of the MFP controls an appropriate data processing unit (e.g., the image compression unit in FIG. 5 or the like) of the MFP 101 to apply a JPEG compression process at a low compression ratio to the decompressed box data on the basis of the aforementioned information (in this example, the low compression setting is made at the PC 103). In this case, compression is made using the compression means 503 upon transmission, as described above.

Next, the controller unit of the MFP measures the file size of the generated file, i.e., JPEG-compressed file in step S804. As an example of the measurement method, the controller unit of the MFP holds the generated transmission file in an appropriate memory unit (e.g., a hard disk, RAM, or the like) of the MFP 101 at least during a period until the user determines an action to be taken for this generated transmission file using the buttons 1102, 1103, 1104, and the like on the UI of FIG. 11. Hence, by checking the data use amount of the transmission file in this memory, the size information of the transmission file can be acquired.

Upon completion of the file size measurement, the generated file may be deleted (in this case, the same data must be generated again if the transmission instruction is input at the PC via the button 1103). Alternatively, the generated file may be saved in a temporary area (e.g., 601 in FIG. 6) of the storage unit 106, and if the file is to be transmitted intact without any re-setting process in step S711 (e.g., if the user of the PC 103 who confirms the file measurement result on the display area 1101 in FIG. 11 inputs a transmission instruction via the button 1103), the saved file may be preferably transmitted. However, if the re-setting process is made (e.g., if the user of the PC 103 who confirms the file measurement result on the display area 1101 in FIG. 11 inputs a re-setting instruction of the transmission conditions via the button 1102), the control is made to delete the saved file, and to generate a new file by the same method as described above on the basis of information, which is re-set in accordance with another instruction upon re-depression of the file size confirmation button 1003.

In step S805, the controller unit of the MFP 101 transmits information of the file size measurement result generated in step S804 to the PC 103 as a source of transmission that transmitted the request command for requesting the size information of the transmission file upon depression of the file size confirmation button 1003 via the LAN 105. If there are a plurality of selected files (if the user selects a plurality of files via the document selection display area 902 in FIG. 9C), i.e., if there are a plurality of files selected in step S702 in the flow of FIG. 7 as the aforementioned process on the PC side, and if a setting is made to simultaneously transmit these plurality of files to a destination together (setting of a multiple-file simultaneous transmission function) in step S707, the same process is applied to all these files, and the total file size is measured. On the other hand, if the transmission file method selected in step S705 is E-mail attached transmission (if the E-mail attached transmission setting is made on the instruction area 1001 of the UI in FIG. 10), the mail size (header and message) is added to the file size to acquire a total file size. The acquired file size is transmitted to the PC 103, and is displayed in step S710, as described above.

Furthermore, the controller unit of the MFP 101 executes a series of following processes (not shown) after the process in step S805 of the flowchart in FIG. 8.

(Process 1) The controller unit waits for an instruction command required to control the operation on the MFP 101 side, which is transmitted from the device (corresponding to the PC 103 that transmitted the file size request command to the MFP 101) as the destination of transmission to which the MFP 101 transmitted the file size information in step S805.

(Process 2) Upon reception of the instruction command from the device (in this example, the PC 103) as the destination of transmission to which the MFP 101 transmitted the file size information, the controller unit of the MFP 101 parses the contents of the command.

(Process 3) As a result of parsing the command in process 2, if the command includes a transmission instruction (in this example, in case of a transmission instruction output from the PC 103 in response to depression of the transmission button 1103 on the manipulation dialogue in FIG. 11 by the user of the PC 103), the controller unit reads out the transmission file generated in the process of step S803 (i.e., the transmission file generated based on data stored in the box in accordance with the transmission conditions set by the user on the UIs in FIGS. 9A to 10) from the memory of the MFP 101, and controls a communication unit (e.g., the network unit 208) of the MFP 101 to transmit the readout transmission file under the transmission conditions set by the user (e.g., low-compressed data in case of the low compression setting, normal-compressed data in case of the normal compression setting, or high-compressed data in case of the high compression setting) to a destination (in this example, the PC 104) designated by the user via the transmission setting dialogues including the respective UIs shown in FIGS. 9A to 10 on the device of the command transmission source (in this example, the PC 103) via a predetermined communication medium (in this example, the LAN 105) (a sequence for permitting execution of the transmission process of the file processed under the transmission conditions set by the user in accordance with the instruction from the user after the user confirms the data size upon transmission of the transmission file).

(Process 4) As a result of parsing the command in process 2, if the command includes a cancel instruction (in this example, in case of a cancel instruction output from the PC 103 in response to depression of the transmission button 1103 on the manipulation dialogue in FIG. 11 by the user of the PC 103), the controller unit deletes the transmission file generated in the process of step S803 (i.e., the transmission file generated based on data stored in the box in accordance with the transmission conditions set by the user on the UIs in FIGS. 9A to 10) from the memory of the MFP 101. Note that the data need not be deleted, but at least the transmission file generated in the process of step S803 in accordance with the user's instruction is inhibited from being transmitted to the destination (in this example, the PC 104) designated by the user (a sequence for inhibiting execution of the transmission process of the file processed under the transmission conditions set by the user in accordance with the instruction from the user after the user confirms the data size upon transmission of the transmission file).

(Process 5) As a result of parsing the command in process 2, if the command includes a file size request instruction (in this example, when the controller unit of the PC 103 re-displays the transmission setting dialogue in FIG. 10 or the like on the display unit of the PC 103 in response to depression of the re-setting button 1102 on the dialogue of FIG. 11 by the user of the PC 103 so as to re-set the transmission conditions as in the example of FIG. 11, and sends the file size request command together with the re-set transmission setting condition information in response to re-depression of the file size confirmation button 1003), the controller unit of the MFP 101 deletes (or need not delete) the transmission file generated in the process of step S803 (i.e., the transmission file generated based on data stored in the box in accordance with the transmission conditions set by the user on the UIs in FIGS. 9A to 10) from the memory of the MFP 101. The flow then returns to the process in step S803, and the controller unit controls a predetermined image processing unit (in this example, the image compression unit of FIG. 5) to re-generate transmission data, and controls to confirm the size of the re-generated transmission file again in step S804 and to return the size information of re-generated transmission file to the device (in this example, the PC 103) as the transmission source of the file size request instruction (a sequence for inhibiting execution of the transmission process of the file processed under the transmission conditions set by the user in accordance with the instruction from the user after the user confirms the data size upon transmission of the transmission file, allowing the user to re-set transmission conditions, and controlling to generate a new transmission file under the re-set transmission conditions and to return the data size upon transmission of the newly generated transmission file to the device as a request source).

As described above, upon transmitting data of user's choice of image data stored in the box of the MFP to a desired destination of transmission (in this example, the host computer 104), the transmission data size (file size) is displayed on the display unit of the device (in this example, the host computer 103) of the user, who wants to execute the transmission process before transmission, so as to make the user confirm the file size, and the user himself or herself can select whether transmission of the data is permitted or inhibited, or the transmission conditions are re-set again. Hence, an information processing system which can solve the conventional problems, and can improve its convenience can be provided, and the user can transmit image data with a desired file size.

The first embodiment has exemplified a case wherein the device which output the file size request is the PC 103, and the destination of data transmission is the PC 104. Alternatively, the PC 103 itself which output the file size request may receive a file from the MFP 101 as a destination of transmission. In this manner, data of the MFP 101 may be transferred to the device itself that confirmed the file size.

The first embodiment has exemplified a case wherein in an information processing system which includes the computer 103 as an example of the first information processing device and the MFP 101 as an example of the second information processing device, and connects these devices via the wired LAN 105, the MFP 101 is remotely manipulated from the computer 103. However, the first embodiment is not limited to this.

For example, this embodiment can also be applied to an information system which has a mobile terminal or computer such as a PDA, mobile phone, or the like, which has at least manipulation means and informing means (display unit, audio output unit, and the like) and comprises a data communication function, as another example of the first information processing device, and has a digital camera or scanner which has at least data input means and storage means for storing data input by the data input means, and comprises a function of transferring the data to another device under the transmission conditions based on an instruction from the mobile terminal (data transmission function) as another example of the second information processing device, and connects these devices via a wireless communication, wherein the digital camera can be remotely manipulated from the first information processing device.

Application Example of First Embodiment

For example, the following case is assumed. That is, a digital camera is controlled to capture image data, and the captured image data is stored in a memory of the digital camera that can store a plurality of captured image data. Then, the user of a PDA instructs to transfer the captured image data fetched in the digital camera from the digital camera to another device (this device may be the PDA itself, another computer, or printer; that device need only have a function of receiving the captured image data transferred from the digital camera and a function of storing the received image data).

In this case, a controller unit of the PDA controls its display unit to display a manipulation dialogue that allows the user of the PDA to select desired captured image data from the memory of the digital camera, and to set transmission conditions upon transmission of that captured image data. After the user of the PDA selects captured image data and transmission conditions of that data via the manipulation dialogue, the controller unit of the PDA controls its display unit to display a button having a function equivalent to the file size confirmation button 1003 used when the captured image data is transmitted to a destination designated by the user of the PDA under the transmission conditions (transfer conditions). In response to a file size confirmation instruction input by the user of the PDA via the button, the controller unit of the PDA transmits a file size request command to the digital camera by a wireless method (e.g., Bluetooth or the like).

Upon reception of this command, a controller unit of the digital camera controls an image processing unit of the self device to generate transmission data from the captured image data designated by the PDA on the basis of the transmission conditions designated by the PDA. Then, the controller unit of the digital camera wirelessly transmits data size information of that transmission data to the PDA. Upon reception of this information, the controller unit of the PDA controls its display unit to display the data size information. In addition, the controller unit of the PDA controls its display unit to make a display (a button equivalent to the transmission button 1103) which allows the user of the PDA who confirmed the data size information to input an instruction for transmitting the generated transmission data from the digital camera to the destination of transmission. Also, the controller unit of the PDA controls its display unit to make a display (a button equivalent to the cancel button 1104) which allows the user of the PDA who confirmed the data size information to input an instruction for canceling transmission of the generated transmission data from the digital camera to the destination of transmission. Furthermore, the controller unit of the PDA controls its display unit to make a display (a button equivalent to the re-setting button 1102) which allows the user of the PDA who confirmed the data size information to input an instruction for canceling transmission of the generated transmission data from the digital camera to the destination of transmission, and to input an instruction for re-setting the transmission conditions of the data to be transmitted by the user. When the user inputs a transmission instruction via the above display, the controller unit of the PDA controls the digital camera to transfer the transmission data to the device as the destination of transmission designated by the user. On the other hand, when the user inputs a cancel instruction via the above display, the controller unit of the PDA controls the digital camera to delete the transmission data held in the memory of the digital camera, and inhibits data transfer of the transmission data to the device as the destination of transmission designated by the user. Also, when the user inputs a re-setting instruction via the above display, the controller unit of the PDA controls its display unit to display a transmission setting dialogue again to make the user re-set the transmission conditions.

The first embodiment can also be applied to such information processing system. In such system, a convenient system that can provide the same effects as those for solving the conventional problems can be applied.

Second Embodiment

In the first embodiment, in the system in which the host computer as an example of the first information processing device and the MFP as an example of the second information processing device are connected via a communication medium such as a network or the like, upon transmitting image data stored in the box of the MFP to the host computer, the file selection control, file size confirmation control, transmission control, and print control are applied to the box data of the MFP using the RemoteUI of the host computer. In this way, the information processing system that allows remote manipulations of the second information processing device from the first information processing device has been mainly explained.

The second embodiment will explain a method of implementing the same manipulation environment and control as in the first embodiment, and controlling copy, transmission, and print processes of a scanned document using a manipulation unit of an MFP, in an information processing system which has a manipulation unit (operation panel) of an MFP corresponding to an example of a first information processing device which comprises a display unit as an example of informing means for informing the user of information, and an image forming device main body of the MFP corresponding to an example of a second information processing device which comprises a data output (this data output means at least data transmission and data transfer) function. If a manipulation of the second information processing device from the first information processing device in the first embodiment is defined as a remote manipulation, a manipulation of the second information processing device from the first information processing device in the second embodiment will be referred to as a local manipulation. Since the MFP of the second embodiment will be described as an example using the same. MFP (MFP 101) as in the first embodiment having equivalent functions and arrangement to those in the first embodiment, all the parts which are not described in detail in the second embodiment are the same as those in the first embodiment.

[Transmission Data Size Confirmation Method, and Control Method of Transmission and Printing: FIGS. 13 to 17]

Figure 13:
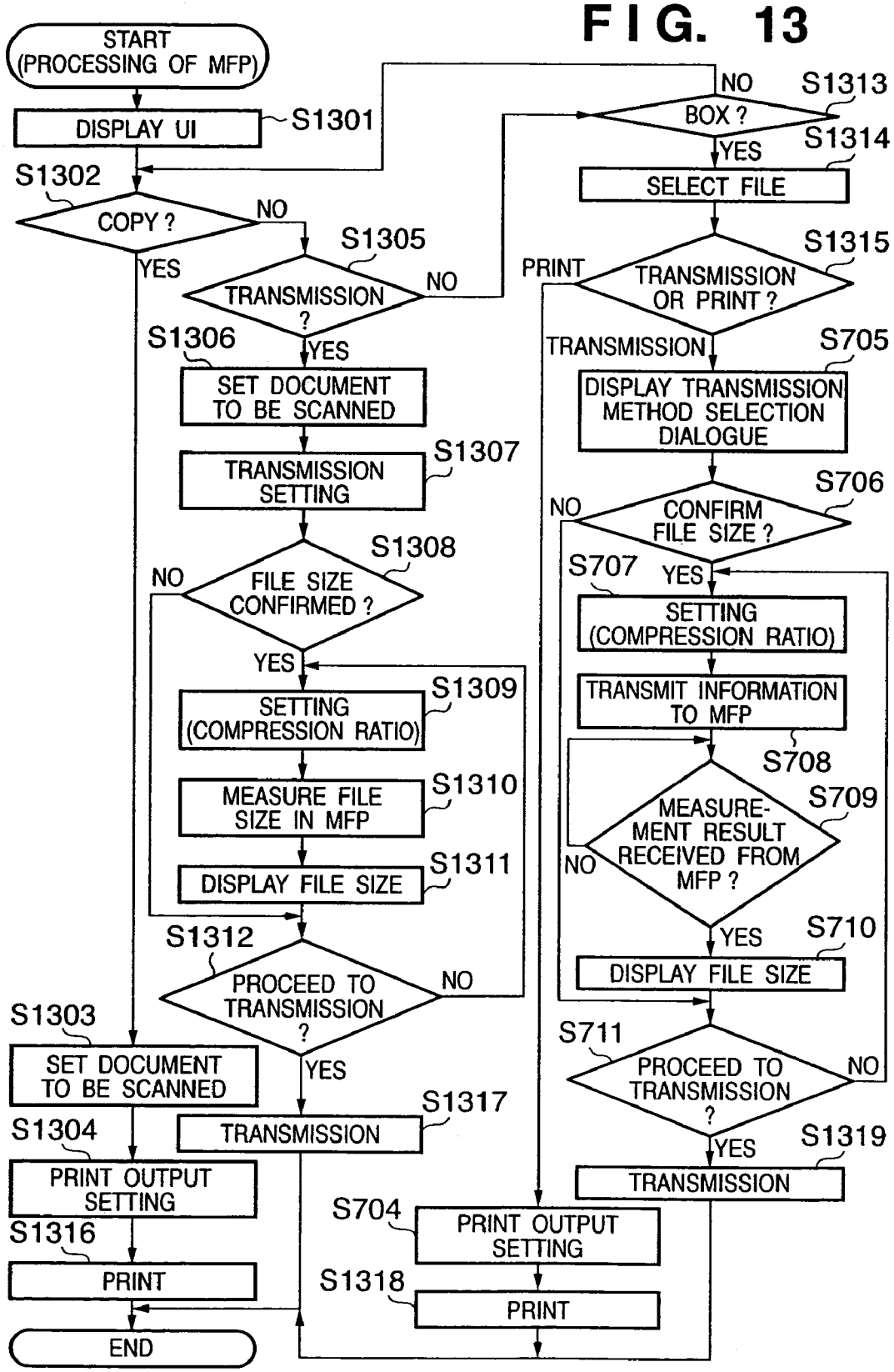
FIG. 13 is a flowchart showing the processing of an MFP in the second embodiment.

Details of the second embodiment will be described below using FIGS. 13 to 17. FIG. 13 is a flowchart for implementing the aforementioned control using the manipulation unit (corresponding to the manipulation unit 203 of the MFP 101 in FIG. 2 in this example) of the MFP (corresponding to the MFP 101 in FIG. 1 in this example) in the second embodiment. In the flowchart of FIG. 13, the same processes as in steps S704 to S711 described in the flowchart (FIG. 7) of the first embodiment are executed. Since these processes are denoted by the same step numbers as those in FIG. 7, a description thereof will be omitted since it is redundant.

(Processing of Image Processing Device (MFP): FIG. 13)

Figure 14:
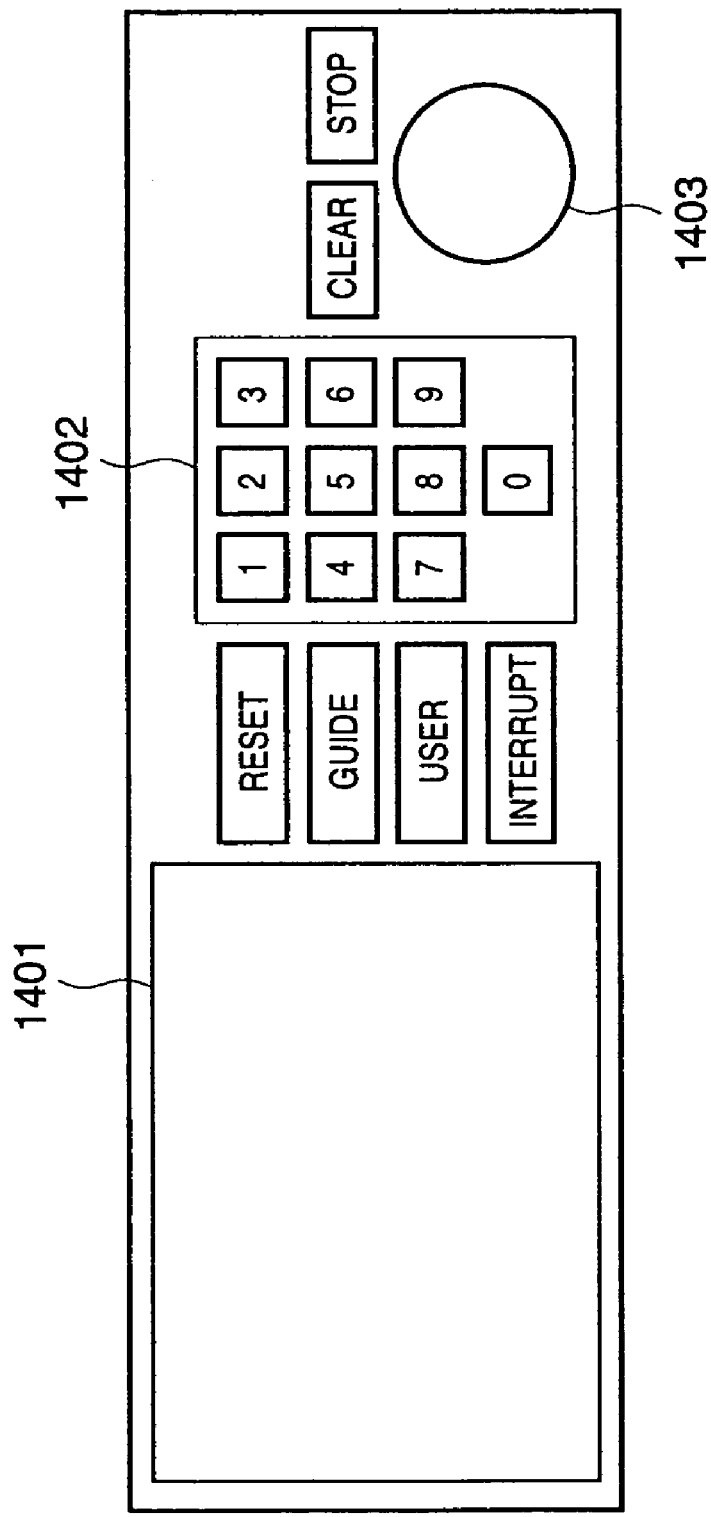
FIG. 14 shows an example of a manipulation dialogue displayed on an MFP display unit in the second embodiment.

In step S1301, a controller unit of the MFP (corresponding to the CPU 205 of the MFP 101 in FIG. 2 in this example) makes various kinds of control for, e.g., controlling a display unit of the MFP (corresponding to a display unit 1401 of the manipulation unit 203 shown in FIG. 14 that shows the arrangement of the manipulation unit 203) to execute a display process of a UI dialogue. FIG. 14 is a schematic view of the manipulation unit of the MFP 101 (corresponding to the manipulation unit 203 of the MFP 101 in FIG. 2 in this example). The manipulation unit 203 comprises a display unit 1401 of a liquid crystal touch panel type, which has both a display function and a manipulation instruction input function, a ten-key pad 1402, a start key 1403, and the like. Note that various buttons to be displayed on the display unit 1401 are so-called software keys, and other keys are mechanical hardware keys. However, other structures may be adopted.

Figure 15:
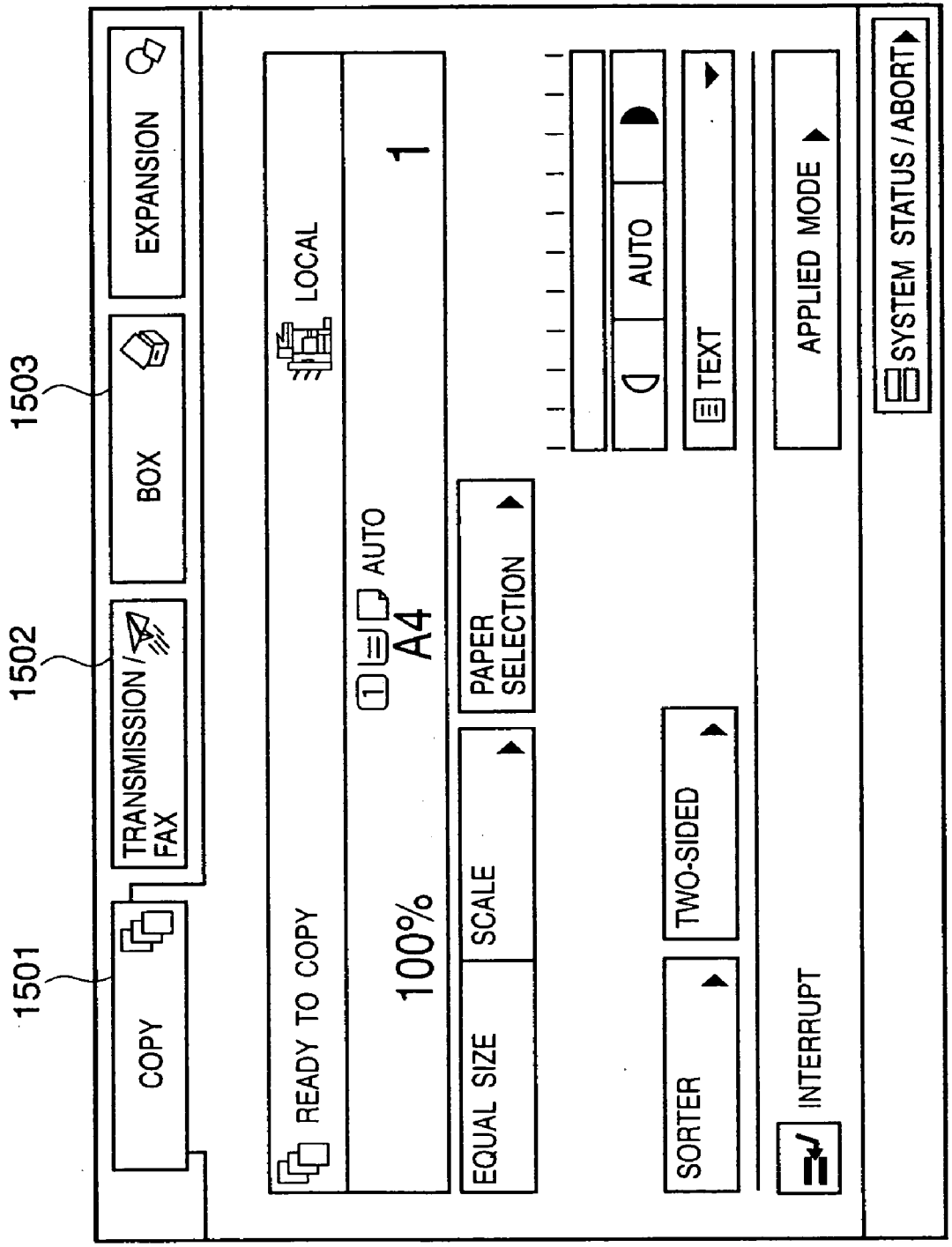
FIG. 15 shows an example of a manipulation dialogue displayed on the MFP display unit in the second embodiment.
Figure 16:
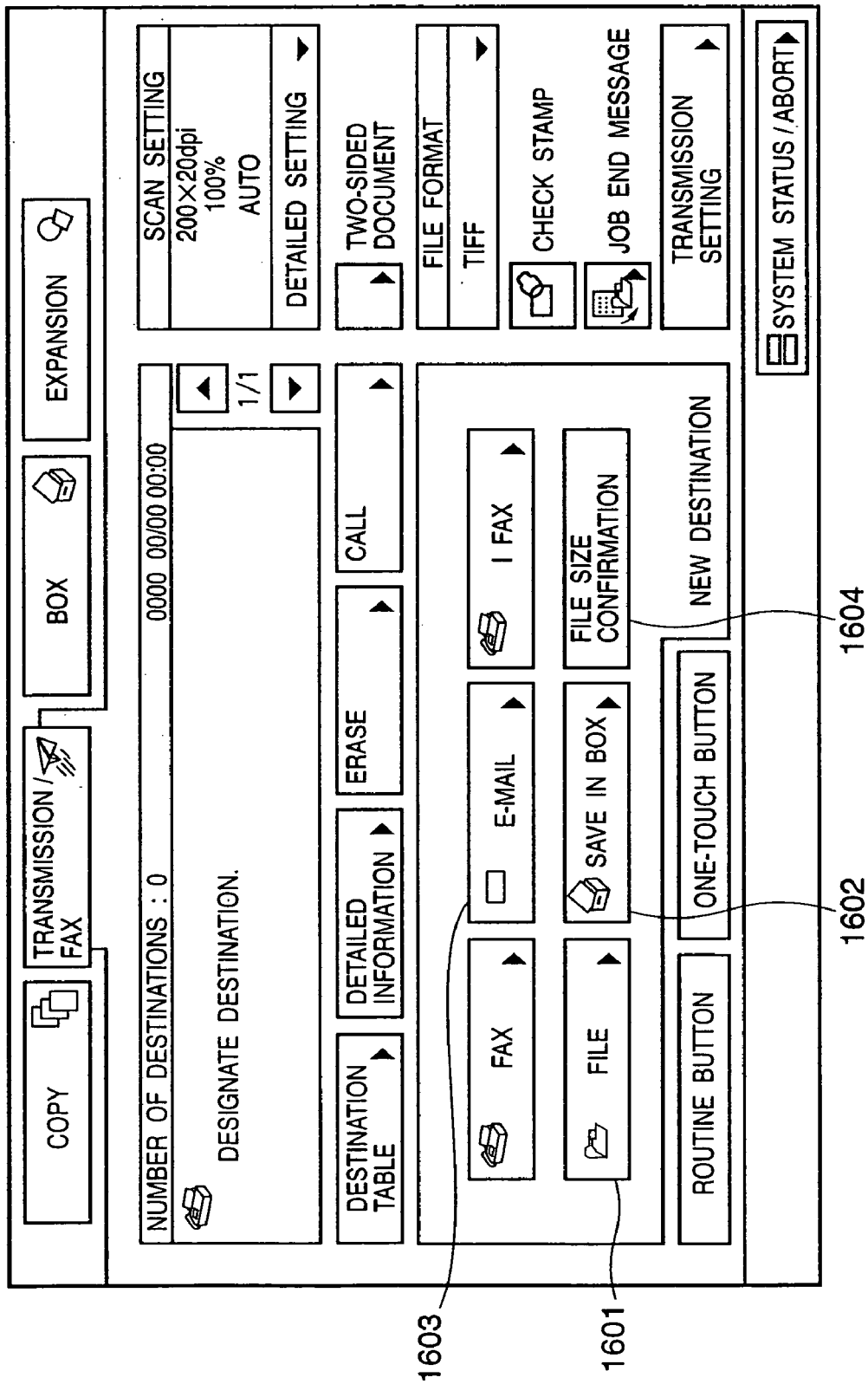
FIG. 16 shows an example of a manipulation dialogue displayed on the MFP display unit in the second embodiment.

In step S1301, the controller unit of the MFP 101 controls the display unit 1401 of the manipulation unit 203 to display a manipulation dialogue shown in, e.g., FIG. 15. FIG. 15 shows a display example of an initial dialogue of the MFP 101 which comprises a plurality of functions such as a copy function, transmission function, box function, and the like. In this example, a main dialogue of the copy function is displayed. The display unit of the MFP 101 is controlled to display function buttons used to select respective functions of the MFP 101. For example, the manipulation dialogue in FIG. 15 indicates that the copy function is selected when the user presses a copy function button 1501 (he or she touches the button with the finger). For example, when the user presses a transmission/FAX button 1502 on the manipulation dialogue in FIG. 15, the controller unit of the MFP 101 selects a transmission mode, and controls the display unit 1401 to display a manipulation dialogue for the transmission function, as shown in FIG. 16. On the other hand, when the user presses a box function key 1503 on the on the manipulation dialogue in FIG. 15, the controller unit of the MFP 101 controls the display unit 1401 to display a manipulation dialogue for the box function, as shown in FIG. 17. Note that the respective function buttons (1501, 1502, and 1503) are displayed in the tab format on the upper portion in the display area independently of the currently displayed function dialogue, and can be accessed from every dialogues.

In the checking processes in steps S1302, S1305, and S1313 of the flowchart shown in FIG. 13, which of the function buttons (1501, 1502, and 1503) the user presses is determined on the basis of information from the display unit 1401. For example, if the user presses the copy function button 1501, it is determined that the copy function is selected (YES in step S1302), and the controller unit of the MFP controls the display unit 1401 to display the manipulation dialogue of the copy function in FIG. 15 and controls the flow to advance to the process in step S1303. On the other hand, if the user presses the transmission/FAX function button 1502, it is determined that the transmission function is selected (YES in step S1305), and the controller unit of the MFP controls the display unit 1401 to display the manipulation dialogue of the transmission function in FIG. 16 and controls the flow to advance to the process in step S1306. On the other hand, if the user presses the box function button 1503, it is determined that the box function is selected (YES in step S1302), and the controller unit of the MFP controls the display unit 1401 to display the manipulation dialogue of the box function in FIG. 17 and controls the flow to advance to the process in step S1304.

If a copy process is to be done (YES in step S1302), the user sets a document to be scanned on a document table of the MFP 101 or on an ADF (auto document feeder) as an automatic document feeder of the MFP 101 in step S1303. The controller unit of the MFP prompts the user to make print output settings for the document to be scanned in step S1304. The user makes the print output settings on the manipulation dialogue in FIG. 15 as the main dialogue of the copy function, which is displayed on the display unit 1401. For example, in addition to the settings of the number of copies, one/two-sided copy, sort, staple, binding margin, and output tray described previously in step S704 of FIG. 7 of the first embodiment, settings of mode (text/text & photo/photo), density adjustment, reduced-scale layout, page continuous shot, and the like are available. In response to depression of the start key 1403 on the manipulation unit 203, the controller unit of the MFP controls the scanner unit to execute a scan process of the set document, controls a memory such as the hard disk 211 or the like to store scanned data, and controls the printer unit 202 to execute a print process of the stored data in accordance with the print conditions set by the user in the copy function (step S1316).

If a transmission process is to be made (YES in step S1305), the user sets a document to be scanned on the document table or ADF (auto document feeder) of the MFP 101 in step S1306. The controller unit of the MFP prompts the user to set transmission processing conditions for the document to be transmitted via the manipulation dialogue displayed on the display unit 1401 (step S1307). The user makes the transmission settings on the manipulation dialogue in FIG. 16 as the main dialogue of the transmission function. For example, the controller unit of the MFP prompts the user to set a destination of a document (document data) to be transmitted, a scan setting (resolution), and a file format (TIFF, PDF, JPEG) via the setting dialogue of the transmission function including that shown in, e.g., FIG. 16.

(Transmission Setting Dialogue (step S1307): FIG. 16)

Buttons (1601 to 1604) as display elements on the manipulation dialogue in FIG. 16 will be described below in correspondence with FIG. 10 of the first embodiment. In this example, data to be processed is scan data input from the scanner unit 201. Since the box in the storage unit 106 of the MFP 101 described in the first embodiment can store data (PDL data or bitmap data as already rasterized data of the PDL data) input from devices such as the PC 103, PC 104, and the like, which are different from the MFP 101, and scan data input from the scanner unit, the same operation can be applied even when data in the box is to be transmitted from the manipulation unit 203 of the MFP 101 (this operation will be described later).

A "file" button 1601 on the manipulation dialogue in FIG. 16 to be displayed on the display unit 1401 (FIG. 14) of the MFP 101 corresponding to a local UI is a button which allows the user, who manipulates the manipulation unit 203 of the MFP 101, to issue an instruction equivalent to that which is issued by the user of the PC 103 to the MFP 101 from a remote site (from the remote PC 103 or the like) via the file transmission button on the instruction area 1001 of the manipulation dialogue of FIG. 10 to be displayed on the display unit 401 of the PC 103 as the RemoteUI, to the MFP from a local site (from the manipulation unit 203 of the MFP 101 itself).

An "E-mail" button 1602 on the manipulation dialogue in FIG. 16 to be displayed on the display unit 1401 of the MFP 101 corresponding to the local UI is a button which allows the user, who manipulates the manipulation unit 203 of the MFP 101, to issue an instruction equivalent to that which is issued by the user of the PC 103 to the MFP 101 from a remote site (from the remote PC) via the file E-mail attached transmission button on the instruction area 1001 of the manipulation dialogue of FIG. 10 to be displayed on the display unit 401 of the PC 103 as the RemoteUI, to the MFP from a local site (from the manipulation unit 203 of the MFP 101 itself).

A "save in box" button 1603 on the manipulation dialogue in FIG. 16 to be displayed on the display unit 1401 of the MFP 101 corresponding to the local UI is a button which allows the user to input an instruction for saving scan data input from the scanner unit 201 in the box designated by the user (the RemoteUI dialogue in FIG. 10 includes no button corresponding to this button).

A "file size confirmation" button 1604 on the manipulation dialogue in FIG. 16 to be displayed on the display unit 1401 of the MFP 101 corresponding to the local UI is a button which allows the user, who manipulates the manipulation unit 203 of the MFP 101, to issue an instruction equivalent to that which is issued by the user of the PC 103 to the MFP 101 from a remote site (from the remote PC) via the file size confirmation button 1003 on the manipulation dialogue of FIG. 10 to be displayed on the display unit 401 of the PC 103 as the RemoteUI, to the MFP from a local site (from the manipulation unit 203 of the MFP 101 itself). Also, this button provides a service equivalent to that, which is provided to the remote user via the display area 1101 of the RemoteUI in FIG. 11, to the local user via the display unit 1401 of the manipulation unit of the MFP 101.

That is, when the user of the MFP 101 presses this button 1604, he or she can confirm the data size upon transmission of data to be transmitted (scan data in this example) held in the MFP 101 via the display unit 1401 of the MFP 101 itself.

Note that the user of the MFP 101 can also set a transmission file compression ratio via the transmission setting dialogue to be displayed on the display unit 1401 of the manipulation unit 203 (although not shown in the local UI example of FIG. 16). This setting corresponds to that of the transmission file compression ratio on the instruction area 1002 of the RemoteUI.

If the user wants to confirm the size (file size) of data before transmission of transmission data in advance via the display unit 1401 of the manipulation unit 203 of the MFP 101, he or she sets various transmission processing conditions (inputs transmission condition parameters) on the manipulation dialogue for the transmission function in FIG. 16, and presses (touches) the file size confirmation button 1604 on the manipulation dialogue in FIG. 16 at least before he or she presses the start key 1403 of the manipulation unit 203 at the stage of step S1307.

A display (various transmission processing condition setting buttons in FIG. 16) which is executed by the display unit 1401 of the self device under the control of the controller unit of the MFP 101 and allows the user of the MFP 101 to input the transmission processing conditions of a file (also called a document or job data) to be transmitted in the transmission function corresponds to the first display (the instruction areas 1001, 1002, and the like in FIG. 10) in the first embodiment. A display (the file size confirmation button 1604 in FIG. 16) which allows the user to input an instruction for informing the user of the MFP 101 of the data size upon transmission of data of a transmission job generated as transmission data in accordance with the transmission processing conditions set by the user of the MFP 101 via the first display (various transmission processing condition setting buttons in FIG. 16) in the second embodiment before the data is actually transmitted corresponds to the second display (the file size confirmation button 1003 in FIG. 10) in the first embodiment.

In this way, the information processing system of this embodiment implements, via the manipulation unit of the MFP 101 on the local side, the same operations and services as the operations to the MFP 101 which is controllable from a remote site, services that can be enjoyed at a remote site, and the like in the first embodiment, thus maximally improving the operability of the device and system of this embodiment, and preventing the conventional problems from being posed not only in a remote environment (an environment that remotely manipulates the MFP 101) but also in the local environment (an environment that non-remotely manipulates the MFP 101 by the manipulation unit of the MFP 101 itself). Hence, the system of this embodiment can prevent the conventional problems from being posed at both the remote and local sites, thus maximally improving the operability.

In response to depression of the start key 1403 of the manipulation unit 203 by the user after completion of the user's transmission settings associated with the transmission function at the manipulation unit 203 in step S1307, the controller unit of the MFP 101 controls the scanner unit 201 to execute the scan process of the document set on the document table or ADF, and controls an appropriate memory (e.g., the storage unit 106 or the like; note that this data need not be stored in the box area 602, but may be stored in the temporary area 601; since a series of documents are document data including a plurality of pages, such document data are stored in a memory that can store data for a plurality of pages, and scan data input in the order of pages can be preferably stored in the memory in turn) to store the scan data.

The controller unit of the MFP 101 controls predetermined image processing units (e.g., a required unit of the image processing unit 215, image rotation unit 217, image compression unit 218, and the like) to generate transmission data (also called a transmission file) from the scan data scanned by the scanner unit 201 on the basis of the transmission processing conditions (transmission setting parameters) set by the user of the MFP 101 via the manipulation unit 203. In this case, the controller unit of the MFP 101 checks if the user of the MFP 101 has already input the file size request instruction by pressing the file size confirmation button 1604 on the manipulation dialogue in FIG. 16 displayed on the display unit 1401 of the manipulation unit 203 at the stage of step S1307 (step S1308).

If the controller unit determines in step S1308 that the file size confirmation request has already been issued by the user of the MFP 101 via the file size confirmation button 1604 on the display unit 1401, the flow advances to step S1309. The processes in step S1309 to S1312 are substantially the same as steps S707 to S711 described in the first embodiment. However, since the second embodiment uses the UI of the MFP, no communications with the PC are made. For example, step S1310 executes the processes in steps S802 to S804 in FIG. 8.

As a practical example, the controller unit of the MFP 101 executes the following control. The controller unit stores scan data in the temporary area 601 (or may be the box area 602) of the hard disk 211. The controller unit controls a predetermined data processing unit (e.g., the image compression unit 218) of the MFP 101 to generate transmission data (also called a transmission file; for example, low-compressed data in case of the low compression setting, normal-compressed data in case of the normal compression setting, or high-compressed data in case of the high compression setting) from the stored scanned data in accordance with the transmission conditions (settings associated with the transmission method, transmission file compression ratio, and the like), which are set by the user of the MFP 101 via the process in step S1307, i.e., via the transmission condition setting dialogue in the transmission function such as the manipulation dialogue in FIG. 16 and the like (This process corresponds to step S1309.). The controller unit holds the data generated for transmission in an appropriate memory such as the temporary area 601 or the like (this data is held in the memory without being erased at least until the user who confirms the file size inputs an instruction). The processes described so far correspond to the process in step S1309.

By checking the memory use amount of the data, the file size information of the transmission data can be calculated (acquired) (step S1310).

In order to feed back that information to the user who pressed the file size confirmation button 1604, the controller unit controls the display unit 1401 (FIG. 14) that displays the manipulation dialogue of the FAX function in FIG. 16 of the manipulation unit 203 of the MFP 101 to display the same manipulation dialogue as that in FIG. 11 of the first embodiment (step S1311). More specifically, the controller unit (CPU 205) of the MFP 101 controls the manipulation unit 203 of the MFP 101 to execute a display (the third display in the first embodiment; corresponding to the display area 1101 in FIG. 11) that allows the user who input the file size confirmation request instruction via the second display (the file size confirmation button 1604 in FIG. 16) in the second embodiment to be informed of and confirm, via the third display (corresponding to a transmission data size confirmation display area 1706 in FIG. 17D), the data size of transmission job data, which is generated according to the transmission processing conditions set via the first display (the local UI associated with the settings of the transmission function in FIG. 16 and the like) in the second embodiment from document data to be transmitted (data scanned by the scanner unit 201 and stored in the temporary area 601).

Figure 17A:
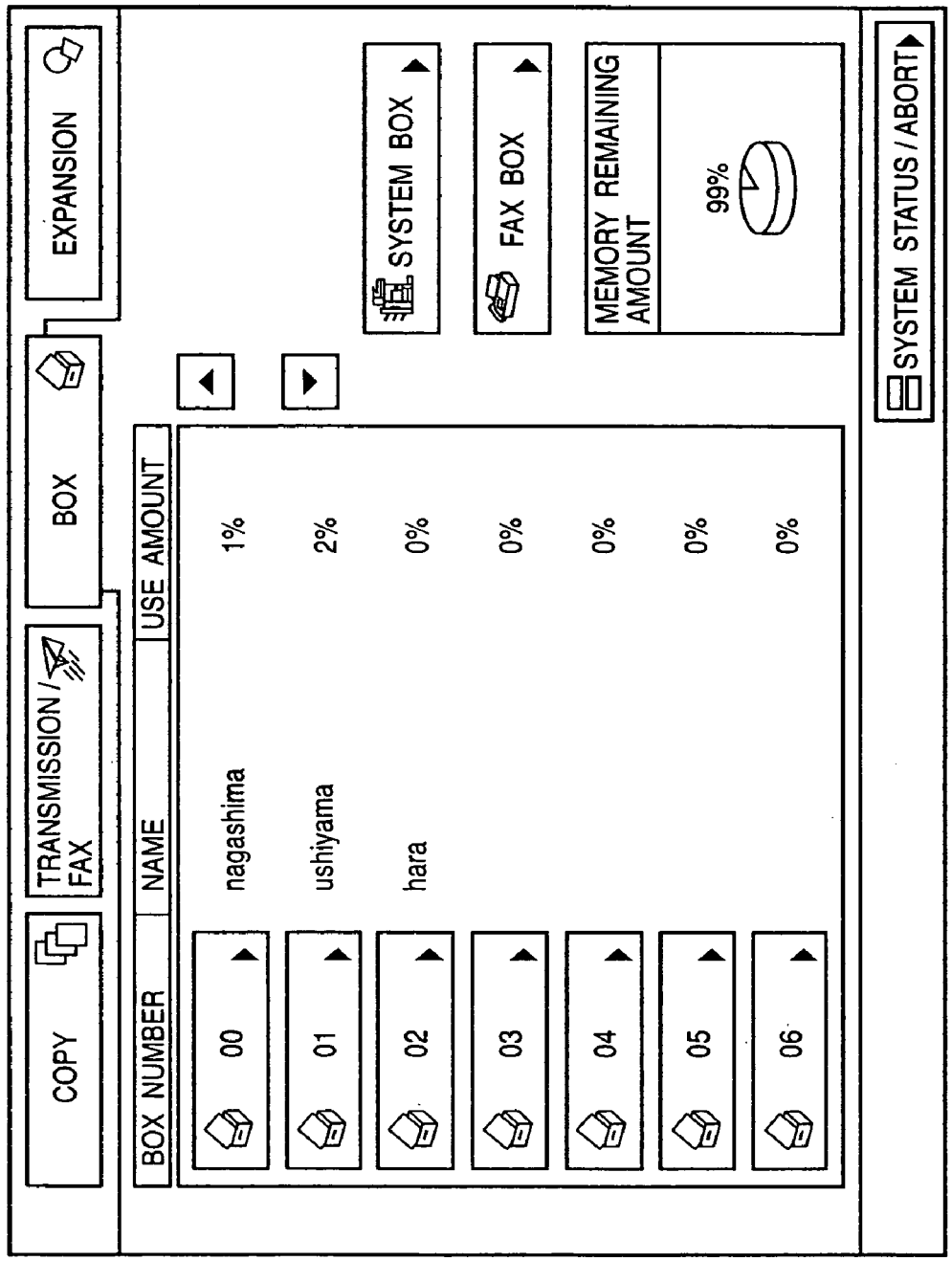
FIG. 17A shows an example of a manipulation dialogue displayed on the MFP display unit in the second embodiment.
Figure 17B:
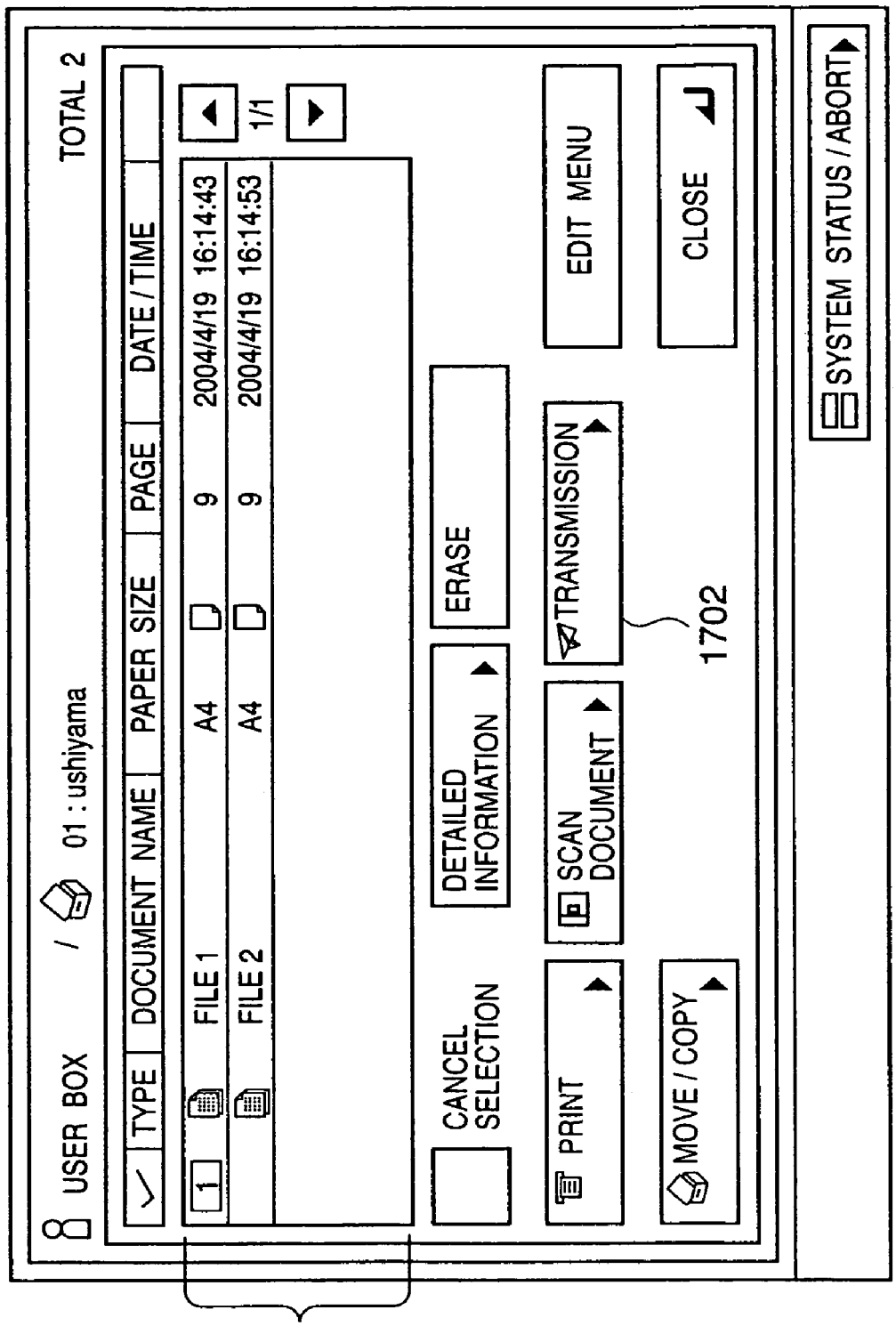
FIG. 17B shows an example of a manipulation dialogue displayed on the MFP display unit in the second embodiment.
Figure 17D:
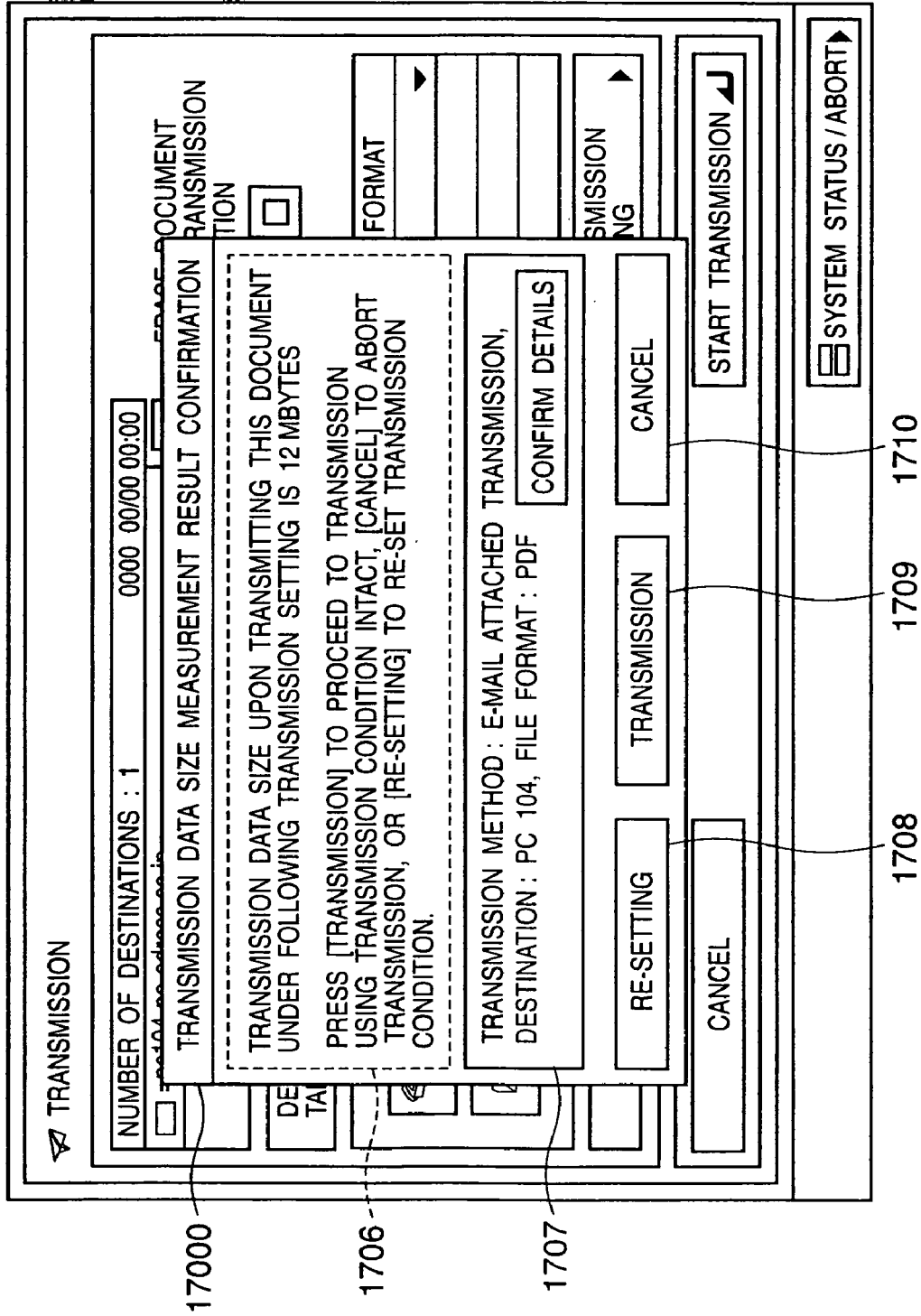
FIG. 17D shows an example of a manipulation dialogue displayed on the MFP display unit in the second embodiment.

In addition, the controller unit (CPU 205) of the MFP 101 controls the manipulation unit 203 of the MFP 101 to execute a display (corresponding to the fourth display (display of transmission setting condition information: not shown) in the first embodiment) that allows the user who confirmed the data size information via the fourth display (corresponding to a transmission setting confirmation display area 1707 in FIG. 17D) in the second embodiment to be notified of and confirm the transmission processing conditions set via the first display (various transmission processing condition setting buttons in FIG. 16) in the second embodiment, so as to inform the user of the transmission processing conditions used to calculate the data size upon transmission.

Also, the controller unit (CPU 205) of the MFP 101 controls the manipulation unit 203 to execute a display (this display is the same button as the transmission button 1103 in FIG. 11; corresponding to the fifth display in the first embodiment) that allows the user to input, via a fifth display (corresponding to a transmission button 1709 in FIG. 17D) in the second embodiment, an instruction for transmitting the transmission data with the acquired data size (under the set transmission processing conditions) from the MFP 101 to a destination (e.g., the PC 103 or 104, another MFP, or the like) designated via the first display (various transmission processing condition setting buttons in FIG. 16), after the user of the MFP 101 confirms the actual amount of data (and processing conditions) upon transmission via the third and fourth displays (or at least the third display) in the second embodiment, which are executed by the manipulation unit 203.

Furthermore, the controller unit (CPU 205) of the MFP 101 controls the manipulation unit 203 to execute a display (this display is the same button as the cancel button 1104 in FIG. 11; corresponding to the sixth display in the first embodiment) that allows the user to input, via a sixth display (corresponding to a cancel button 1710 in FIG. 17D) in the second embodiment, an instruction for canceling (inhibiting) transmission of the transmission data with the acquired data size (under the set transmission processing conditions) from the MFP 101 to a destination (e.g., the PC 103 or 104, another MFP, or the like) designated via the first display (various transmission processing condition setting buttons in FIG. 16), after the user of the MFP 101 confirms the actual amount of data (and processing conditions) upon transmission via the third and fourth displays (or at least the third display) in the second embodiment, which are executed by the manipulation unit 203.

Moreover, the controller unit (CPU 205) of the MFP 101 controls the manipulation unit 203 to execute a display (this display is the same button as the re-setting button 1102 in FIG. 11; corresponding to the seventh display in the first embodiment) that allows the user to input, via a seventh display (corresponding to a re-setting button 1708 in FIG. 17D) in the second embodiment, an instruction for canceling (inhibiting) transmission of the transmission data with the acquired data size (under the set transmission processing conditions) from the MFP 101 to a destination (e.g., the PC 103 or 104, another MFP, or the like) designated via the first display (various transmission processing condition setting buttons in FIG. 16), and allowing the user to input an instruction for re-setting the transmission processing conditions set via the first display by the user, after the user of the MFP 101 confirms the actual amount of data (and processing conditions) upon transmission via the third and fourth displays (or at least the third display) in the second embodiment, which are executed by the manipulation unit 203.

The controller unit of the MFP 101 controls the manipulation unit 203 of itself to execute the aforementioned displays (the first to seventh displays in the second embodiment).

For example, after the manipulation dialogue in FIG. 16 is displayed on the display unit 1401 of the manipulation unit 203, a popup dialogue which is the same as that of FIG. 11 may be displayed on the display unit 1401. In this way, the manipulation unit may be controlled to execute the third to seventh displays in the second embodiment (see FIG. 17D). Alternatively, the manipulation unit 203 may make the third to seventh displays on independent dialogues, or may make some displays on an identical dialogue and the remaining displays on another dialogue. Such display control may also be adopted.

If the user of the MFP 101, who confirmed the data size upon transmission via the third display (the transmission data size confirmation display area 1706 in FIG. 17D) in the second embodiment, inputs a transmission instruction via the fifth display (the transmission button 1709 in FIG. 17D) in the second embodiment, the controller unit (CPU 205) of the MFP 101 controls to transmit the transmission job data generated via the process in step S1309 from the MFP 101 to the device as the destination of transmission (to permit transmission) (corresponding to YES in step S1312→the process in step S1317).

On the other hand, if the user of the MFP 101, who confirmed the data size upon transmission via the third display (the transmission data size confirmation display area 1706 in FIG. 17D) in the second embodiment, inputs a cancel instruction via the sixth display (the cancel button 1710 in FIG. 17D) in the second embodiment, the controller unit of the MFP inhibits the transmission job data generated via the process in step S1309 from being transmitted from the MFP 101 to the device as the destination of transmission, and deletes, for example, the generated transmission data from the memory, thus ending this processing (not shown in FIG. 13).

On the other hand, if the user of the MFP 101, who confirmed the data size upon transmission via the third display (the transmission data size confirmation display area 1706 in FIG. 17D) in the second embodiment, inputs a re-setting instruction via the seventh display (the re-setting button 1708 in FIG. 17D) in the second embodiment, the controller unit of the MFP inhibits the transmission job data generated via the process in step S1309 from being transmitted from the MFP 101 to the device as the destination of transmission, deletes, for example, the generated transmission data from the memory, and allows the user to re-set the transmission conditions again (corresponding to the flow of NO in step S1312→return to the process in step S1309).

In this manner, even when the data fetched by the MFP 101 is to be transferred to another device other than the MFP 101 by manipulations from the manipulation unit 203 of the MFP 101, the conventional problems can be solved, and the same effects as those in the first embodiment can be obtained.

If box data (image data which is input from the scanner unit 201 or from the external device such as the PC 103, 104, or the like, and is stored in the box in the storage unit 106; also called document data) is to be processed from the UI of the MFP 101, a file (document data) is selected in step S1314. This file selection is made from FIG. 17 as the main dialogue of the box function. Since the subsequent processes (steps S1315, S1318, and S1319, and steps S704 to S711) are the same as those executed when the box data in the MFP 101 is to be processed from the RemoteUI of the PC 103 of the first embodiment, a description thereof will be omitted (that is, steps S1315, S1318, and S1319 in FIG. 13 are the same processes as those in steps S703, S712, and S713 in FIG. 7). However, since the second embodiment uses the UI of the MFP, no communications with the PC are made unlike in the first embodiment.

An example of principal part different from the first embodiment will be explained below.

The controller unit of the MFP 101 confirms that the box function is selected since the user presses the box function button 1503 on the manipulation dialogue in FIG. 15 displayed on the display unit 1401 of the MFP 101, and controls the display unit 1401 to display a manipulation dialogue for the box function shown in FIG. 17A (YES in step S1313).

Both the manipulation dialogue as the local UI to be displayed on the MFP 101 in FIG. 17A, and that in FIG. 9B as the RemoteUI to be displayed on the display unit 401 of the PC 103 of the first embodiment are dialogues for manipulating the box function of the MFP 101. Both the dialogues display information of the boxes of the MFP 101, and the control is made to allow both the remote and local sites to attain the same manipulations. When the RemoteUI is used, the controller units of the MFP 101 and PC 103 allow operations in collaboration with each other; when the local UI is used, the controller unit of the MFP 101 alone allows operations. As can be seen from comparison of them, this information processing system controls to provide the same or similar manipulation dialogues irrespective of whether information associated with the MFP 101 is displayed on the PC side the MFP 101 side, although they have slightly different display formats (one is manipulated using the mouse, the other is manipulated using the touch panel, and so forth). Hence, regardless of whether the user makes manipulations at the PC or the MFP, he or she can issue equivalent instruction requests to the MFP 101 to control the MFP 101 to execute operations of user's choice.

In step S1314, the user selects a file via the setting dialogue of the box function in FIG. 17A, which is displayed on the display unit 1401 of the MFP 101. For example, assume that the user of the MFP 101 presses a box with box number 01 and user name "ushiyama" via the touch panel on a box selection dialogue in FIG. 17A, which is displayed on the display unit 1401 of the MFP 101, as in the first embodiment. The controller unit of the MFP 101 controls the display unit 1401 of the manipulation unit 203 of itself to display a document selection dialogue (FIG. 17B) that allows the user to select desired document data from those stored in the box selected by the user on the box selection dialogue. A selection area 1701 on the document selection dialogue in FIG. 17B has a manipulation instruction function that allows the user to select a document in the box, and an information providing function that allows the user to confirm the type, document name, paper size, the number of pages, and storage date in the box of the document for respective documents. FIG. 17B shows an example in which the user of the MFP 101 selects document (file) file1 via the selection area 1701.

If the user inputs a print instruction via a print button on the manipulation dialogue in FIG. 17B, the controller unit of the MFP 101 determines that a box print function is selected (corresponding to a case wherein "print" is determined in step S1315), and controls the printer unit 202 to print the document data of the selected box in FIG. 17B in accordance with print processing conditions (various print condition setting parameters such as the number of copies to be printed, paper size, various post-processing modes such as a staple mode and the like, and so forth) set by the user via a print processing condition setting dialogue (not shown) (corresponding to the process in step S1318). In this case, since the print mode is selected, the controller unit of the MFP 101 controls to inhibit execution of a data size measurement process and data size measurement result display process upon transmission (to be described later), so as to provide the same effects as in the first embodiment on the local UI.

On the other hand, if the user inputs a transmission instruction via a transmission button 1702 on the manipulation dialogue in FIG. 17B, the controller unit of the MFP 101 determines that a box data transmission function is selected (corresponding to a case wherein "transmission" is determined in step S1315), and controls the display unit 1401 to display a transmission setting dialogue that allows the user to set transmission processing conditions for the selected document. FIG. 17C shows an example of that manipulation dialogue.

In this example, via the transmission setting dialogue in FIG. 17C, the user inputs an E-mail address of the PC 104 as in the destination of transmission in the first embodiment on an address setting dialogue (not shown) to be displayed on the display unit 1401 upon depression of an E-mail button 1703, and sets to control the MFP 101 to execute a transmission process of document data file1 selected on the document selection dialogue in FIG. 17B to the PC 104 by e-mail. Also, in this example, as another item of the transmission processing conditions, the user sets "PDF" via a file format selection column 1705 that allows the user to select a desired file format from a plurality of selection candidates including PDF, TIFF, MTIFF, and the like, so as to use the PDF format as the file format upon transmitting this document to the PC 104.

After the desired transmission settings are made by the user via the transmission setting dialogue including the manipulation dialogue in FIG. 17C, if the user presses a file size confirmation button 1704 on the manipulation dialogue in FIG. 17C, the controller unit of the MFP 101 calculates the transmission data size when the document (file1 in this example) which is stored in the box (box with box number 01 and user name "ushiyama" in this example) selected by the user via the manipulation dialogue in FIG. 17A, and is selected by the user via the manipulation dialogue in FIG. 17B is to be transmitted to the destination (the PC 104 in this example) designated by the user under the transmission processing conditions (E-mail transmission, PDF file format) which is set by the user via the transmission setting dialogue in FIG. 17C and the like. As the calculation method, the transmission data size is calculated on the basis of the data size of original data and the processing conditions, or a transmission file is actually generated on the basis of original data of the selected document in accordance with the processing conditions designated by the user, and the size of the generated transmission data is checked. In order to inform the user of the calculated transmission data size information, the controller unit controls the manipulation unit 203 of the MFP 101 to display the measurement result of the transmission data size. For example, the controller unit of the MFP 101 popup-displays a transmission data size confirmation dialogue 17000 that informs the user of the data size upon transmission, as shown in FIG. 17D, on the manipulation dialogue in FIG. 17C displayed on the display unit 1401.

In this way, when the user of the MFP 101 inputs the data size request instruction upon transmission by pressing the file size confirmation button 1704, the controller unit of the MFP 101 controls the manipulation unit 203 to execute a display (corresponding to the transmission data size confirmation display area 1706 in FIG. 17D in this example) that allows the user to confirm the data size upon transmission of the file, as shown in FIG. 17D, when the file selected by the user in the box selected by the user is to be transmitted from the MFP 101 to the device as the destination designated by the user in accordance with the transmission processing conditions set by the user. This display corresponds to the third display in the first embodiment.

In addition, the controller unit of the MFP 101 controls the manipulation unit 203 to execute a display (corresponding to the transmission setting confirmation display area 1707 in FIG. 17D in this example) that notifies the user himself or herself of the transmission processing conditions set by the user, as information for decision making used in calculation of the data size, so as to make the user himself or herself re-confirm the transmission processing conditions that yield the transmission data size presented to the user on the transmission data size confirmation display area 1706, as shown in FIG. 17D. This display corresponds to the fourth display in the first embodiment.

In this example, since the user of the MFP 101 checks these third and fourth displays, he or she can confirm in advance that data with 12 Mbytes will be transmitted before actual data transmission if data transmission is to be made to the PC 104 under the transmission conditions set by himself or herself.

Furthermore, the controller unit of the MFP 101 controls the manipulation unit 203 to execute a display (the transmission button 1709 in FIG. 17D in this example) that allows the user to input an instruction for actually transmitting transmission data generated from original data based on the transmission processing conditions, after the user confirms the transmission processing conditions set by himself or herself via the display area 1707, and also the data size upon data transmission under the transmission settings via the display area 1706, as shown in, e.g., FIG. 17D. This display corresponds to the fifth display in the first embodiment.

Moreover, the controller unit of the MFP 101 controls the manipulation unit 203 to execute a display (the cancel button 1710 in FIG. 17D in this example) that allows the user to input an instruction for canceling (inhibiting) actual transmission of transmission data generated from original data based on the transmission processing conditions, after the user confirms the transmission processing conditions set by himself or herself via the display area 1707, and also the data size upon data transmission under the transmission settings via the display area 1706, as shown in, e.g., FIG. 17D. This display corresponds to the sixth display in the first embodiment.

Also, the controller unit of the MFP 101 controls the manipulation unit 203 to execute a display (the re-setting button 1708 in FIG. 17D in this example) that allows the user to input an instruction for canceling (inhibiting) actual transmission of transmission data generated from original data based on the transmission processing conditions, and allowing the user himself or herself to re-set the transmission processing conditions, after the user confirms the transmission processing conditions set by himself or herself via the display area 1707, and also the data size upon data transmission under the transmission settings via the display area 1706, as shown in, e.g., FIG. 17D. This display corresponds to the seventh display in the first embodiment.

As in the above embodiment, these third to seventh displays need not always be simultaneously made on a single dialogue, as shown in FIG. 17D, but may be made on independent dialogues.

Under the aforementioned preconditions, if the user of the MFP 101 inputs a transmission instruction via the transmission button 1709 on the manipulation dialogue of FIG. 17D, the controller unit of the MFP 101 controls a predetermined data communication unit (the network unit 208 in this example) to transmit the transmission data (E-mail compatible PDF data in this example) generated from the document data selected by the user on the manipulation dialogue in FIG. 17B on the basis of the transmission processing conditions set by the user of the MFP 101 via the transmission processing condition setting dialogue including the dialogue in FIG. 17C to the destination (the PC 104 in this example) designated by the user via a predetermined communication medium (the LAN 105 in this example) (to permit transmission). This process corresponds to that in step S1319.

On the other hand, if the user of the MFP 101 inputs a cancel instruction via the cancel button 1710 on the manipulation dialogue of FIG. 17D, the controller unit of the MFP 101 controls to inhibit data transmission, by a predetermined data communication unit (the network unit 208 in this example), of the transmission data (E-mail compatible PDF data in this example) generated from the document data selected by the user on the manipulation dialogue in FIG. 17B on the basis of the transmission processing conditions set by the user of the MFP 101 via the transmission processing condition setting dialogue including the dialogue in FIG. 17C to the destination (the PC 104 in this example) designated by the user via a predetermined communication medium (the LAN 105 in this example), and to erase the transmission data from the memory (e.g., the temporary area 601 of the hard disk 211) that holds the data if that data has already been generated.

On the other hand, if the user of the MFP 101 inputs a re-setting instruction via the re-setting button 1708 on the manipulation dialogue of FIG. 17D, the controller unit of the MFP 101 controls to inhibit data transmission, by a predetermined data communication unit (the network unit 208 in this example), of the transmission data (E-mail compatible PDF data in this example) generated from the document data selected by the user on the manipulation dialogue in FIG. 17B on the basis of the transmission processing conditions set by the user of the MFP 101 via the transmission processing condition setting dialogue including the dialogue in FIG. 17C to the destination (the PC 104 in this example) designated by the user via a predetermined communication medium (the LAN 105 in this example), to erase the transmission data from the memory (e.g., the temporary area 601 of the hard disk 211) that holds the data if that data has already been generated, and to display the manipulation dialogue in FIG. 17C on the display unit 1401 of the manipulation unit 203 again so as to allow the user to re-set the transmission processing conditions already set by him or her. After the user re-sets the processing conditions via the manipulation dialogue in FIG. 17C re-displayed on the manipulation unit 203 (for example, the user changes settings of the previous transmission processing conditions of the document data to be transmitted which has the data size upon transmission of 12 Mbytes to those of that data with 4 Mbytes), and presses the file size confirmation button 1704 again, the controller unit of the MFP 101 controls the manipulation unit 203 to display the display dialogue 17000. The controller unit makes the user confirm the data size upon transmission after the settings are changed, when he or she re-sets the transmission processing conditions via the dialogue 17000. After that, if the user presses the transmission button 1709 at that time, the controller unit controls to make data transmission to the desired destination (the PC 104 in this example) of the user under the re-set transmission processing conditions.

In this way, for example, when the user intentionally or unintentionally sets first transmission processing conditions (e.g., low compression setting) that transmit data with a first transmission data size (e.g., 12 Mbytes) from the MFP 101 at the manipulation unit 203 of the MFP 101, the controller unit of the MFP 101 executes an informing process of the size information on the manipulation unit 203 to make the user recognize that 12-Mbyte data is transmitted under such settings via the manipulation unit 203 of the MFP 101. The user who knows that fact changes settings to second transmission processing conditions (from low compression setting to high compression setting) that assure a second transmission data size (e.g., 4 Mbytes) smaller than the first transmission data size via the manipulation unit 203. The controller unit of the MFP 101 executes the informing process of the size information again on the manipulation unit 203, thus making the user confirm that 4-Mbyte data is transmitted under the second transmission processing conditions after the settings are changed. After that, the controller unit of the MFP 101 allows the user to input a data transmission instruction to a desired destination with the data size of 4 Mbytes via the manipulation unit 203, and controls the MFP 101 to execute the data transmission operation based on that instruction.

Of course, if the user of the MFP 101 who manipulates the MFP 101 via the local UI considers and examines the his or her convenience, the current time zone, network condition, the condition, ability, and performance of the destination of transmission, and the like, and determines that no problem is posed if data with the first transmission data size is transmitted, he or she can input an instruction to transmit desired data from the MFP 101 to a desired destination under the first transmission processing conditions. In this manner, data can be transmitted by the data transmission method more convenient for the user.

In this manner, according to this embodiment, when local manipulations are made from the MFP 101, even when scan data is to be transmitted from the MFP 101 to an external device or when data held in the box is to be transmitted from the MFP 101 to an external device, a convenient environment that can prevent occurrence of the conventional problems as in the above embodiment can be provided to the user, and effects equivalent to the above effects can be obtained.

As described above, upon transmitting image data stored in the box of the MFP to another device of user's choice, the file selection control, file size confirmation control, transmission control, and print control are applied to the box data of the MFP using the manipulation unit (operation panel) of the MFP. Furthermore, copy control, transmission control, and print control can be applied to the scanned document.

Third Embodiment

In the first and second embodiments, the process for making file size confirmation after one transmission file format (e.g., file transmission) and one transmission file compression ratio (e.g., low compression) are selected upon transmitting image data stored in the box of the MFP to the host computer has been explained. However, the third embodiment will explain a method of making file size confirmation for all the selected transmission methods after a plurality of transmission file formats and transmission file compression ratios are selected.

Figure 18:
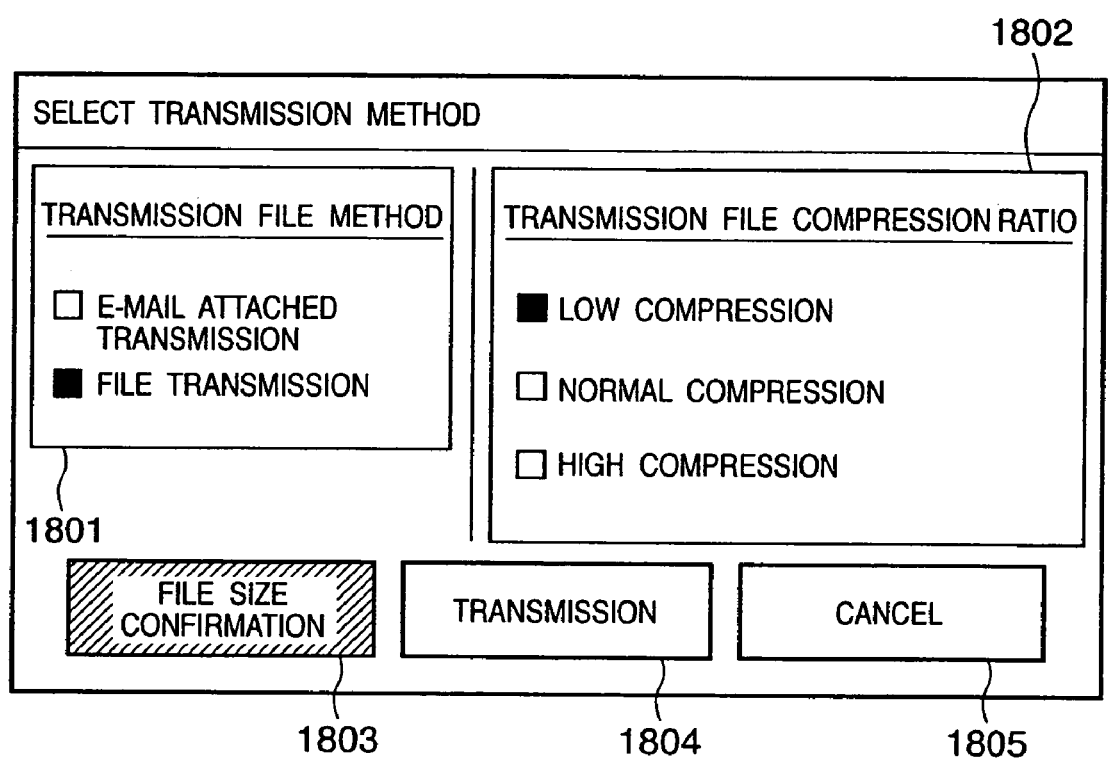
FIG. 18 shows an example of a manipulation dialogue (RemoteUI dialogue) displayed on a PC display unit in the third embodiment.
Figure 19:
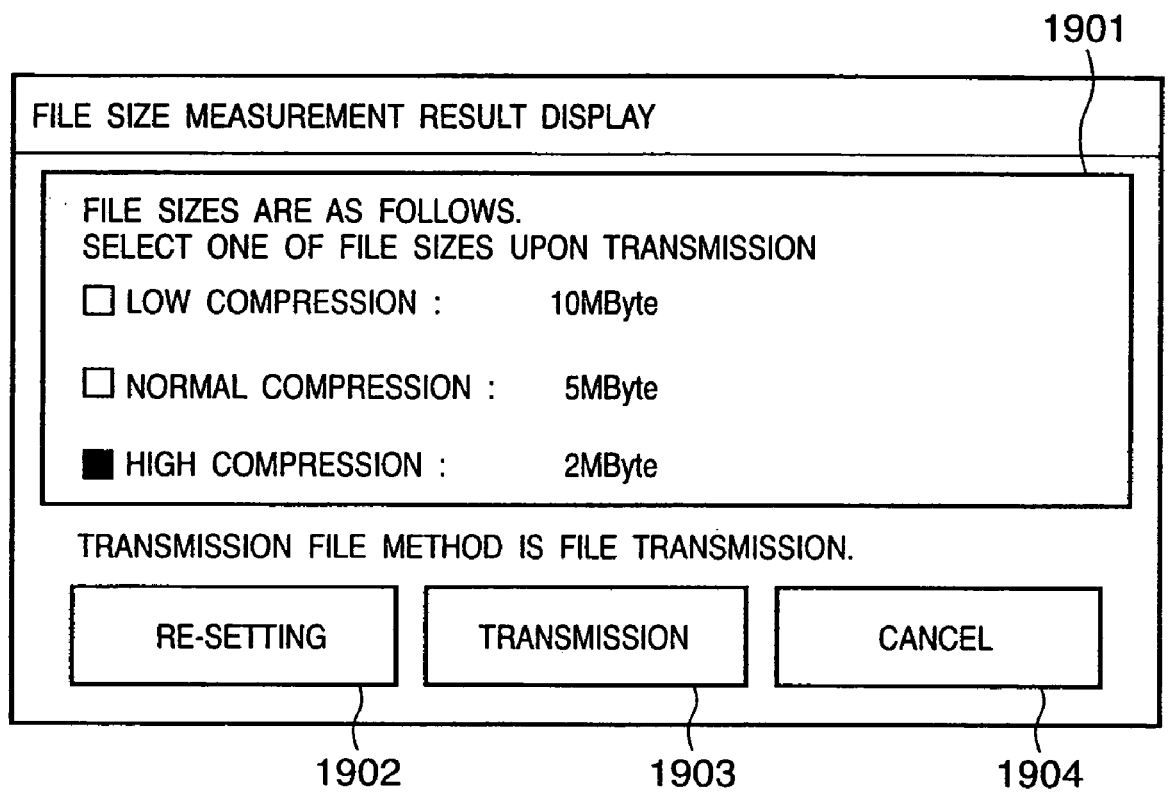
FIG. 19 shows an example of a manipulation dialogue (RemoteUI dialogue) displayed on the PC display unit in the third embodiment.

[Transmission Data Size Confirmation Method, and Control Method of Transmission and Printing: FIGS. 18 to 20]

Details of the third embodiment will be explained below using FIGS. 18 to 20 in addition to the drawings used in the first and second embodiments. Note that the third embodiment assumes a system in which the host computer (an example of the first information processing device) and the image processing device (to be referred to as an MFP hereinafter; an example of the second information processing device) are connected via a communication medium such as a network or the like. Since the basic flowchart on the host computer side is the same as that in the first embodiment, FIG. 7 is used, and the processing of the image processing device (MFP) will be explained using FIG. 20 in place of FIG. 8 used in the first embodiment.

As has been explained in the first and second embodiments, when box data stored in the storage unit 106 of the MFP 101 is to be transmitted to, e.g., the PC 104, the transmission file format and transmission file compression ratio are designated as the transmission method in step S705 in FIG. 7 or step S1307 in FIG. 13. In the third embodiment, a plurality of transmission file formats and transmission file compression ratios are selected.

FIG. 18 shows a dialogue used to select the transmission method, which is displayed in step S705 in FIG. 7. An area 1802 indicates that all the transmission file compression ratios (low compression, normal compression, and high compression) are selected. Since components 1801 and 1803 to 1805 are the same as those in the first embodiment, a description thereof will be omitted. Upon depression of a file size confirmation button 1803, YES is determined in file size confirmation in step S706, and the flow advances to step S707. Since no re-setting process is required initially in step S707, the flow advances to step S708. In step S708, information is transmitted to the MFP 101 to execute a transmission file size measurement process. That is, various kinds of information such as the transmission file format, transmission file compression ratio, data type, and the like are transmitted to the MFP 101. At this time, the transmission file compression ratio includes information indicating that all the ratios (low compression, normal compression, and high compression) are selected.

(Processing of Image Processing Device (MFP): FIG. 20)

The file size measurement on the MFP 101 side will be explained below using the flowchart of FIG. 20. In step S2001, the control waits until reception of information from the PC 103 in step S708 in FIG. 7. Upon reception of the information from the PC, the MFP generates a transmission file on the basis of the received information, i.e., the transmission file method, transmission file compression ratio, data type, and the like. In step S2002, the MFP decompresses the selected file, i.e., box data saved in the storage unit 106. In step S2003, the MFP initializes N used to count the number of types of the selected transmission methods. For example, in the third embodiment, since there are three different selected compression ratios, the number of types of the selected transmission methods is 3: if N=0, low compression; if N=1, normal compression; and if N=2, high compression.

In step S2004, the selected file, i.e., the box data saved in the storage unit 1006 is decompressed. Next, JPEG compression is applied to the decompressed box data on the basis of the aforementioned information. Since N=0 initially, a JPEG compression at a low compression ratio is applied. In step S2005, the controller unit of the MFP measures the file size the generated file, i.e., the JPEG-compressed file. In step S2006, information to be transmitted to the PC 103 in step S2008 is saved. That is, the file size measurement result at the low compression ratio is saved.

The flow then advances to step S2007. However, since N=0 and the number of selected compression ratio=3, NO is determined in step S2007, and the flow advances to step S2009 to increment N by 1. Likewise, the processes for normal compression and high compression are executed in steps S2004 to S2006, and their file size measurement results are saved in step S2006. If the conditional statement in step S2007 ends (YES in step S2007), the flow advances to step S2008 to transmit the information saved in step S2006 to the PC 103.

These pieces of information are received in step S709 in FIG. 7, and are displayed in step S710. FIG. 19 shows a dialogue displayed at that time. As indicated by an area 1901, the file sizes for the low, normal, and high compression ratios are displayed. The user selects a desired transmission file compression ratio from these file sizes. For example, in the area 1901, high compression is selected. Upon pressing a transmission button 1903, transmission with the transmission file compression ratio=high compression can be made. When the transmission file method is to be re-set, a button 1902 is pressed. The third embodiment has exemplified multiple selection of the transmission file compression ratios. Also, a plurality of transmission file methods, data types, and the like can also be selected.

As described above, after a plurality of transmission file formats and transmission file compression ratios are selected, the file sizes of all the selected transmission methods can be confirmed.

Note that this embodiment can be applied to a device and system which combine all the arrangements of the first to third embodiments or to a device and system which comprise the arrangement of only one embodiment, and the embodiments can be combined as needed. Also, arrangements which are not described in each embodiment are basically the same as those described in other embodiments.

In the embodiment (including the first to third embodiments) of the present invention, a multi-function peripheral such as the MFP 101 having a plurality of functions (copy function, transmission function, box function, print function) has been exemplified as the second information processing device. However, the present invention can be applied to a single-function peripheral (network scanner) having at least a transmission function. Of course, a digital camera and the like may be used as described above. The present invention can be applied to any other devices and systems in which a plurality of such information processing devices are connected via either wired or wireless connection, as long as they can solve the problems discussed in the present application, and can obtain the same effects as those described above.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

The present invention also includes a mode that implements the functions of the aforementioned embodiments by downloading program data for implementing the functions of the aforementioned embodiments from a CD-ROM set in the self device or from an external supply source such as the Internet or the like onto a memory of the self device.

When the present invention is applied to the recording medium, that recording medium stores program codes corresponding to the aforementioned flowcharts.

As described above, according to the embodiments of the present invention, in a system in which a first information processing device (e.g., a host computer) and second information processing device (e.g., an MFP) are connected via a communication medium such as a network or the like, upon transmitting image data stored in a box of the second information processing device (e.g., MFP) to the first information processing device (e.g., host computer), the transmission data size (file size) can be displayed on the first information processing device (e.g., a host computer) before transmission. For this reason, the user can transmit image data with a desired transmission data size. In this system, transmission control and print control can be easily done. Furthermore, after a plurality of transmission file formats and transmission file compression ratios are selected, the file sizes of all the selected transmission methods can be confirmed.

As described above, according to the embodiments of the present invention, the user can confirm in advance the data size of data to be transmitted from an information processing device (e.g., a digital multiple device, digital camera, scanner, or the like) having a data transmission function. For example, the following effects can be provided: problems which are posed when the amount of transmission data is large (e.g., that data includes color data or many pages) can be prevented, and problems pointed out in the prior art can be solved.

For example, even when the aforementioned information processing device having the data transmission function is to be remotely manipulated, the above effects can be obtained. Also, the above effects can be obtained even in the device itself having the data transmission function.

For example, when the information processing device having the data transmission function has a plurality of functions such as a copy function, print function, and the like in addition to the data transmission function like a digital multiple device, the present invention can prevent undesirable troubles caused when the user operability and convenience of functions such as a copy function, print function, and the like other than the data transmission function are adversely, influenced owing to the result of prevention of occurrence of the aforementioned problems. In this way, when the device having the data transmission function has a plurality of functions, the present invention can achieve both prevention of occurrence of the aforementioned problems and preservation of high operability of other functions of that device.

Also, for example, a user friendly and convenient device and system, which can provide the aforementioned effects and can flexibly meet various needs from users can be provided.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-245685 filed on Aug. 25, 2004, which is hereby incorporated by reference herein.

What is claimed is:

1. A method of data processing in an information processing system including a first information processing device which enables a user to set a processing condition and a second information processing device which can execute transmission of data under the set processing condition, comprising:

allowing a user to request, via the first information processing device, notification of an amount of the data to be transmitted, before the second information processing device executes the transmission of the data;

allowing a user to set, via the first information processing device, a first processing condition under which the data is transmitted from the second information processing device in a first data amount;

notifying the user of the amount of the data to be transmitted under the first processing condition via the first information processing device when the user requests the notification of the amount of the data to be transmitted and sets the first processing condition, and then allowing the user to, via the first information processing device, change a setting from the first processing condition to a second processing condition under which the data is transmitted from the second information processing device in a second data amount smaller than the first data amount; and transmitting the data from the second information processing device under the first processing condition without notifying the user of the amount of the data to be transmitted under the first processing condition, when the user sets the first processing condition and does not request the notification of the amount of the data to be transmitted.

2. The method according to claim 1, wherein notifying the user of the amount of the data to be transmitted includes displaying the amount of the data to be transmitted in a display unit of the first information processing device.

3. The method according to claim 2, wherein the first information processing device transmits to the second information processing device an instruction that requests information associated with the amount of the data to be transmitted by the second information processing device, wherein the first information processing device receives the information transmitted from the second information processing device in response to the instruction, and wherein the display unit displays the amount of the data to be transmitted based on the information received by the first information processing device.

4. A method of data processing comprising:

receiving a request from a user for notifying the user of an amount of data to be transmitted, before an information processing apparatus transmits the data;

receiving a first processing condition from the user under which the information processing apparatus transmits the data, before the information processing apparatus transmits the data;

notifying the user of the amount of the data to be transmitted under the first processing condition, if the first processing condition and the request are received;

receiving a second processing condition from the user under which the information processing apparatus transmits the data, after notifying the user of the amount of the data to be transmitted under the first processing condition, and before the information processing apparatus transmits the data;

controlling the information processing apparatus to transmit the data under the first processing condition if the second processing condition is not received;

controlling the information processing apparatus to transmit the data under the second processing condition, if the second processing condition is received; and controlling the information processing apparatus to transmit the data under the first processing condition without notifying the user of the amount of the data to be transmitted under the first processing condition, if the first processing condition is received and the request is not received.

5. A method of data processing comprising:

receiving a request from a user for notifying the user of an amount of data to be transmitted, before an information processing apparatus transmits the data;

receiving, before the information processing apparatus transmits the data, a first processing condition from the user, under which the information processing apparatus transmits the data in a first data amount;

notifying the user of the amount of the data to be transmitted under the first processing condition if the request is received and the first processing condition is received, and then allowing the user to change from the first processing condition to a second processing condition under which the information processing apparatus transmits the data in a second data amount which is smaller than the first data amount;

controlling the information processing apparatus to transmit the data under the first processing condition if the user does not change from the first processing condition to the second processing condition;

controlling the information processing apparatus to transmit the data under the second processing condition, if the user changes from the first processing condition to the second processing condition; and controlling the information processing apparatus to transmit the data under the first processing condition without notifying the user of the amount of the data to be transmitted under the first processing condition if the request is not received and the first processing condition is received.

6. An information processing apparatus comprising:

a receiving unit configured to receive a request from a user for notifying the user of an amount of data to be transmitted, before the information processing apparatus transmits the data;

a condition receiving unit configured to receive a first processing condition from the user under which the information processing apparatus transmits the data, before the information processing apparatus transmits the data;

a controlling unit configured to enable the condition receiving unit to receive a second processing condition from the user under which the information processing apparatus transmits the data, after notifying the user of the amount of the data to be transmitted under the first processing condition, if the receiving unit receives the request and the condition receiving unit receives the first processing condition, to control the information processing apparatus to transmit the data under the first processing condition if the condition receiving unit does not receive the second processing condition, to control the information processing apparatus to transmit the data under the second processing condition if the condition receiving unit receives the second processing condition, and to control the information processing apparatus to transmit the data under the first processing condition without notifying the user of the amount of the data to be transmitted under the first processing condition if the receiving unit does not receive the request and the condition receiving unit receives the first processing condition.

7. The apparatus according to claim 6, wherein the receiving unit receives the request via a remote user interface at an external information processing apparatus, and wherein if the receiving unit receives the request via the remote user interface, the controlling unit controls the information processing apparatus to transmit the data after notifying the user via the remote user interface of the amount of the data to be transmitted.

8. The apparatus according to claim 6, wherein the request from the user is a request for notifying the user of a total amount of a plurality of data to be transmitted, before the information processing apparatus transmits the plurality of data, and wherein the controlling unit controls the information processing apparatus to transmit the plurality of data after notifying the user of the total amount of the plurality of data to be transmitted if the receiving unit receives the request.

9. The apparatus according to claim 6, further comprising:
a notifying unit configured to notify the user of the amount of the data to be transmitted by displaying the amount of the data to be transmitted or by audibly outputting the amount of the data to be transmitted.

10. An information processing apparatus comprising:
a receiving unit configured to receive a request from a user for notifying the user of an amount of data to be transmitted, before the information processing apparatus transmits the data;
a condition receiving unit configured to, before the information processing apparatus transmits the data, receive a first processing condition from the user under which the information processing apparatus transmits the data in a first data amount or a second processing condition under which the information processing apparatus transmits the data in a second data amount size which is smaller than the first data amount;
a notifying unit configured to notify the user of the amount of the data to be transmitted, if the receiving unit receives the request; and
a controlling unit configured to control the notifying unit to notify the user of the amount of the data to be transmitted under the first processing condition, if the receiving unit receives the request and the condition receiving unit receives the first processing condition, and then allow the user to change from the first processing condition to the second processing condition, and to control the information processing apparatus to transmit the data under the second processing condition if the user changes from the first processing condition to the second processing condition,
wherein the control unit controls the information processing apparatus to transmit the data under the first processing condition or the second processing condition without notifying the user of the amount of the data to be transmitted if the receiving unit does not receive the request and the condition receiving unit receives the first processing condition or the second processing condition.

11. The apparatus according to claim 10, wherein if the user changes from the first processing condition to the second processing condition, the controlling unit controls the notifying unit to notify the user of the amount of the data to be transmitted under the second processing condition and then controls the information processing apparatus to transmit the data under the second processing condition.

12. The apparatus according to claim 10, wherein if the receiving unit receives the request for notifying the user of the amount of the data to be transmitted under the first processing condition and the amount of the data to be transmitted under the second processing condition, the controlling unit controls the notifying unit to notify the user of the amount of the data to be transmitted under the first processing condition and the amount of the data to be transmitted under the second processing condition and then controls the information processing apparatus to transmit the data.

* * * * *